United States Patent [19]
Roberts et al.

[11] Patent Number: 6,138,512
[45] Date of Patent: Oct. 31, 2000

[54] METHOD AND APPARATUS FOR DETERMINING SOURCE LOCATION OF ENERGY CARRIED IN THE FORM OF PROPAGATING WAVES THROUGH A CONDUCTING MEDIUM

[75] Inventors: Ronald A. Roberts; Lance E. Rewerts; Mary Amanda Clark, all of Ames, Iowa

[73] Assignee: Iowa State University Research Foundation, Inc., Ames, Iowa

[21] Appl. No.: 09/124,537

[22] Filed: Jul. 29, 1998

Related U.S. Application Data

[60] Provisional application No. 60/054,178, Jul. 30, 1997.
[51] Int. Cl.$^7$ ................................................. G01H 17/00
[52] U.S. Cl. ........................ 73/570; 73/579; 73/592; 73/40; 73/40.5 A; 73/49.1
[58] Field of Search ........................ 73/570, 579, 584, 73/592, DIG. 1, 40, 40.5 A, 49.1

[56] References Cited

U.S. PATENT DOCUMENTS

| | | | |
|---|---|---|---|
| 5,038,614 | 8/1991 | Bseisu et al. | 73/592 |
| 5,231,866 | 8/1993 | Peacock | 73/40.5 A |
| 5,531,099 | 7/1996 | Russo | 73/40.5 A |
| 5,544,074 | 8/1996 | Suzuki et al. | 364/508 |

*Primary Examiner*—Richard A. Moller
*Attorney, Agent, or Firm*—Zarley, McKee, Thomte, Voorhees & Sease

[57] ABSTRACT

A method and apparatus for determining source location for acoustic or other waveform energy in a conducting medium. The method includes simultaneously detecting and transducing the source energy at a plurality of points in the medium into a composite signal representative of the source energy, as sensed at each point. Dispersional modes of propagation of the energy, if more than one, are isolated from each other, preferably by Fourier transform spatially and temporally. Generalized cross correlation is performed on selected isolated modes, resulting in identification of a value from which source location can be located. The apparatus can include an array of spaced apart transducers which are configured to be minimally interfering with source energy propagation through the medium. An multi-channel data acquisition device, including A/D converters for each transducer, captures and digitizes the output of each transducer simultaneously. A digital signal processor operatively associated with the data acquisition device is used to isolate the dispersional modes of the transduced energy and to derive source location with generalized cross correlation techniques.

44 Claims, 51 Drawing Sheets

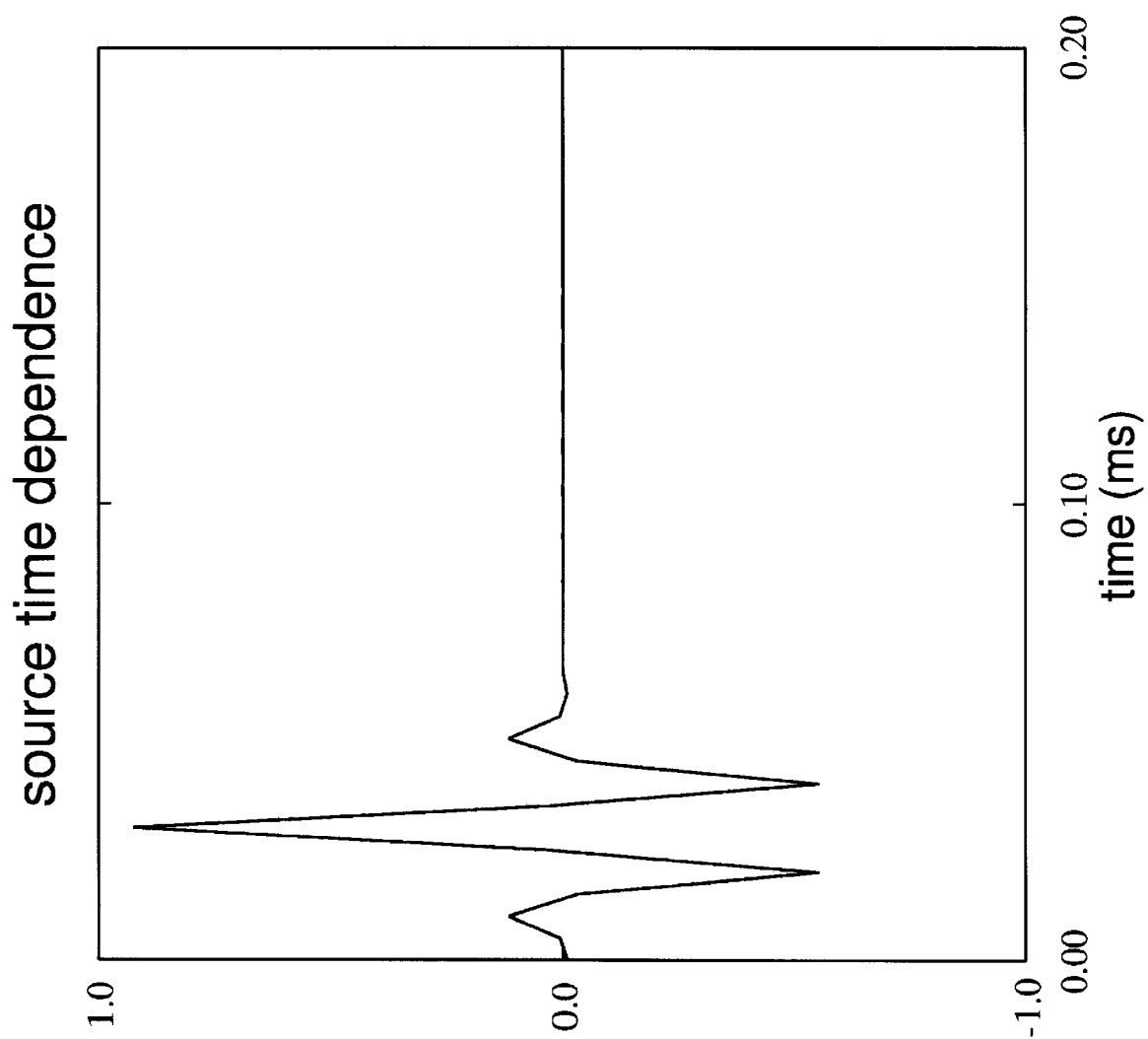

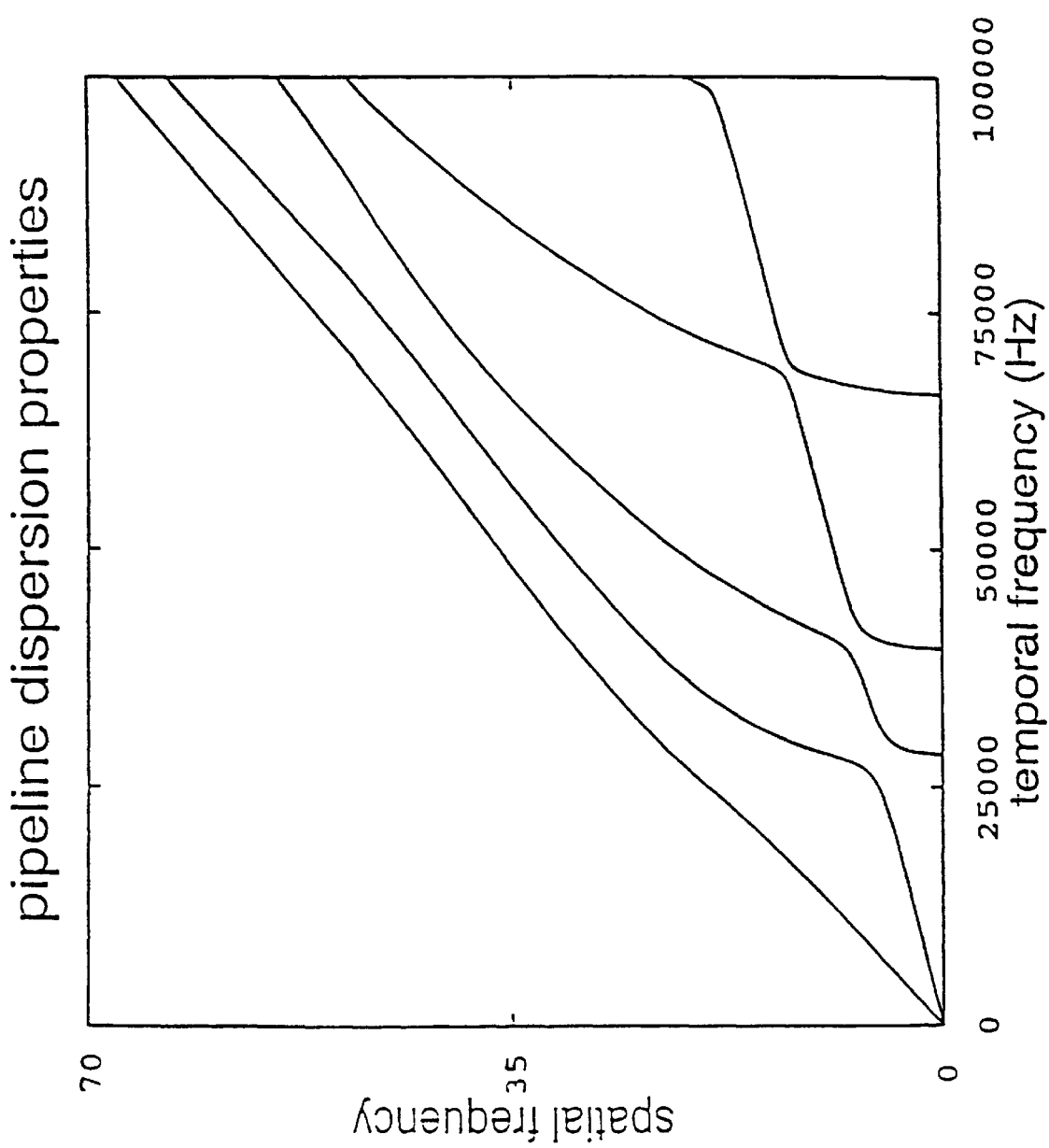

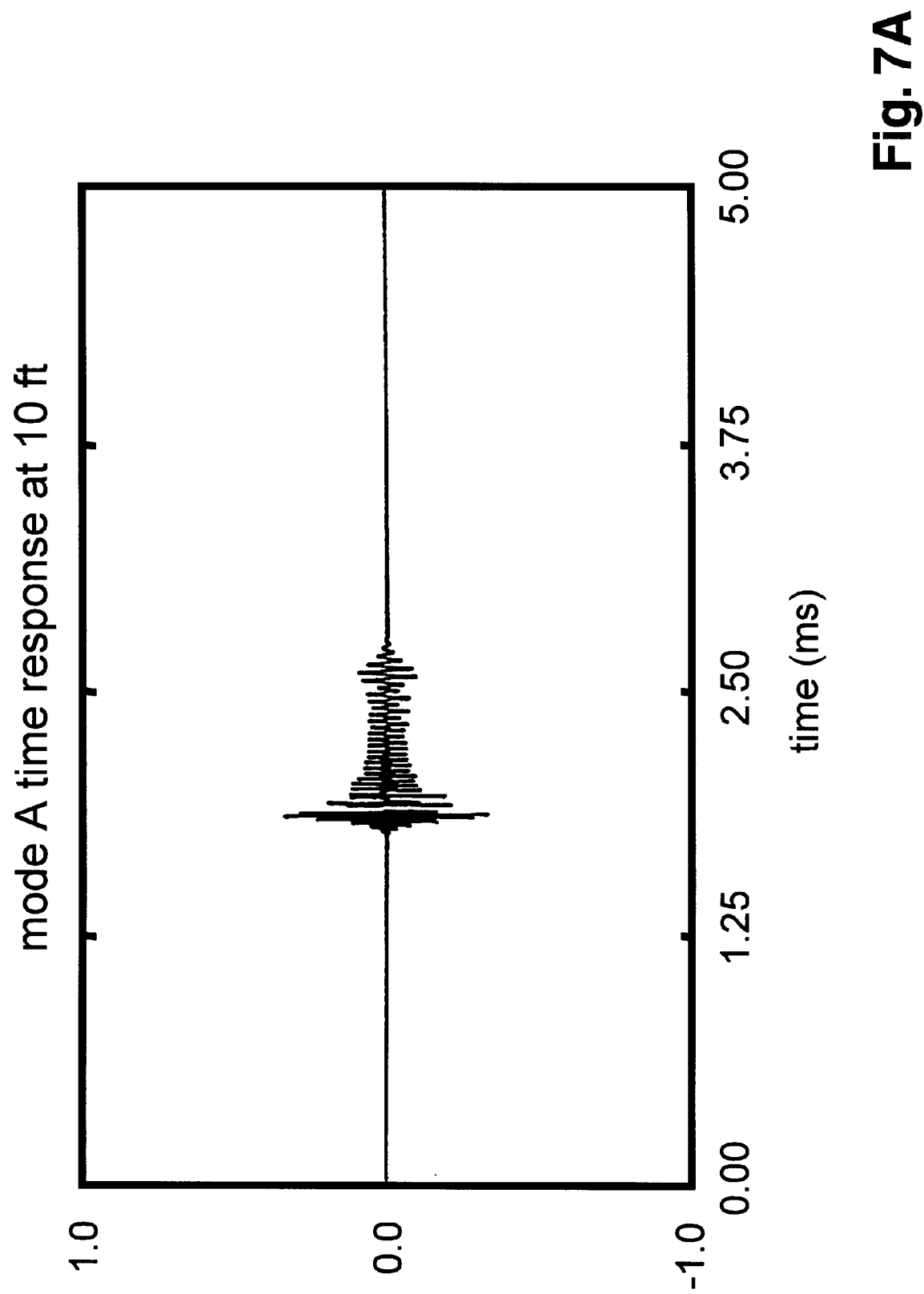

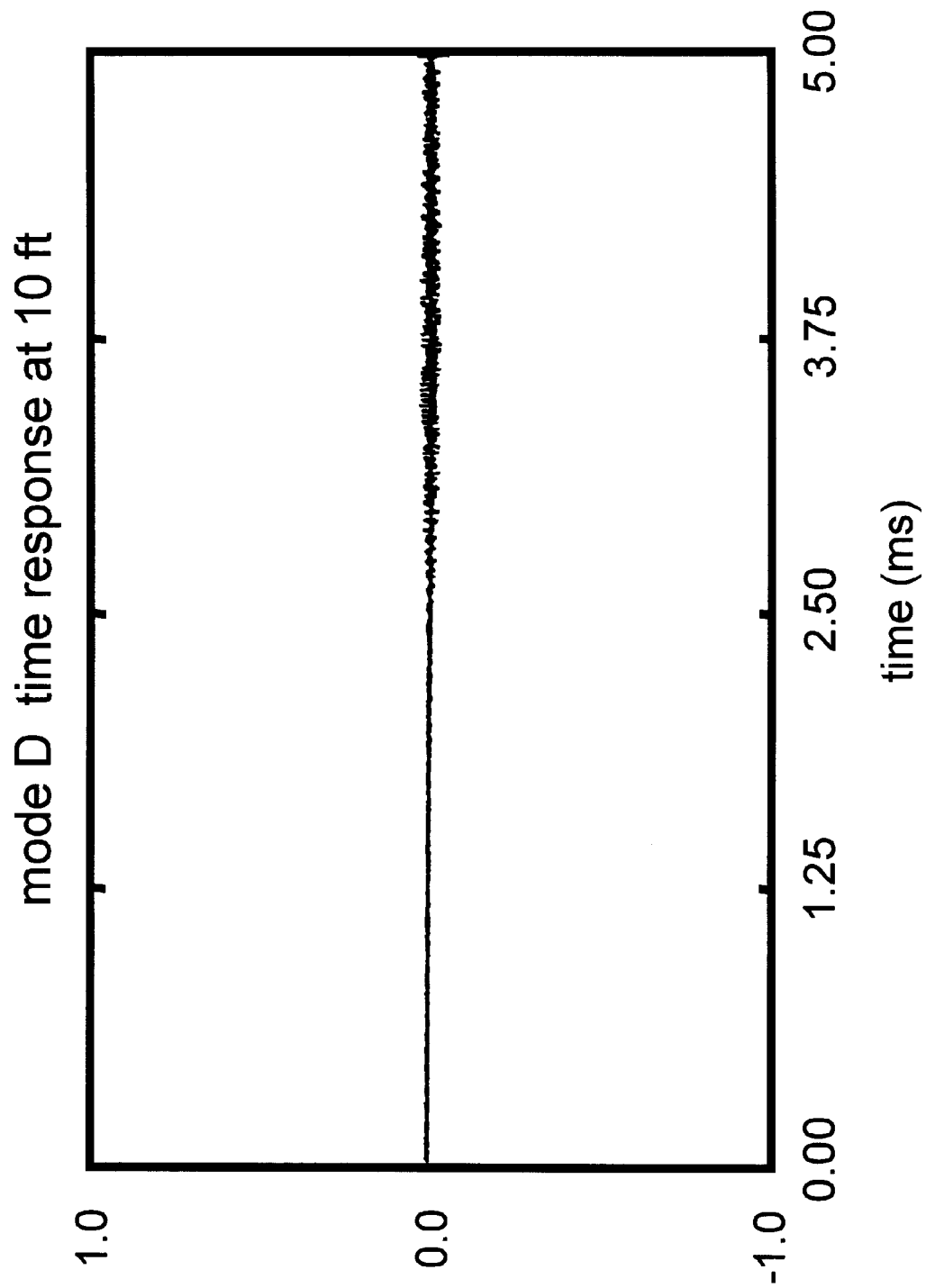

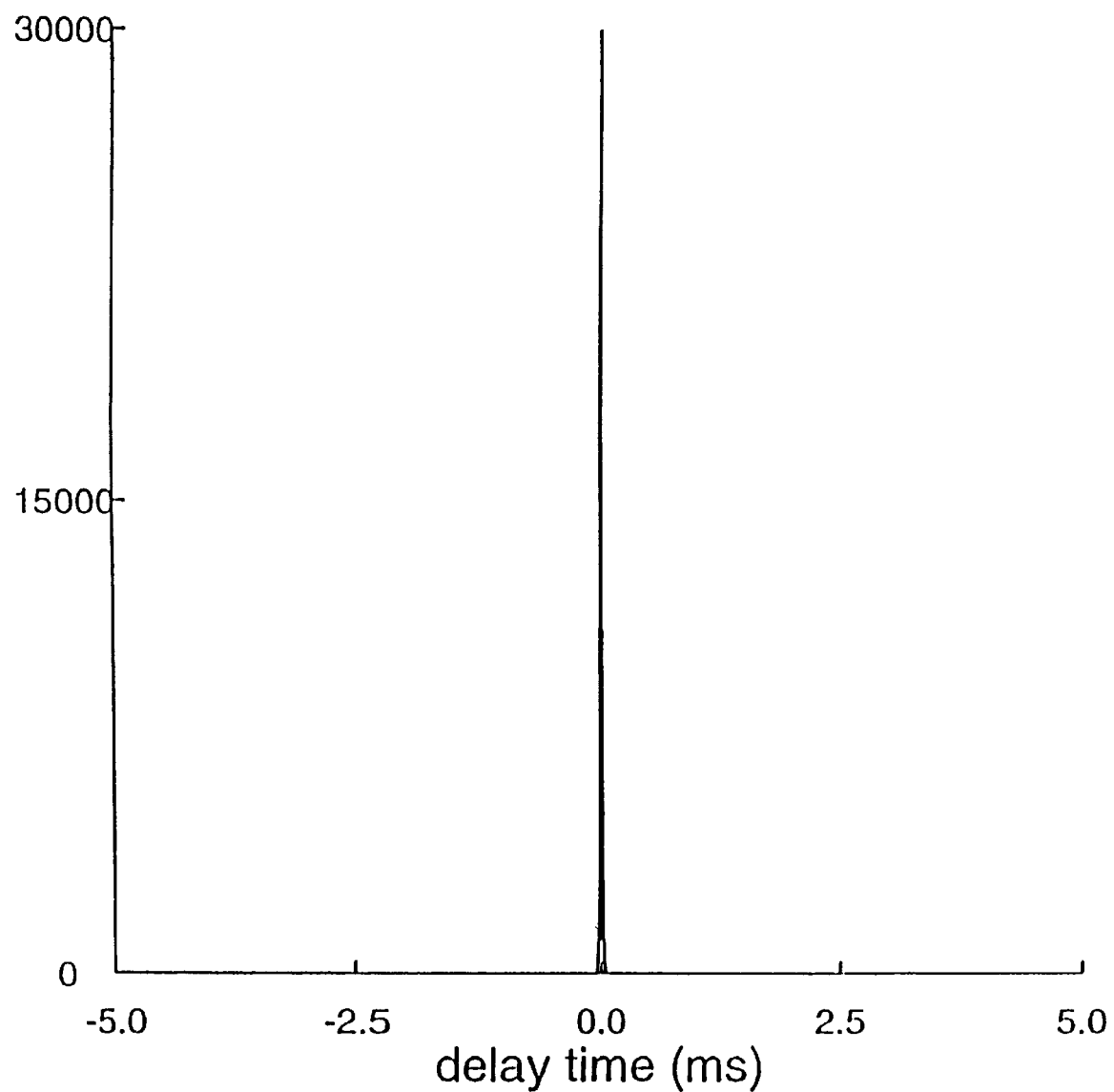

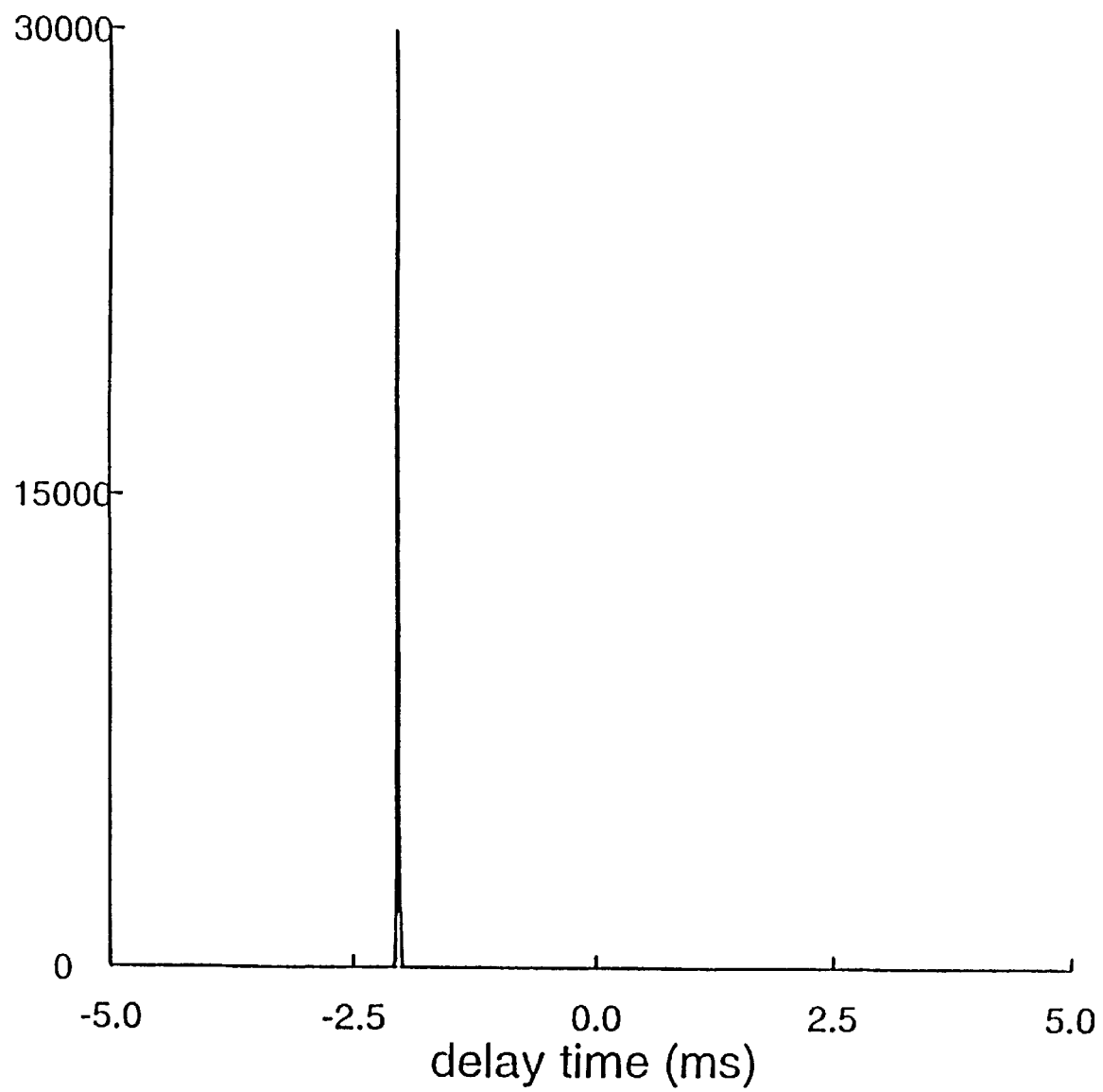

source location: 15 ft from A

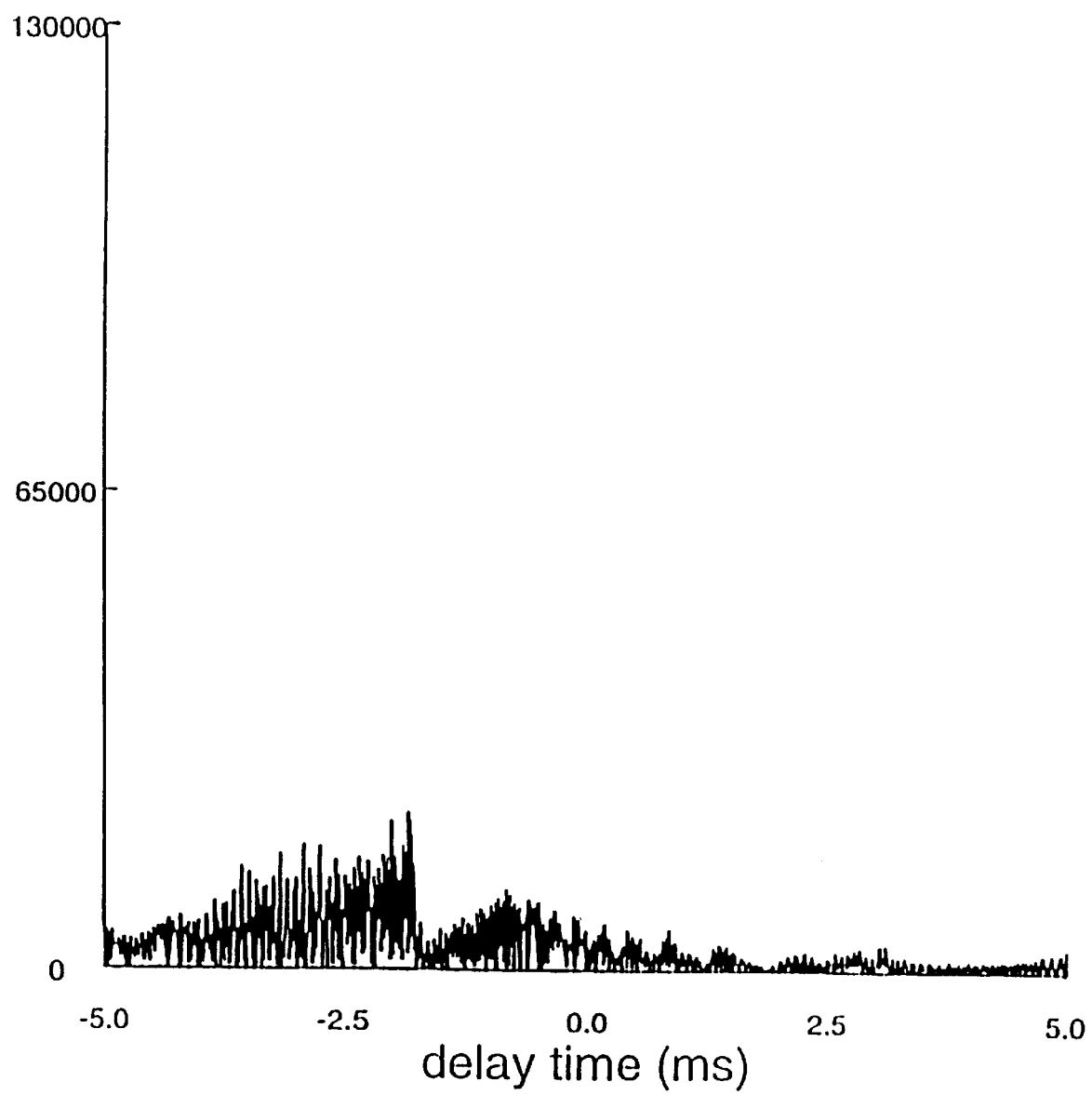

Fig. 18 SOURCE LOCATION DATA PROCESSING ALGORITHM

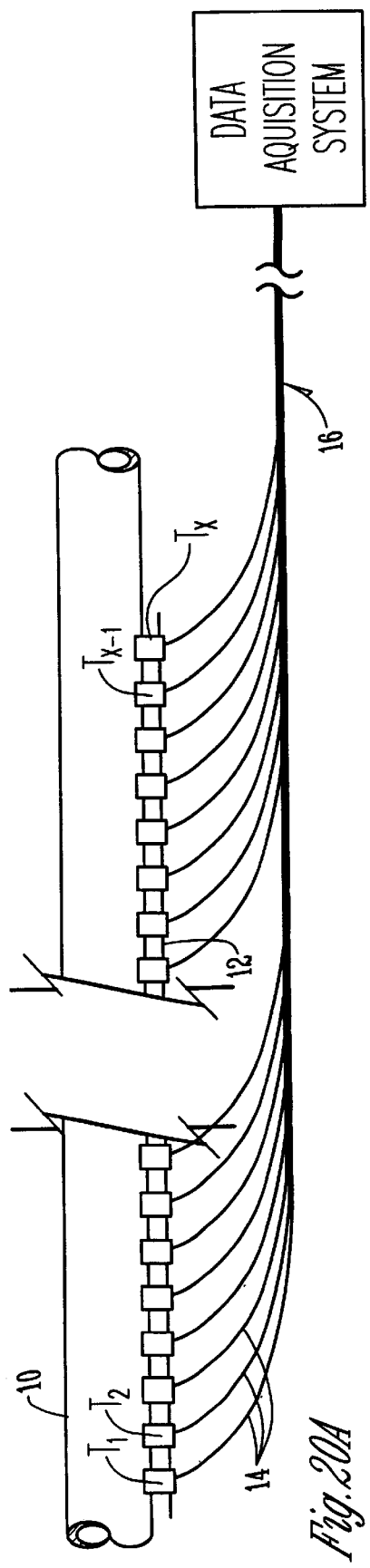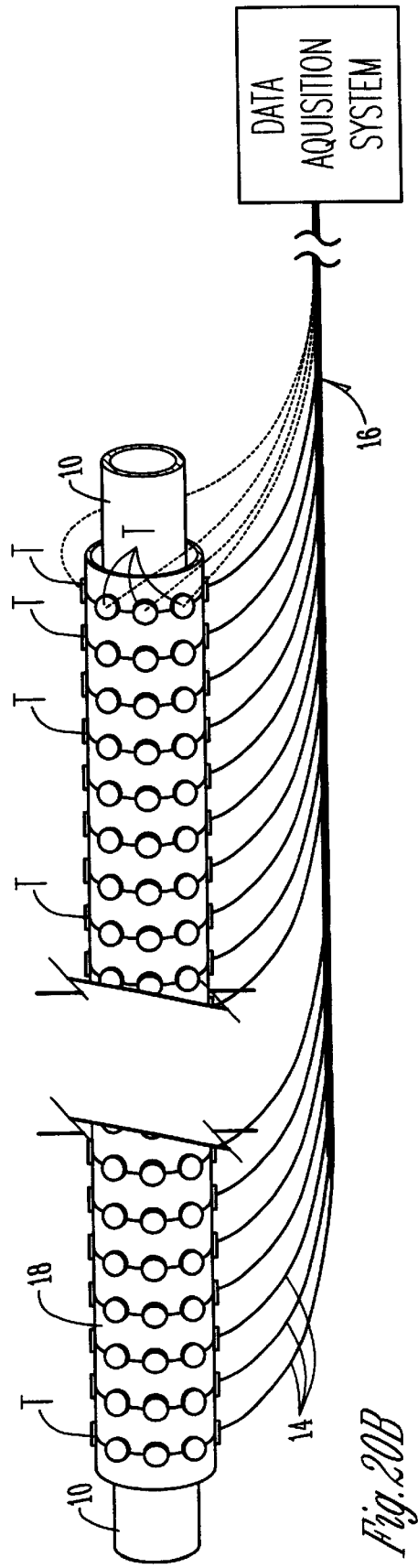
Fig. 20A
Fig. 20B

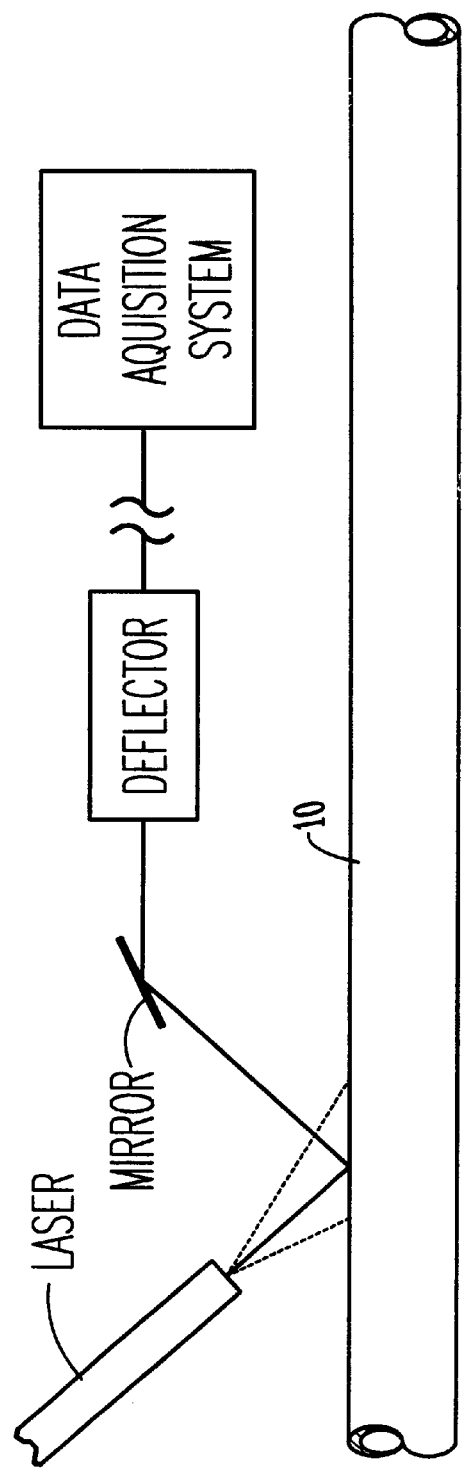

METHOD AND APPARATUS FOR DETERMINING SOURCE LOCATION OF ENERGY CARRIED IN THE FORM OF PROPAGATING WAVES THROUGH A CONDUCTING MEDIUM

RELATED APPLICATIONS

This application relates back to provisional application 60/054,178, filed Jul. 30, 1997

GOVERNMENT RIGHTS CLAUSE

Development of this invention was funded at least in part by Grant #'s EEC9527633, EEC-9420693 and EEC-920693, from the National Science Foundation. The Government may have certain rights in the invention.

INCORPORATION BY REFERENCE

The following materials are incorporated by reference herein:

L. E. Rewerts, R. R. Roberts, and M. A. Clark, "Dispersion Compensation in Acoustic Emission Pipeline Leak Location," Review of Progress in Quantitative Non-Destructive Evaluation, Vol. 16A, pp 427–434.

R. D. Fay, "Waves in Liquid Filled Cylinders," J. Acoust. Soc. Am., Vol. 24, pp. 459–462 (1952).

T. C. Lin and C. W. Morgan, "Wave Propagation Through Fluid Contained in a Cylindrical, Elastic Shell,", J. Acoust. Soc. Am., Vol. 25, pp. 1165–1176 (1956).

C. R. Fuller and F. J. Fahy, "Characteristic of Wave Propagation and Energy Distributions in Cylindrical Elastic Shells Filled with Fluid," J. Sound Vib., Vol. 81, pp. 501–518, (1982).

D. Alleyne, and P. Cawley, "A Two-Dimensional Fourier Transform Method for the Measurement of Propagating Multimode Signals," J. Acoust. Soc. Am., V.89, p 1159–68. (1991)

BACKGROUND OF THE INVENTION

1. Field of the Invention

The present invention relates to analysis of energy propagated in the form of waves, and in particular, to source location of such energy, especially in one or two dimensional systems which can be dispersive and which, during physical changes in structure or in use, will produce or carry energy such as acoustic signals or electromagnetic waves.

2. Problems in the Art

There has, of course, been long and continuous scientific study of the propagation of wave-like energy through conducting media. From such study, valuable practical applications have emerged.

For example, ultrasound energy has been widely used as a non-destructive evaluation tool. Imaging of internal parts of the human body are possible. Ultrasonic scanning of metal, for instance airplane wings, for cracks or fatigue without altering the metal can be done.

As much as these studies and applications to real world practice have advanced, there is still room for improvement in the understanding and uses of wave-form energy. Moreover, as an adjunct, a better understanding of such energy has opened up possibilities regarding detection and location of the source of such energy in a conducting medium.

For example, it would be valuable to know when and where physical changes in structures occur. Specifically, it would be advantageous to be able to monitor crack initiation location in flat plates, rods, and other mechanical structures, or leak location in underground storage or delivery systems, such as pipes. There have been many attempts to non-destructively accomplish such monitoring, detection and/or location. However, most methods are not consistently as precise as desired or accurate at locating a source of generation of energy carried in the form of propagating waves. Also, many current systems provide acceptable accuracy for limited situations, and then only if expert and experienced personnel interpret the results.

Consider the following situation. Above and under ground storage tanks present significant environmental hazard potential for certain stored fluids. Approximately one-half of the drinking water in the United States is derived from ground water. Even small amounts of gasoline, which includes benzene and other suspected carcinogens, leaked into the ground can contaminate millions of gallons of potable water. Vapors can also reach sewage systems and into the air. Estimates of the cost of potential needed remediation are on the order of thirty billion dollars.

The scale of this problem is immense. It has been reported that on the order of 250,000 leaks or releases were confirmed in 1997 out of the 1.8 million regulated underground storage tanks and pipelines in U.S. Based on these figures, almost 14% of those structures leaked last year. It has been estimated that 15–20% are leaking or will leak shortly. Some sources claim that as many as 750,000 above ground tanks have potential imminent problems. There are also a great number of below ground tanks. Many of the storage tanks are quite large in size. There are also thousands of miles of pipelines that carry petroleum based or other fluids (liquid or gas) that are potentially hazardous to the environment. Examples of the locations for these structures include gas stations, airport fueling stations, military fueling depots, waste management systems, nuclear power plants, and chemical manufacturing facilities, to name a few.

As a result of these risks, federal and state laws have been enacted that require periodic inspections and testing of such storage facilities in the hope that potential or actual leakage problems will be found as early as possible. Thus, especially underground tanks and pipes, are now tested for leaks on a regular basis and remedies must be implemented if any leak is found. Such remedial action can be very costly.

Current leak detection and/or leak location technology is inaccurate and inefficient. In the example of underground pipelines, the need is to provide the location of a leak to within the width of a backhoe (approximately 6 ft.), so that only one hole must be dug to allow correction of the leak. If a predicted leak location is off by more than this, the time and expense of digging multiple holes is incurred.

Discussed below are some of the current ways used to detect and/or locate leaks in pressurized storage tanks or conduits, such as pipelines.

Volumetric and Pressure Based Methods. These methods attempt to track line volume and line pressure for product loss due to leaks. The methods only work for significant leaks (1–5% losses). They are also limited to the spacing of the sensors used. Volumetric and pressure based methods are acceptable for highly pressurized lines (e.g. steam lines from boilers) to detect, but not to locate leaks. Additionally, false alarms are a problem. Also, they require expert, experienced personnel to provide a reasonable degree of accuracy. These methods are also extremely disruptive of the normal operations of the systems. For example, the U.S. Department of Energy (DOE) tests for leaks by going off-line and pressurizing the pipes with gas. Thus, an opportunity cost is incurred because of the loss of normal operation time in the pipeline. Also, cost considerations for administering such testing (including equipment costs), are important, especially for small businesses, e.g. gas stations.

Electrical Methods. Wire, tape or cable is installed along the pipeline. The methods monitor for a fluctuation in the signals picked up by the wire, tape or cable caused by a leak, and use the time delay that can be measured at receipt of the fluctuation to predict the location of the leak. While this is fairly effective, it is costly because it must be physically installed along the entire pipeline. It is probably cost-prohibitive to retrofit most existing underground pipelines. Corrosion and other environmental factors can damage or effect its performance, including the creation of falsings. It would then be costly and sometimes difficult to track down the precise location of the damaged wire.

Optical methods. Infrared (IR) spectroscopy methods are sometimes used, especially if the product being conveyed is warmer than the soil surrounding the pipeline. An advantage is that above ground sensors can be used. However, they must be first calibrated to non-leak situations. Also, these methods are unreliable. Almost all factors and conditions involved with underground pipelines can affect the accuracy or reliability of these types of methods (e.g. soil type, pipe design, temperature of product, amount leaked).

Tracer gas. Helium or sulfur hexaflouride, for example, can be introduced through the pipeline. Like optical methods, sensing devices to detect leakage of the tracer gas can be above ground. If such gas escapes through a leak in the pipe, the theory is it will then leak through soil and be detectable. However, these processes require system shutdown, and draining of the normal product that is conveyed through the pipeline. There is imprecision in ground level detections, because of diffusion of gas. The gas may not travel vertically, and therefore detection of the gas above ground will not necessarily provide accuracy regarding location of a leak. Because of this imprecision, workers may have to bore many holes to find the area of highest concentration of the leaking gas, to then find the location of the leak.

Because of the short-comings of the above type methods and the potential environmental hazards discussed above, early in the 1990's the EPA began to focus on acoustic detection methods. Leaks generally are very small in size, and therefore turbulence at the leak location by the leaking fluid creates sound energy. The pipeline, and the fluid, are usually acoustically conducting. Sensors can be placed on the pipeline and "listen" for such sound.

Two types of acoustic detection methods have evolved. One is called attenuation-based (reduction in signal amplitude with increasing distance from the source). The other is time of flight based (increase in signal transit time with increasing distance from the source).

One time of flight methodology placed acoustical sensors along the pipeline until the sensors bracketed the source. Cross-correlation, well known in the art, is then used to take a numerical measure of shifted signal correlation to determine location of the source. However, the above is based on the assumption that the received signals are merely time-shifted replicas of the original noise signal generated at the leak. If the signal degrades over time, correlation would be severely degraded, and the estimate of leak location would be materially affected. The causes of degradation could be, for example, (a) frequency dependent attenuation, (b) multiple possible modes of wave transmission, and (c) velocity dispersion with each mode (i.e. frequency dependent wave velocity).

All other systems require bracketing of the leak. While cross correlation techniques are still used, these methods alone still do not account for the multi-modal dispersion. Pipes are particularly highly dispersive, which severely affects the temporal dependence of the source signal. The greater the distance from the source, the greater the effects of dispersion on the signal. If the medium is non-dispersive, cross correlation works fairly well. The operator finds a peak in the signal after cross-correlation. The peak indicates time delay and by knowing the speed of sound through the pipe, location of the source of sound can be derived. If the medium is dispersive, however, it is harder to determine the peak or time delay from the signal received because of multiple modes of propagation that will be in the received signal.

Therefore, current acoustic emission methods, are advantageous because they are passive, non-destructive, can be used on existing pipeline, and are not hugely costly. These methods compare signals from pairs of acoustic transducers. However, it truly is an art to divine results from the signals. One needs to be expert. But even an expert will be unable to create a multi-modal analysis with a degree of accuracy. Also, background and system operational noise deflates signal-to-noise ratios (SNRs), depending on frequency. Current acoustic emission systems can not detect desired limits of leak size (0.1 gal/hr) unless sensors are very close and ambient noise fairly low. It is difficult to separate ambient noise from the signal produced by the leak. The best signal to noise ratio is when the leak is noisy compared to ambient noise or operational noise. This can not be controlled, most times. Therefore, even acoustic detection will probably be done during system shutdown to reduce ambient noise.

Thus, even though acoustic emission location detection methods are promising, there are problems or deficiencies in the art.

Objects, Features, Advantages of the Invention

It is therefore a principle object of the present invention to present a method and apparatus which solves or improves over the problems or deficiencies in the art.

Some specific objects, features or advantages of the present include an apparatus and method which:

a) can be used to monitor all media which conducts energy propagating in waves for such energy;

b) can be used to monitor leak location in underground or submerged storage;

c) can be used to monitor leaks in underground or submerged pipeline;

d) is more sensitive and more accurately estimate source location of propagating waves in a medium;

e) work using any wave propagation mode type (symmetric or non-symmetric);

f) isolate a particular mode or modes, even in the presence of a large number of modes;

g) is non-intrusive, and non-destructive;

h) allows relatively few sensors;

i) is retrofittable to existing structures;

j) do not need experts, but rather is operable by technicians;

k) can be portable or automatic;

l) does not require down time or evacuation of lines or containers;

m) can both detect and locate sources;

n) can pick out the location of propagating waves from ambient or operational noise in signal processing;

o) takes into account propagation characteristics of the medium, including highly dispersive medium;

p) is relatively economical and efficient.

These and other objects, features and advantages of the invention will become more apparent with reference to the accompanying specification and claims.

SUMMARY OF THE INVENTION

The present invention includes a method for determining source location of a waveform energy as carried through a medium conductive of that energy. The conducted waveform energy is detected simultaneously at a plurality of points along the medium and recorded as a signal. Modes of propagation of the energy through the medium is/are isolated. Generalized cross-correlation is applied to the gathered signals from the measurement points. Source location is derived from the generalized cross-correlation. The isolation of the modes and application of generalized cross-correlation provides much better and consistent source location estimates, regardless of the dispersive properties of the medium under investigation.

The invention is particularly effective for dispersive mediums. One embodiment of mode isolation involves utilizing spatial and temporal Fourier transformation of the received signal. Generalized cross-correlation is then used to derive source location.

The apparatus according to the invention includes a plurality of sensors that can detect and transduce the wave energy into an analog signal. The plurality of sensors can be mounted in an array in a framework. The sensors are connected to a multi-channel data acquisition device that can simultaneously receive continuous output from each sensor and combine those outputs into a signal. Preferably, the device converts the sensor outputs from analog to digital information. A signal processor is operatively associated with the data acquisition device and configured to operate on the sensor signals to isolate modes of propagation and perform generalized cross-correlation on the isolated modes to derive source location. An output device can provide source location to the operator of the apparatus.

BRIEF DESCRIPTION OF THE DRAWINGS

FIG. 2a is a graph of an acoustic source actin in the center of the pipe of FIG. 1, where the source is a well-defined acoustic pulse.

FIG. 2b is a graph of a signal received at a transducer of FIG. 1 at a first distance from the source of FIG. 2a.

FIG. 5 is a plot of multi-modal pipeline dispersion properties in a spatial/temporal frequency plane.

FIGS. 7a–d are plots of the contribution of four individual modes of propagation to the signal at 10 feet from the source.

FIGS. 9a and b are plots of cross-correlation outputs of an ideal pipeline.

FIGS. 20a and b are diagrammatic views of two different transducer and data acquisition configurations.

FIG. 20d is a diagram of an alternative transduction configuration.

DETAILED DESCRIPTION OF THE PREFERRED EMBODIMENT

A. Overview

Figure 1:
FIG. 1 is a diagrammatic view of a pipe and two transducers relative to a leak in the pipe.

To provide a better understanding of the invention, a preferred embodiment will now be described. This embodiment is but one form the invention can take and is exemplary only.

Reference will be taken from time to time to the drawings. Reference numbers, characters, or labels may indicate certain parts or locations in the drawings. The same references will indicate the same parts or locations throughout the drawings unless otherwise indicated.

The preferred embodiment will be described in the environment of acoustic emission source location. In particular, it will be discussed relative to locating leaks in underground pipes. Detection and location of cracks in plate will also be briefly discussed.

By way of background and to assist in understanding of the preferred embodiment, reference should first be taken to FIGS. 1–10. FIG. 1 diagrammatically depicts a 2 inch diameter infinitely long pipe (filled with water) and buried in the ground. Two acoustic sensors A and B are placed in contact with the pipe by digging holes in the ground and exposing the pipe at those locations. A leak is assumed where shown in FIG. 1. For simplicity of this initial discussion, assume it produces a very short duration acoustic pulse that is propagated down the pipe with uniform velocity c, in this case without distortion of its temporal dependence other than a temporal shift. Note however, that leaks in reality produce a continuous noise. The purpose of this preliminary discussion, which uses the example of a short pulse, is to illustrate how the system responds to such a pulse when propagated through a dispersive medium. The response from such a pulse defines the impulse response for the system. This impulse response is the foundation of a Fourier analysis of the system. This discussion will then be expanded to deal with system response to actual leak noise.

The position of the leak, as assumed above, could then be deduced by noting the difference between pulse arrival times at positions A and B (see FIG. 1). Simultaneously arrivals would indicate a leak midway between the sensor. Arrival at A preceding arrival at B by an interval t indicates a source location t*c/2 closer to A, measured from midway.

Consider now a real leak producing a continuous noise signal rather than a short duration pulse. In this case, the ideal non-distorting transmission line would provide time-shifted replicas of the leak signal at measurement points A and B. Leak location could be performed by overlaying the two received signals and shifting one of the signals in time until the two signals coincide. The time shift required for coincidence would indicate the leak location, in like fashion to the short duration pulse case. Cross-correlation algorithms implement this procedure through a numerical measure of shifted signal correlation.

The cross-correlation procedure is premised upon the received signals being time-shifted replicas of the original noise signal generated at the leak. Should the temporal dependence (i.e. "shape") of the signals distort significantly over distance by other than a temporal shift, the correlation between signals at the proper time shift could be seriously degraded. As previously mentioned, such distortion of signal shapes over propagation distance occurs in piping systems due to three sources: 1) frequency-dependent attenuation, and 2) multiple possible modes of wave transmission, and 3) velocity dispersion within each mode (i.e. frequency dependent wave velocity). The effect of multi-mode dispersive propagation on transmitted signals is known to be quite severe in liquid-filled pipes.

Figure 2B:
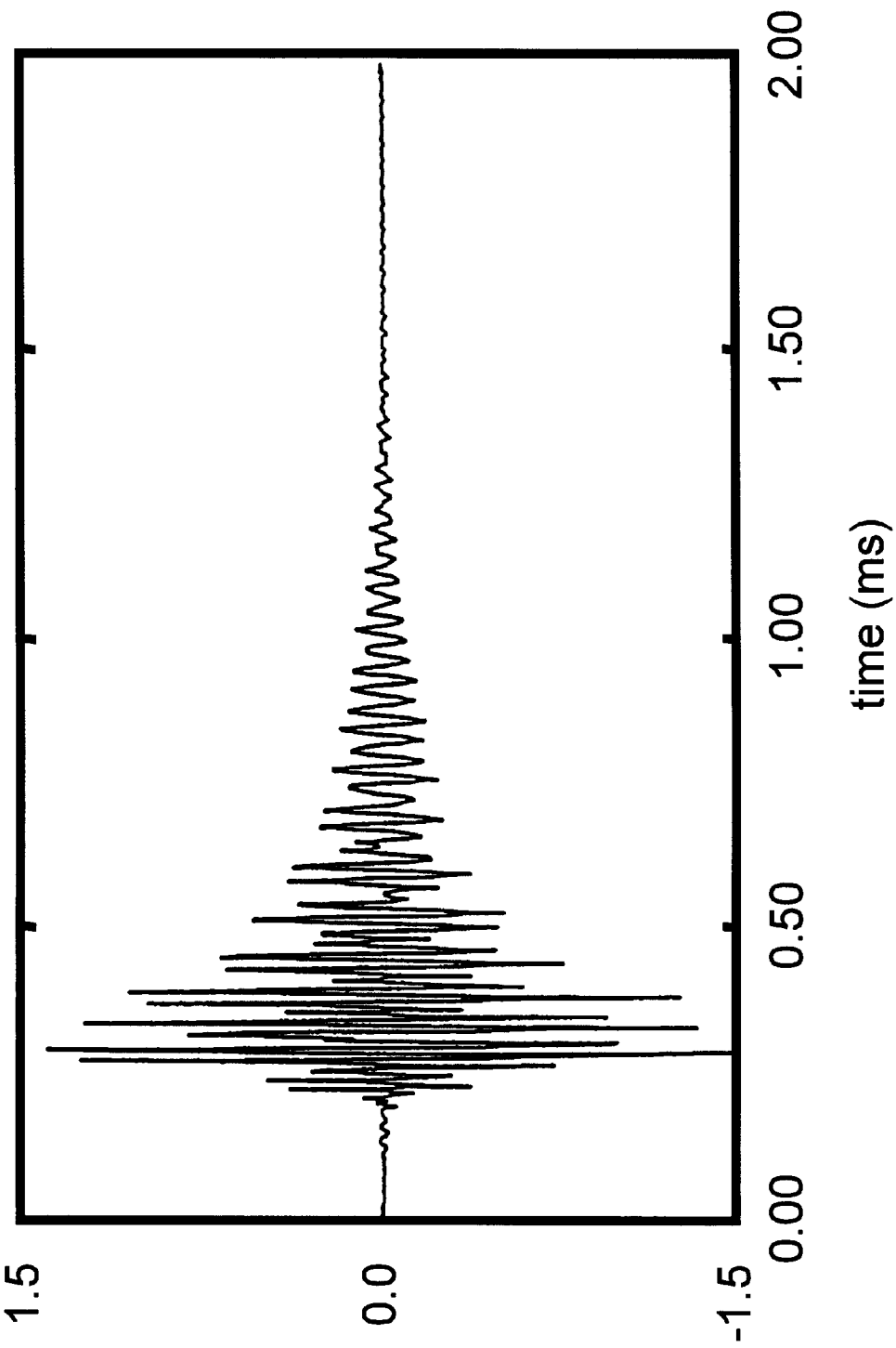
Figure 2C:
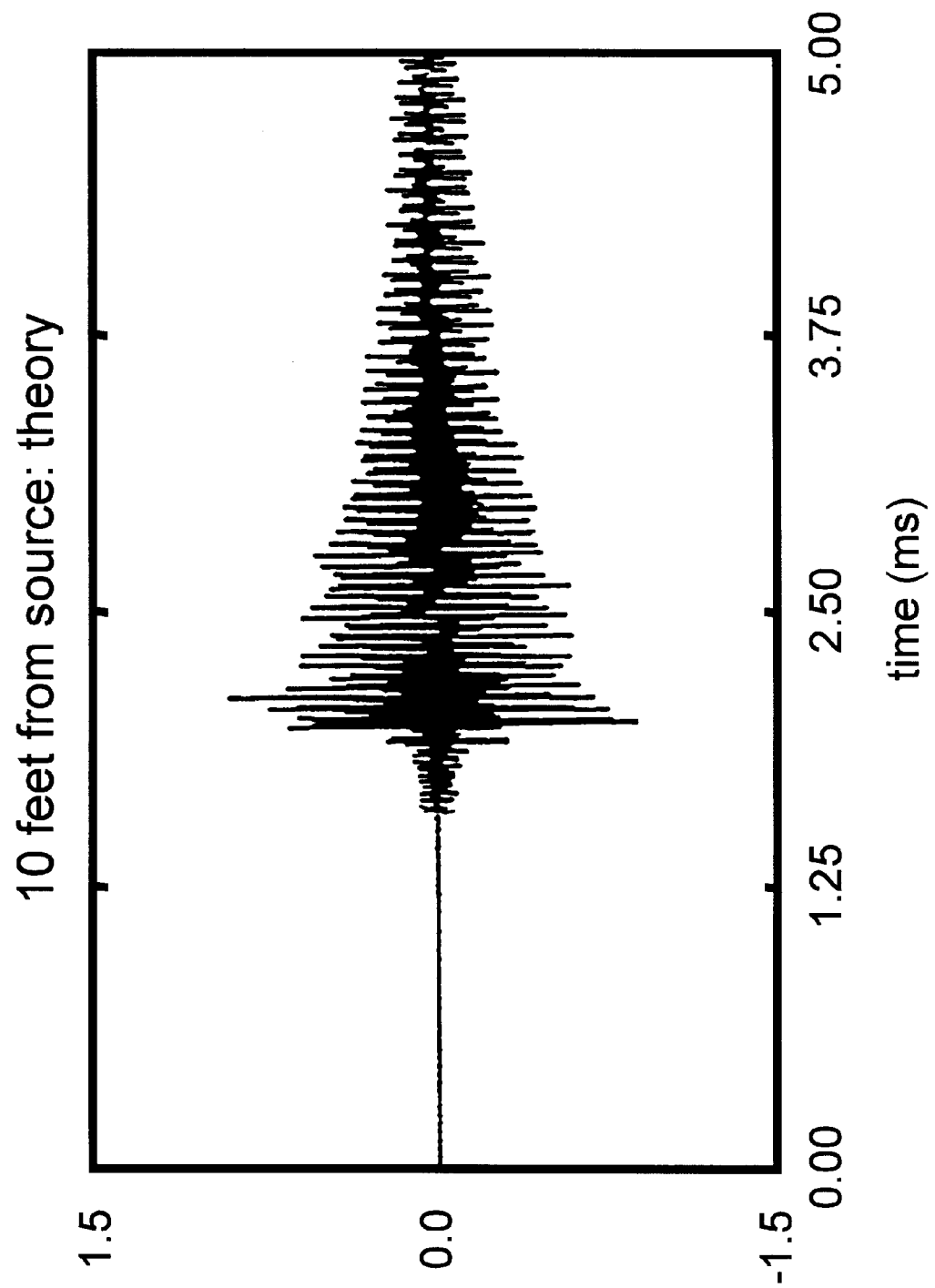
FIG. 2c is a graph of a signal received at a transducer of FIG. 1 at a second distance from the source of FIG. 2a FIG. 3a is a graph of a signal similar to FIG. 2a recorded by an accelerometer at a location along the pipe of FIG. 1.

Computations are presented for a 2 inch water filled steel pipe surrounded by air. The time dependence of a source acting in the center of the pipe is shown in FIG. 2a. It is seen to have a very short time duration (note expanded time scale). The signals received for this source at positions of 1.25 and 10 feet down the pipe are shown in FIGS. 2b and 2c, respectively. (Note differing time scales. Vertical scales are directly comparable.) These signals are assumed proportional to the vibrational displacement of the outer pipe wall. That is, the signal is assumed to be propagated from the center of the cross-sectional area of the fluid. The severe distortion of the temporal dependence of the signal due to multi-mode dispersion is clearly evident.

Figure 3A:
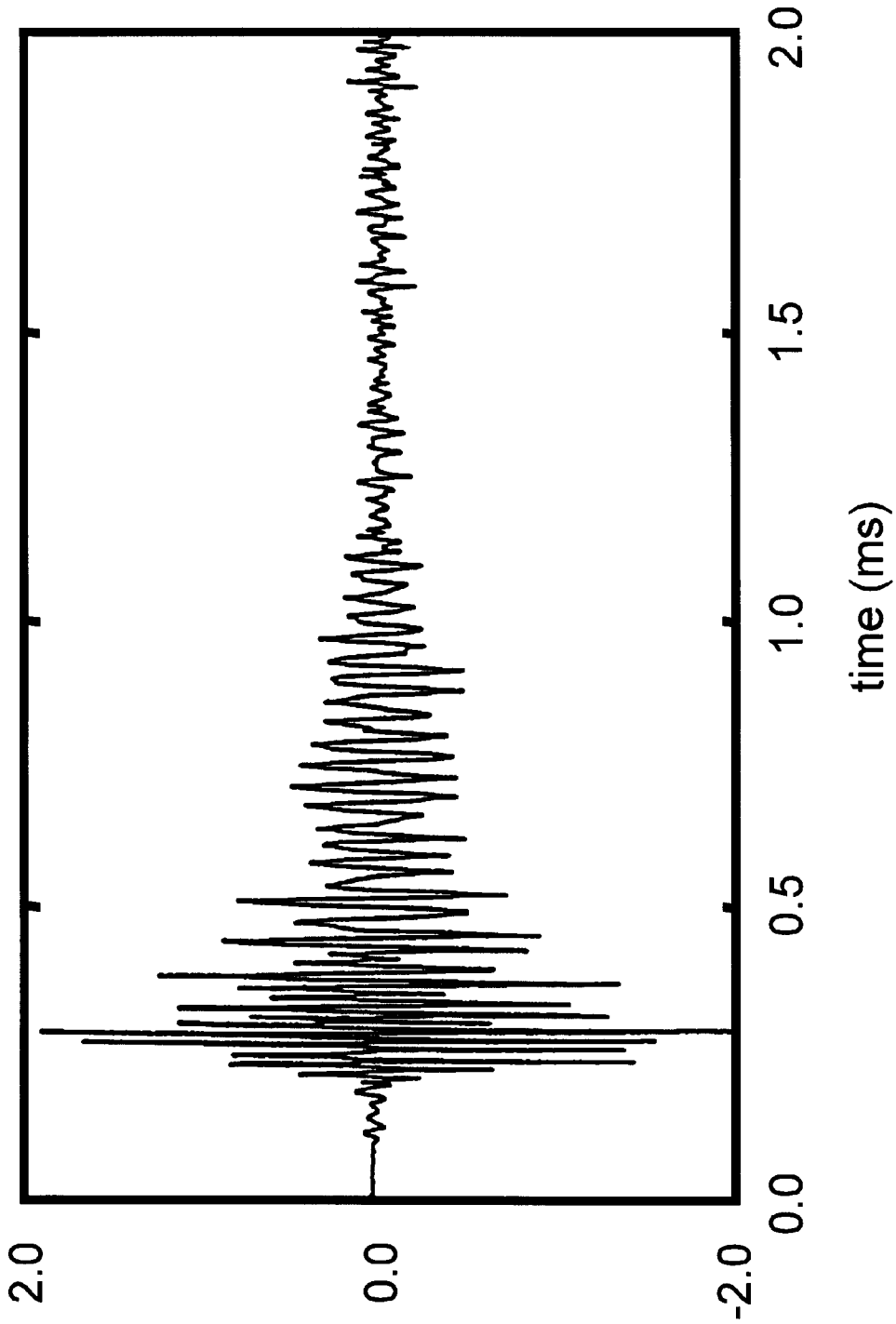
FIG. 3b is a similar to FIG. 3a except showing a measurement at a different distance.
Figure 3B:
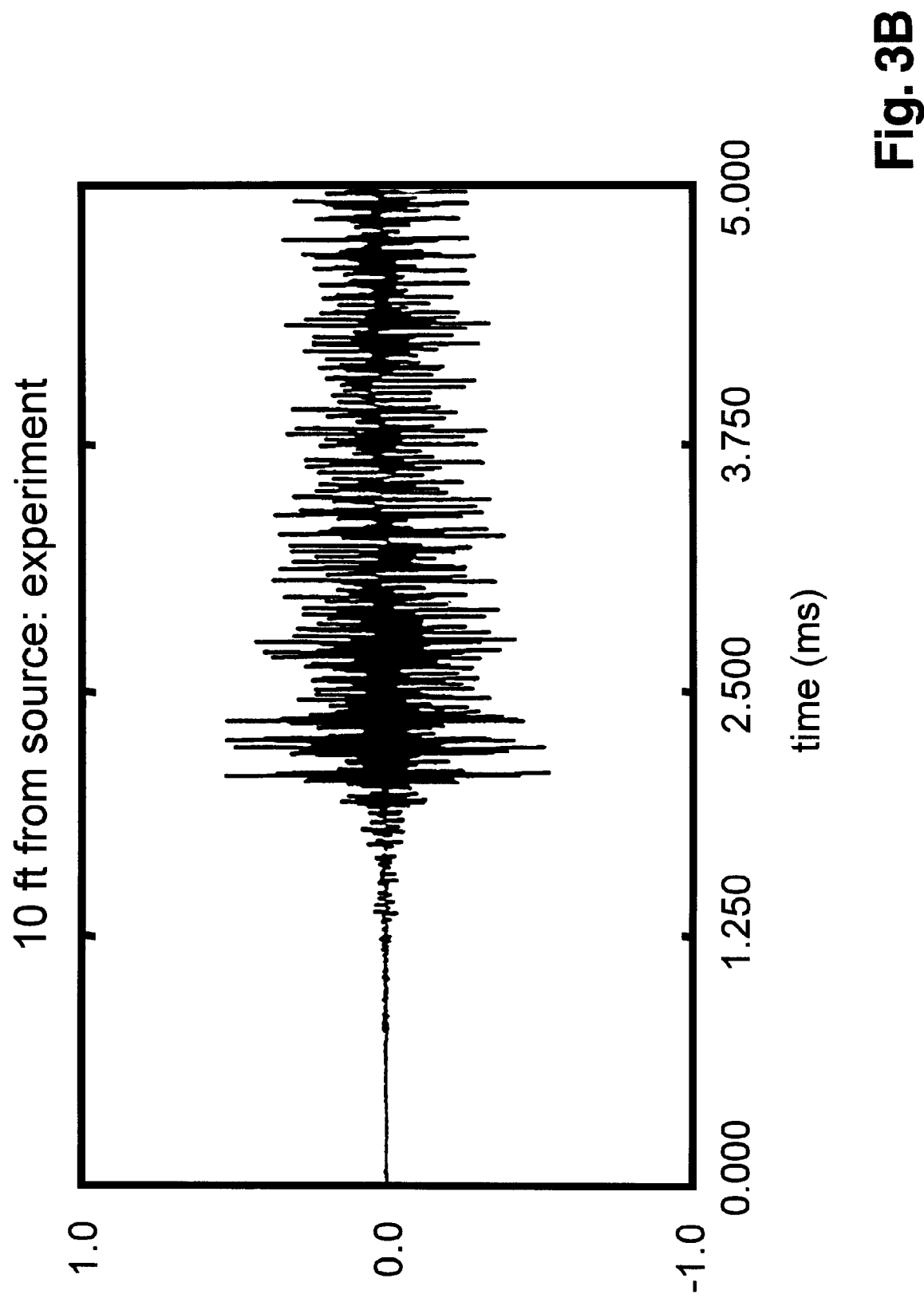

Corroborating experiments were carried out in which a broadband pulse similar to FIG. 2a was coupled into the end of a water filled 2 inch pipe using a 500 kHz center frequency broadband ultrasonic transducer in contact with a thin rubber membrane stretched over the end of the pipe. Signals were recorded by an accelerometer in contact with the pipe wall at various locations along the length of the pipe. Responses were band-pass filtered between 1 to 100 kHz. Results at 1.25 and 10 feet are shown in FIGS. 3a and 3b, respectively. Note the similarity to FIGS. 2b and 2c in the temporal spread in the signals. (Note different time scales. Vertical scales here are not directly comparable). Agreement is best at the shorter 1.25 foot propagation distance. At 10 feet, the signal is contaminated at longer times (−>3 ms) by multiple end reflections within the 20 foot section of pipe used to collect this data. A key experimental development was the implementation of an efficient yet non-intrusive means of sensor-to-pipe coupling. Clamping sensors onto the pipe using U-bolt saddles introduced a significant perturbation in the transmission line impedance, thus contaminating the comparison. Good results were obtained using short conical steel waveguides with 0.15 in. dia. contact spots machined to mate the pipe wall. "See, e.g. FIGS. 10A and 10B".

Figure 4:
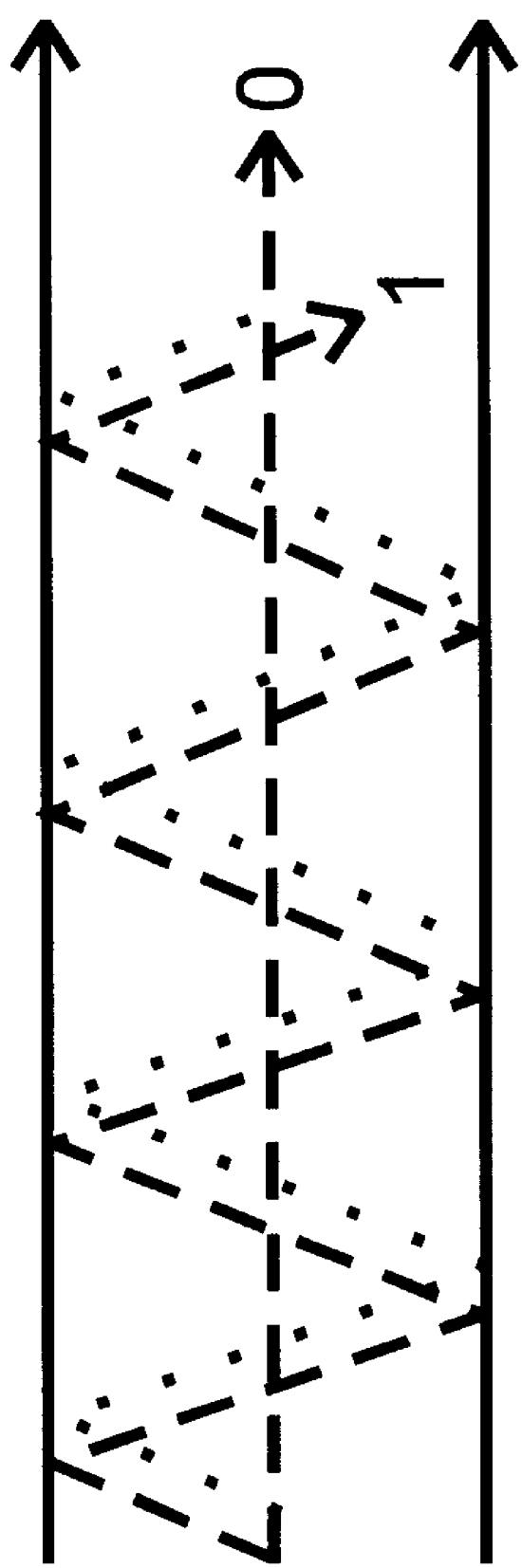
FIG. 4 is a diagram illustrates modes of propagation through a pipe of acoustic energy.

Understanding the complexity of the signals presented in FIGS. 1 and 3 is aided by an examination of the modal components of the signal. Theory states that outside the immediate vicinity of the source, energy is carried by multiple modes of wave propagation. The concept underlying these modes of propagation is depicted in FIG. 4., representing two dimensional wave propagation between parallel rigid boundaries. The most straight-forward propagation path is parallel to the boundaries, indicated as mode 0. Other possible paths can exist, however, involving multiple reflections between the boundaries. Such paths exist when horizontally neighboring points on all equally spaced rays (as depicted by the dashed and dotted lines) display a constant phase difference, assuming phase is restricted to a single $-\pi$ to $\pi$ branch. Straightforward geometric consideration reveals that for a given frequency, a finite number of such paths can exist, each having a specific ray angle with respect to the boundary. Clearly, the net velocity of propagation parallel to the boundary will depend on this angle. For example, to traverse a given distance parallel to the boundary, the raypath distance traversed for an angle close to perpendicular to the boundary is much longer than the mode zero path. A significant dependence of propagation velocity on frequency would therefore be expected. More lucid but lengthy descriptions of waveguide modes are found in most texts covering wave propagation.

The fluid-filled pipe problem under consideration is considerably more complicated than the depiction of FIG. 1, due to elastic wave mode coupling at the solid pipe wall-fluid interface. However, the description of FIG. 1 is a substantial aid in interpretation of what follows. A plot indicating possible modes of propagation for a given frequency is presented in FIG. 5. The horizontal axis plots temporal frequency. The vertical axis plots spatial frequency. Spatial frequency refers to the frequency of waffled oscillation as the pipe is traversed spatially for a frozen point in time. The plotted curves show where in the spatial-temporal frequency plane allowable modes of propagation lie. The phase velocity of a particular mode is obtained as the ratio of its temporal/spatial frequency coordinates in FIG. 5, whereas the energy (or group) velocity is given by the reciprocal of the slope of the curves. The energy velocities are plotted in FIGS. 6a–d. The dispersion relation plots of FIG. 5 concisely present the fundamental propagation characteristics of the pipeline.

Figure 6A:
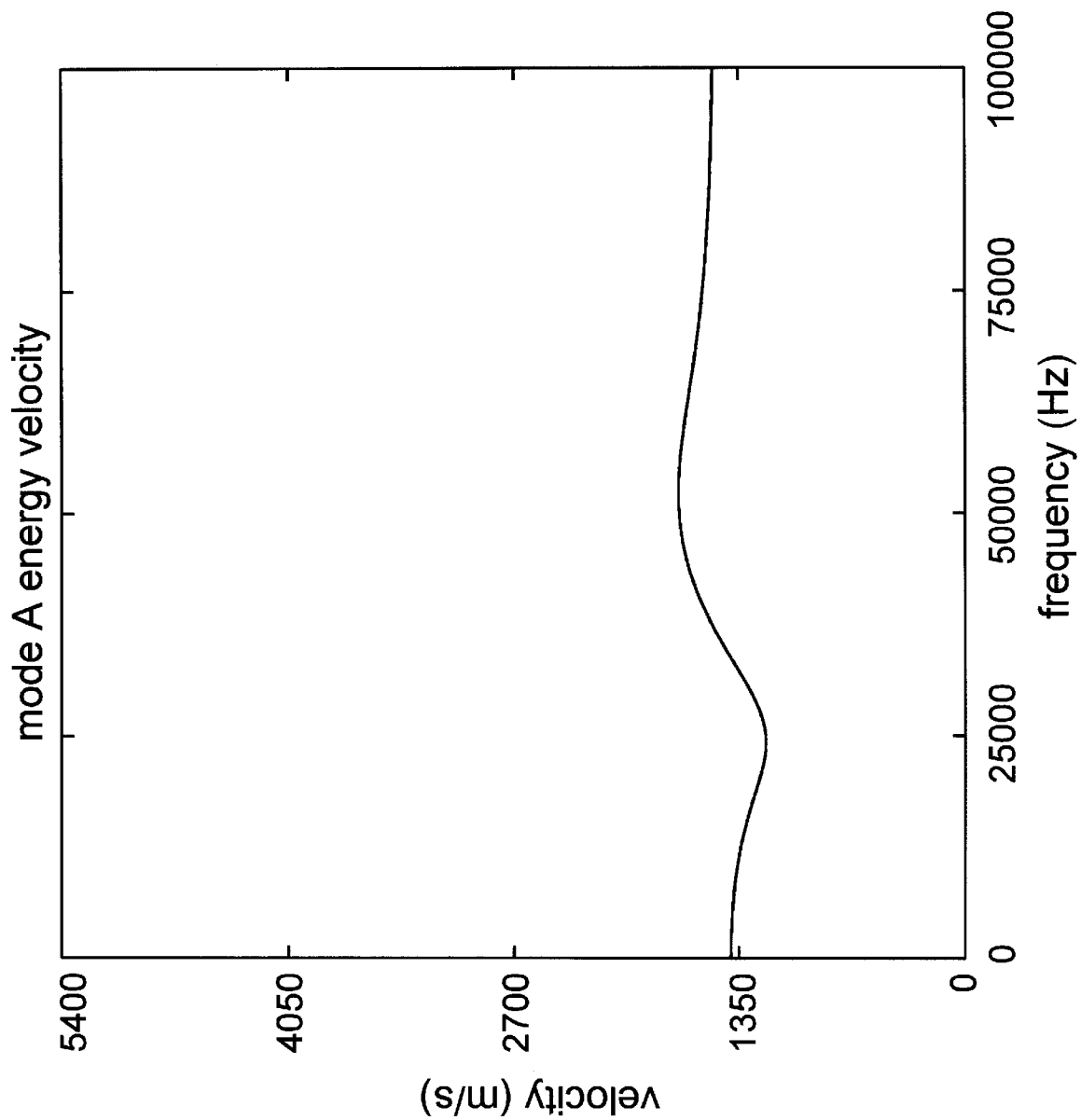
FIGS. 6a–d are plots of energy velocities of the individual modes of FIG. 5.
Figure 6B:
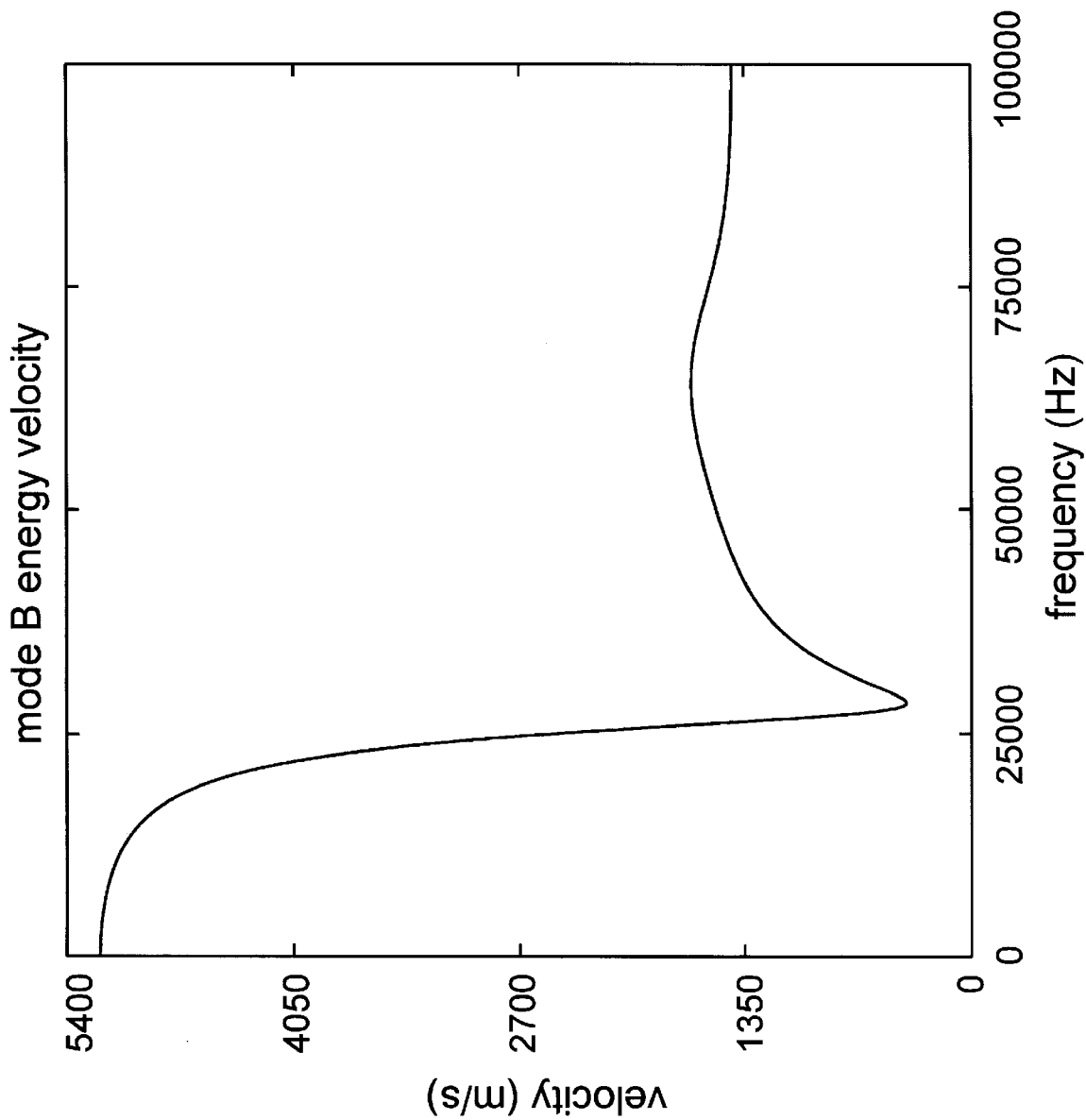
Figure 6C:
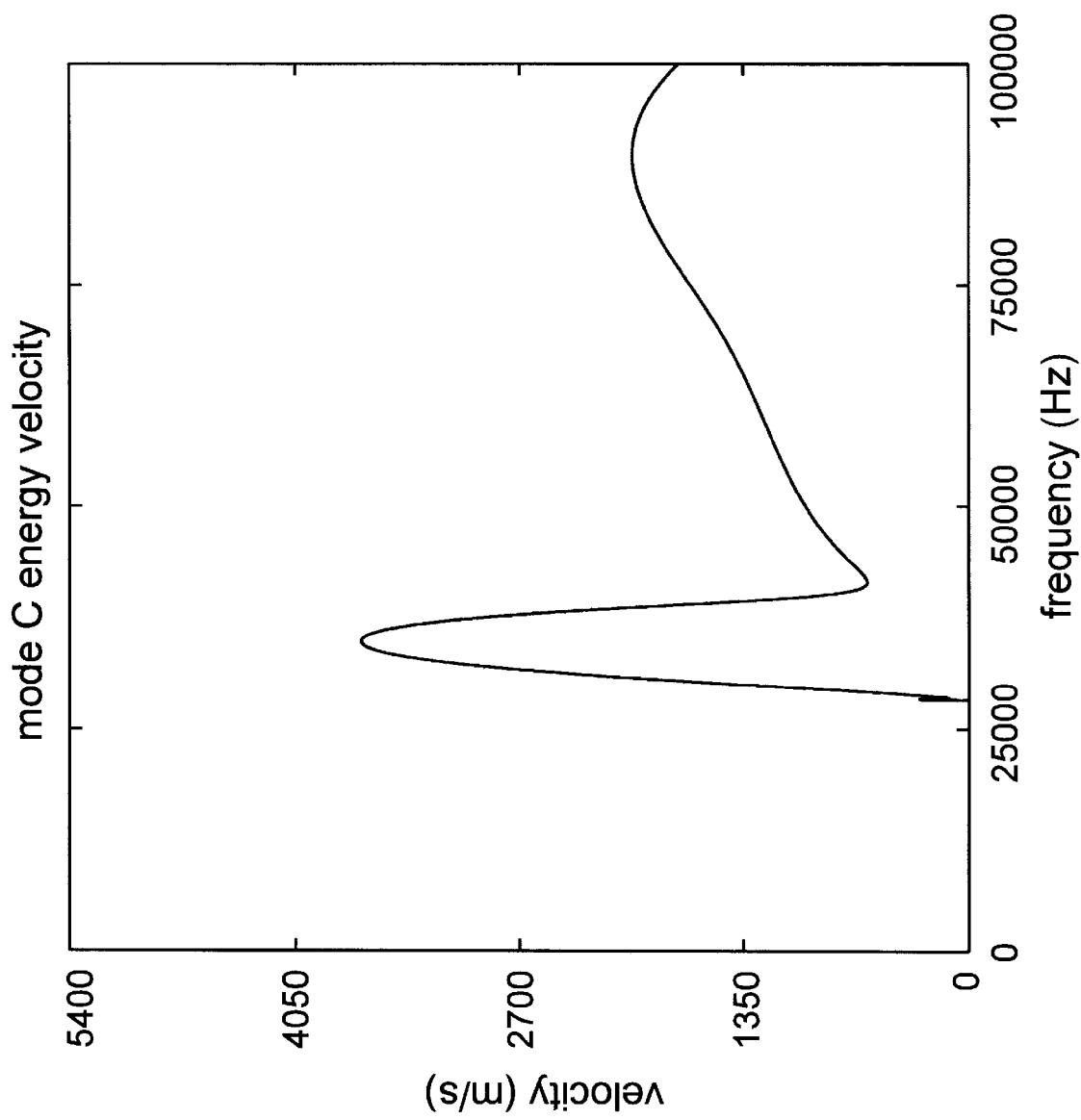
Figure 6D:
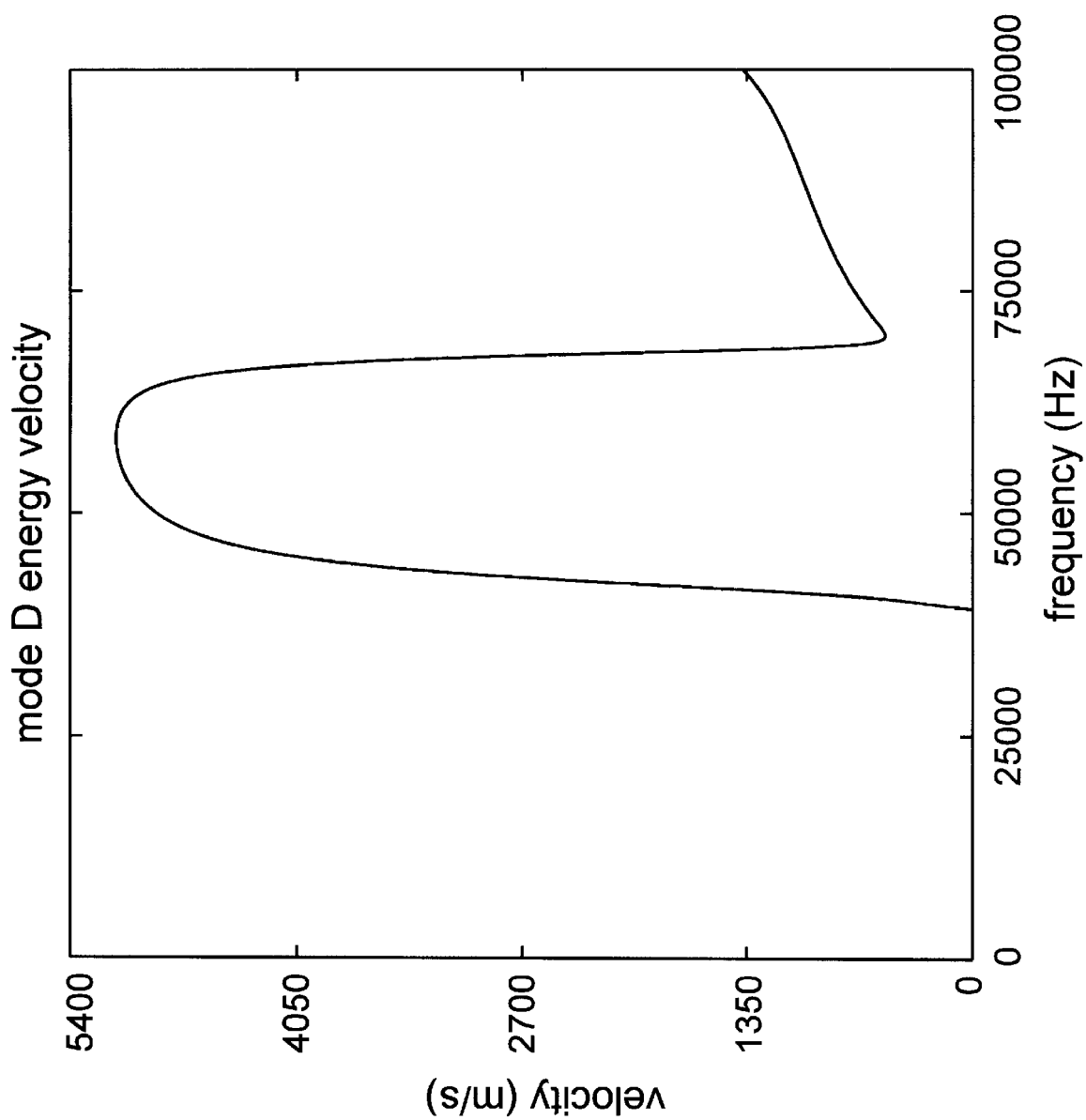
Figure 7B:
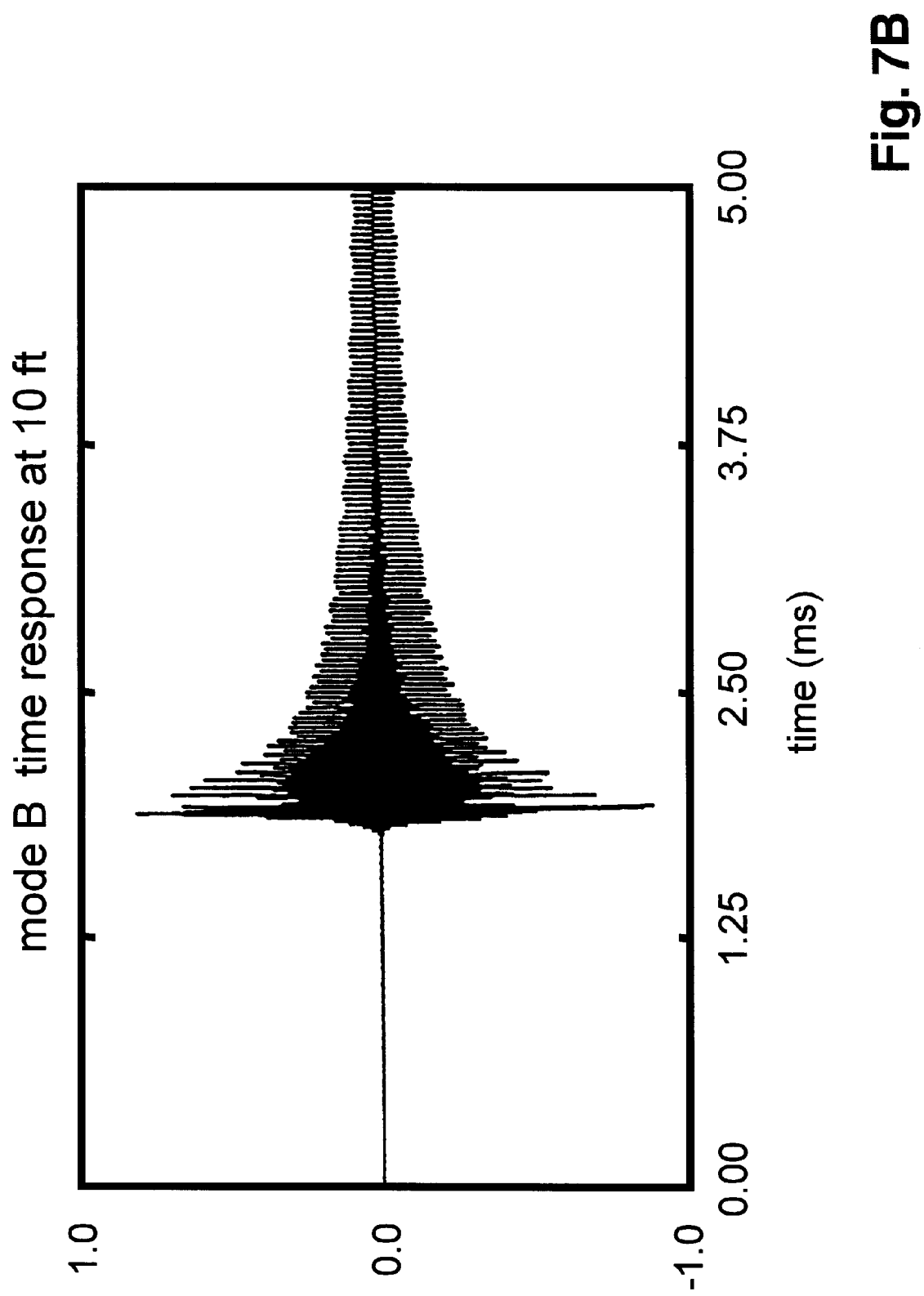
Figure 7C:
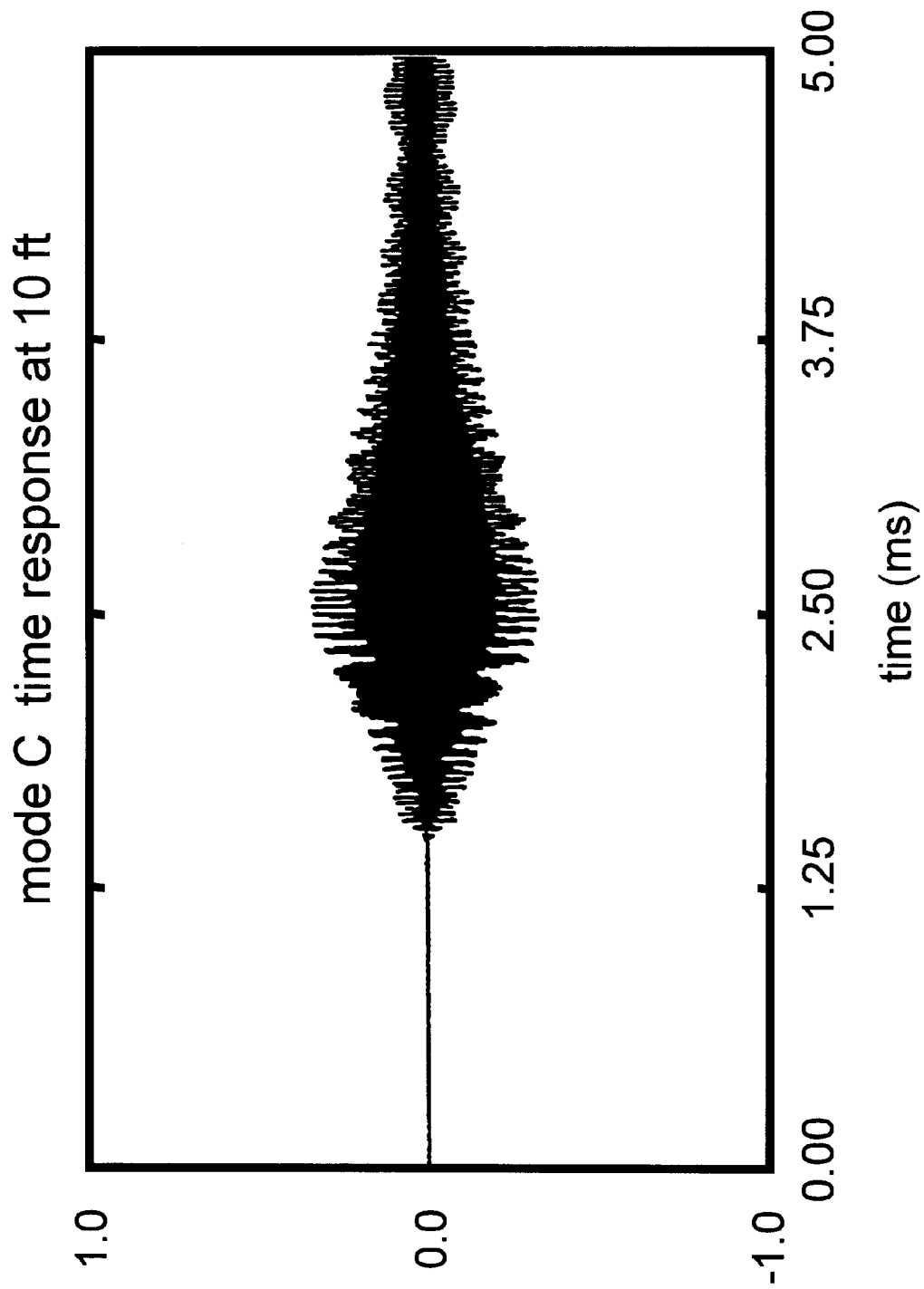
Figure 8A:
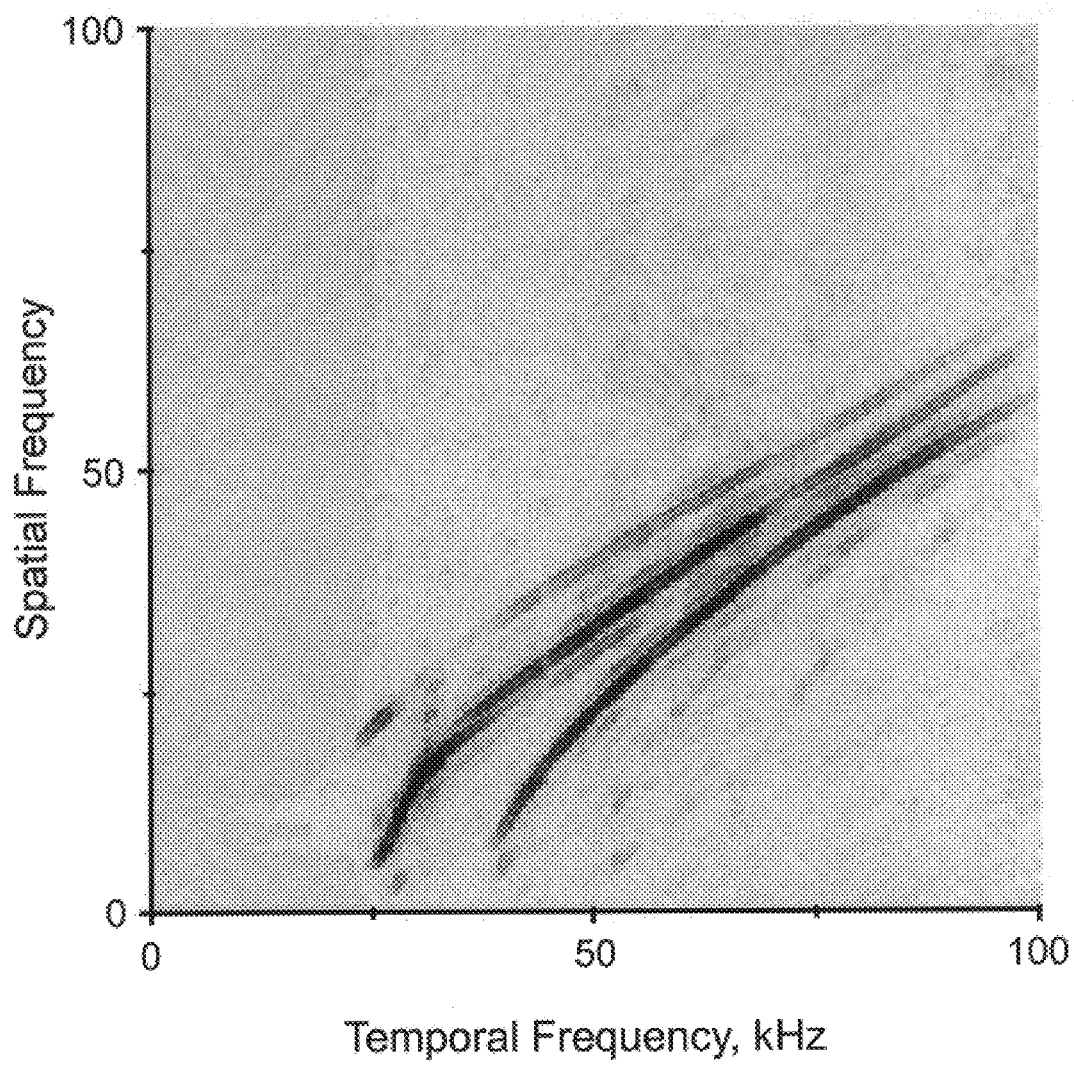
FIG. 8a is a plot in the spatial/temporal frequency plane of experimental dispersion curves for the signals of FIG. 3.
Figure 8B:
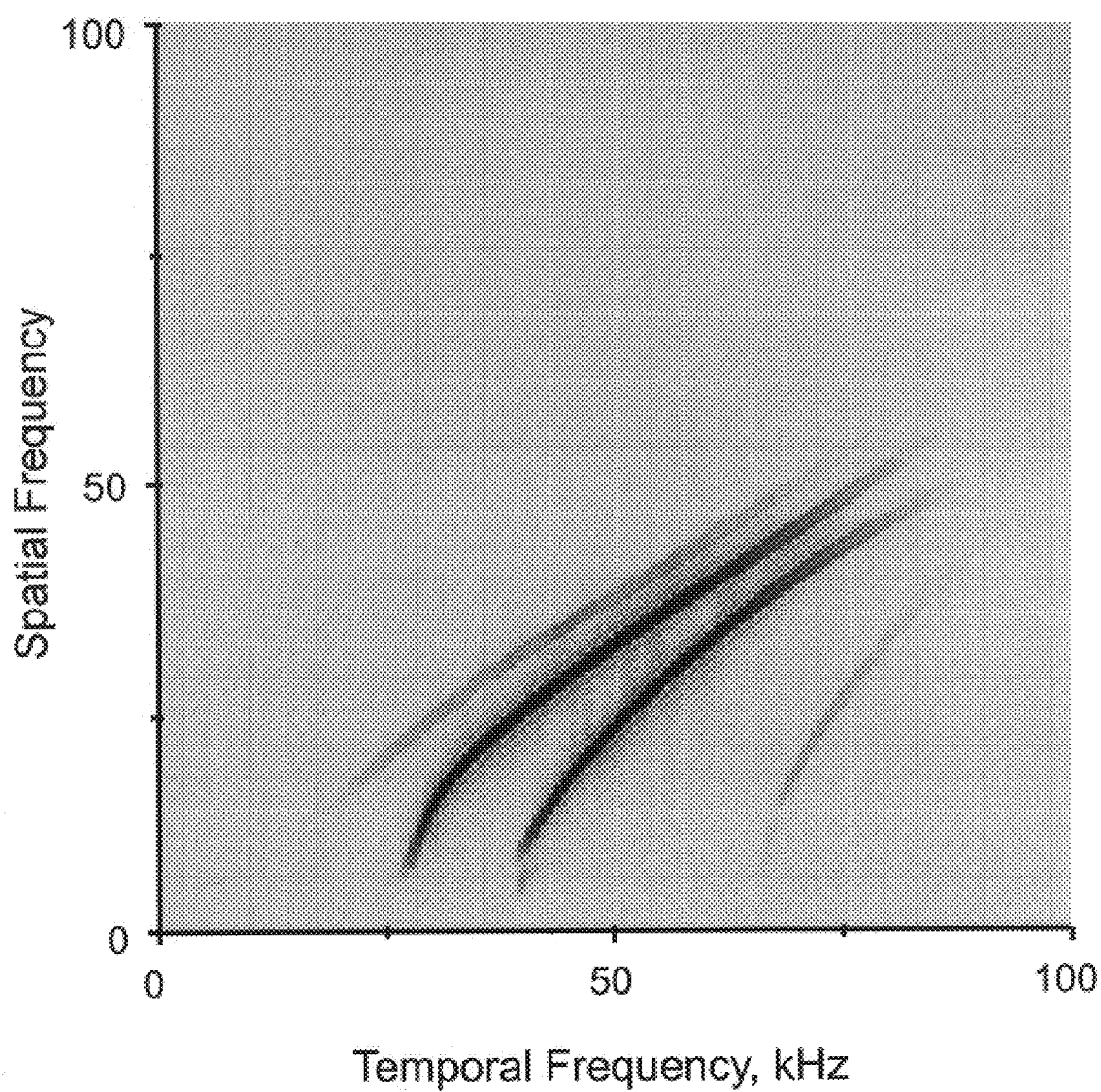
FIG. 8b is a plot in the spatial/temporal frequency plane of theoretical dispersion curves for the signals of FIG. 3.

Note that below 28 kHz, only two modes propagate. For simplicity, the upper curve is labeled mode A, whereas the lower curve is labeled mode B. Below 28 kHz, the mode B energy velocity approaches the extensional wave velocity in steel, whereas the mode A energy velocity is in the vicinity of the wave velocity in water. At 2 kHz, a third mode emerges, labeled mode C. A sharp decline in mode B energy velocity is seen in this region. The mode B energy velocity then gradually increases, reaching a peak at 64 kHz which slightly surpasses the mode A velocity. Between 31 and 39 kHz the mode C energy velocity displays a peak reaching 3700 m/s. At 39 kHz, as mode D emerges, the mode C energy velocity drops drastically, repeating the behavior observed in mode B at the emergence of mode C. These behaviors are seen to repeat for each successively emerging mode. The contribution of the first four modes of propagation to the signal received 10 feet from the source are shown individually in FIGS. 7a,b, c, and d. respectively. Mode A is seen to be the least dispersed, reflecting the relative straight nature of its dispersion curve in FIG. 5. Note that no signal is received prior to 1.75 ms, indicating a maximum energy velocity of 1710 m/s, consistent with FIG. 6a. Mode B is seen to make the largest contribution to the total received signal. A significant signal dispersion is observed in this mode, corresponding to the significant curvatures displayed by the dispersion curve in FIG. 5. Interestingly, energy received prior to 1.75 ms is visually non-detectable, indicating that mode B radial displacements below 28 kHz are negligible. Mode C displacements are likewise highly dispersed. A significant signal initiates at 1.50 ms, corresponding to a velocity of 2000 m/s. A close examination reveals a center frequency of 90 kHz in this initial signal, indicating this early signal is associated with the mode C peak in energy velocity at this frequency. A small but visually detectable signal is observed to initiate at 0.81 ms, corresponding to an energy velocity of 3650 m/s. Referring to FIGS. 5 and 6c, this early arrival indicates that very little energy is carried by mode C radial displacements below 40 kHz. Finally, mode D displacements are seen to carry little energy over the entire bandwidth of the computation. The four modes shown in FIG. 7 superimpose to produce the total signal plotted in FIG. 2c.

To further corroborate the theoretical dispersion curves in FIG. 5, an experiment was performed in which signals, such as those in FIG. 3, were collected at 1 cm intervals over a distance of 80 cm. This data is displayed in the spatial-temporal frequency plane by Fourier transformation in both time and distance along the pipe, shown as a gray-scale image in FIG. 8a. The data is seen to lie on the theoretically predicted dispersion curves. Note the larger amplitudes of the B and C mode components, as observed in FIG. 6. The same presentation is made in FIG. 8b for the computed signals as shown in FIG. 2. The location and relative distribution of waffled energy is quite similar to the experimental results further verifying the applicability of the model calculation in understanding the experiment.

The effects of multi-mode dispersion on the performance of cross-correlation leak location is now examined. In application, data processing is applied to signals originating from continuous noise sources. To model such signals, the pipeline impulse responses as presented immediately above in this description would be convolved with continuous noise signals. However, assuming an ensemble of received signals generated by white noise sources, it is straightforward to show that the ensemble average of cross-correlation output equals the corresponding cross-correlation of system impulse responses. This fact has indeed been verified by numerical simulation. Thus the effects of dispersive multi-mode propagation on cross-correlation leak location can be rigorously studied utilizing the system impulse response signals referred to in the description immediately above, without explicit consideration of noise sources.

The functioning of cross-correlation analysis is examined here for a case of sensors mounted 30 feet apart on the 2 inch pipeline, as depicted in FIG. 1. As alluded to in reference to FIG. 1, cross-correlation is intended for use with systems in which the received signals are simply time-shifted replicas of the source. For example, FIGS. 9a and b present cross-correlation outputs that would be obtained if the pipeline behaved as an ideal, single mode, dispersionless water propagation line with a velocity of 145 m/s. Source locations are assumed 15 and 10 feet from sensor A in FIGS. 9a and b, respectively. In FIG. 9a, a sharp spike is located at 0.0 ms, indicating a source midway between sensors, whereas in FIG. 9b, a sharp spike is located at −2.0 ms, corresponding to a source positioned −5 feet from midway between the sensors.

Figure 9C:
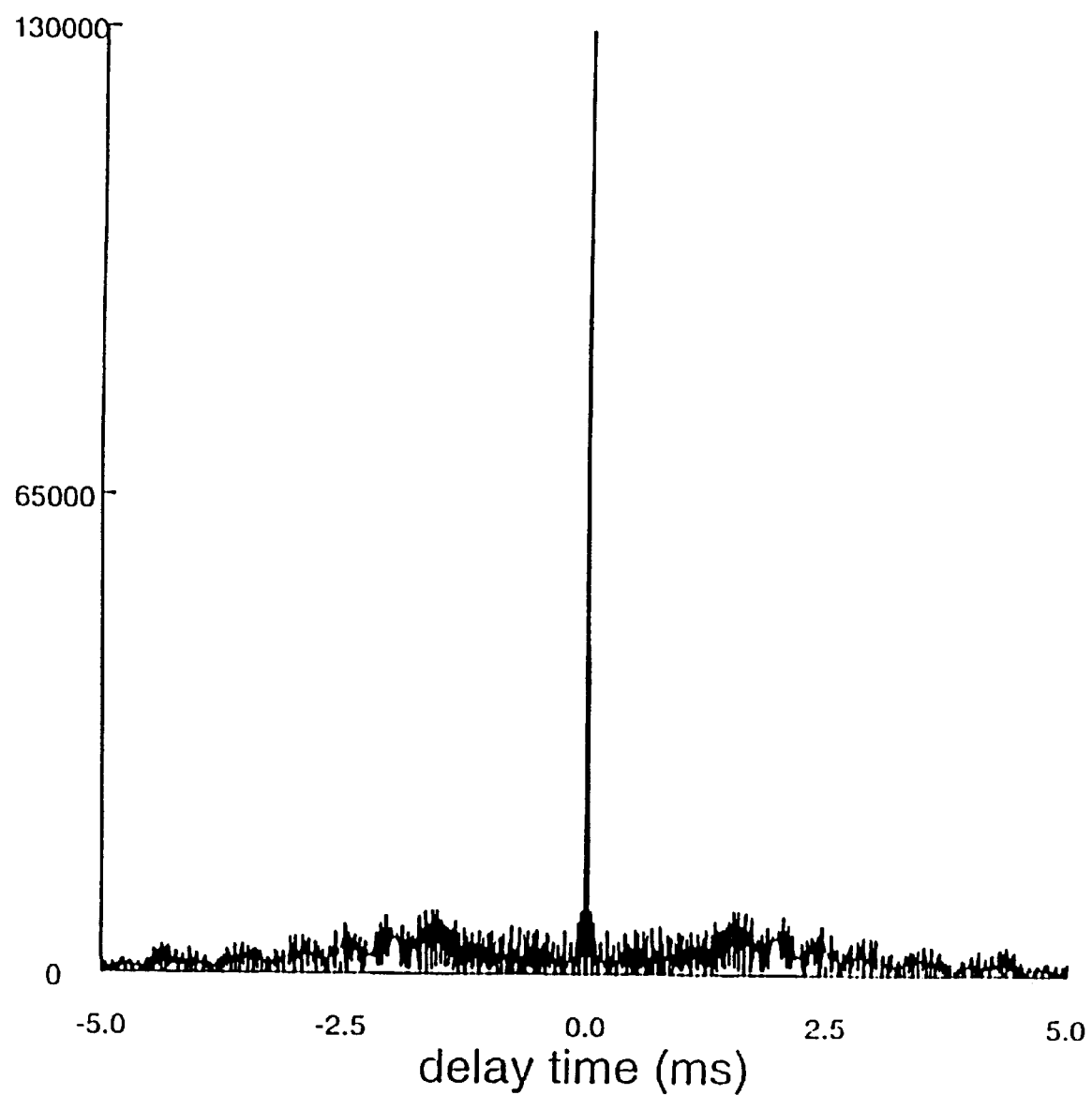
FIGS. 9c and d are plots of cross-correlation outputs of a pipeline when full multi-mode dispersive characteristics of the pipe are considered.
Figure 10A:
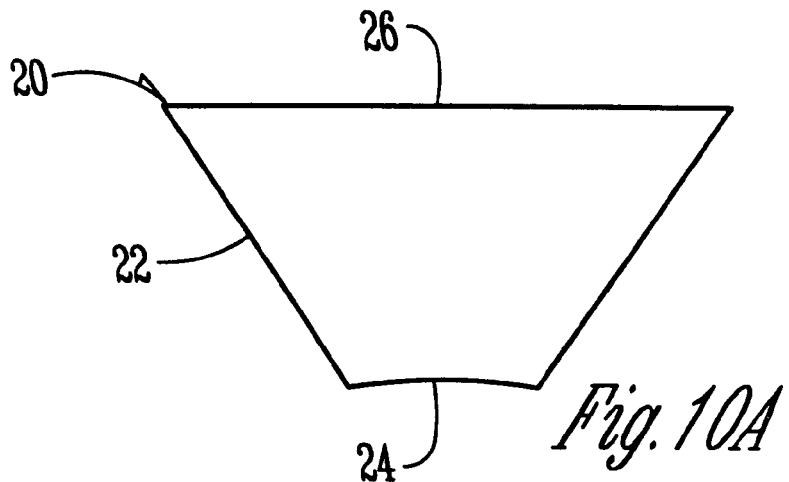
FIGS. 10a and b are side elevational and bottom plan views of a transducer tip according to a preferred embodiment of the invention.
Figure 10B:
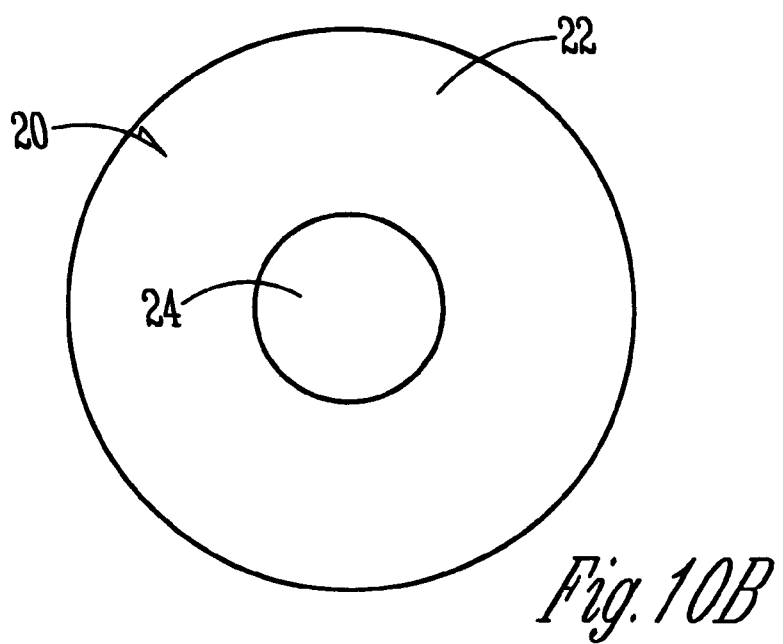

In contrast, FIGS. 9 c, d show the result of a cross-correlation output when the full multi-mode dispersive character of the pipeline is taken into account. In FIG. 9c, the source located midway is indicated by spike similar to FIG. 9a. However, for the non-symmetrically located source, FIG. 9d, the degradation in algorithm performance is clearly evident. (Note: FIGS. 9 are plotting the absolute value of the signal cross-correlation). Since energy propagates through different modes with varying velocities, a continuum of apparent source locations is predicted by this cross-correlation. In a environment void of noise, the cross-correlation output displays a peak in correlation noise amplitude at the proper source location. However, the dominant spike indicating leak location is lost due to the presence of noise found within the system. This degradation of the prominence of the spike indicating leak location could result in a significant reduction in effectiveness, particularly when considering more challenging pipeline configurations and noisy environments. State of the art leak location processing sometime works reasonably well, but in limited situations, especially in low ambient noise environments. But they simply do not work well for most situations, for example, high ambient noise conditions and/or in the presence of the effects of multi-mode dispersive propagation on signal transport.

The foregoing therefore describes the general environment of acoustic emission location detection and the problems presented by trying to use such methodology, especially in dispersive mediums such as pipes. The foregoing also describes how acoustic emissions of a leak would be transduced, how the different modes of propagation through a pipe would appear, how the transduced acoustic emissions from the leak would be simultaneously received into a combined signal, and how the different modes of propagation make it difficult to discern the source location from that combined signal. Following will be a discussion of how the sometimes complex combined signal can be evaluated for improved source location.

As discussed above, the standard approach to time-of-flight leak location is through the use of cross-correlation techniques, which, although widely used, suffer from several limitations in this application. Specifically, they do not account for the effects of multi-mode dispersion of the acoustic signal as it propagates along the pipe. The analysis assumes that received leak signals are simply time-delayed replicas of the signal generated at the source, where the time delay is directly related to the distance between the two sensors and the source. A peak in the cross-correlation function indicates the time delay and, through the speed of sound in the pipe, the location of the source. Unfortunately, real piping systems are highly dispersive, and multi-mode dispersive propagation severely affects the temporal dependence of the source signal. That is, the signal "shape" does not remain constant as it travels down the fluid-filled pipe. Further, the greater the distance from the source, the greater the effects of dispersion on the signal become.

Figure 11A:
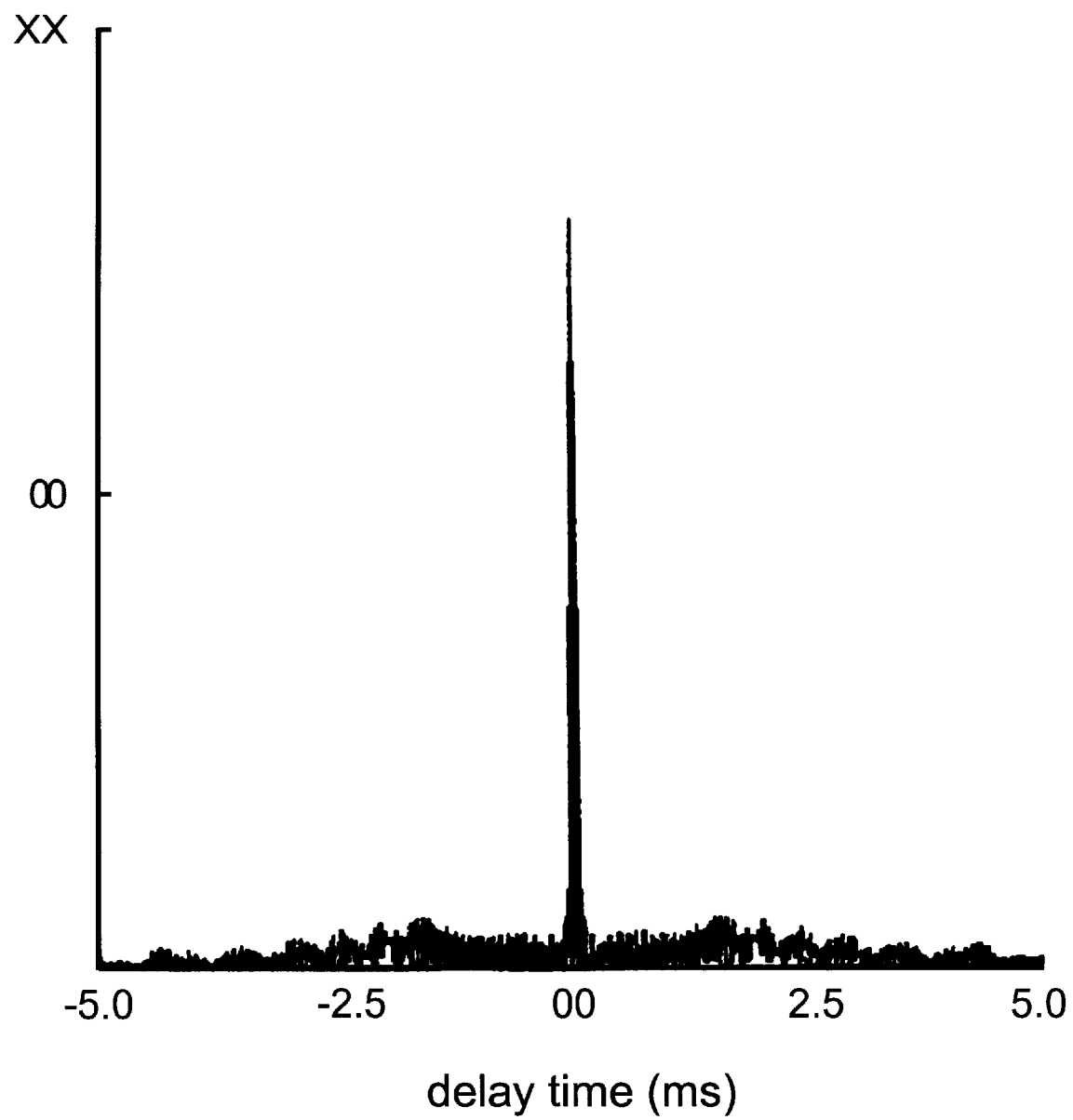
FIGS. 11a and b are plots of cross-correlation at different distances from a source in a dispersive environment.
Figure 11B:
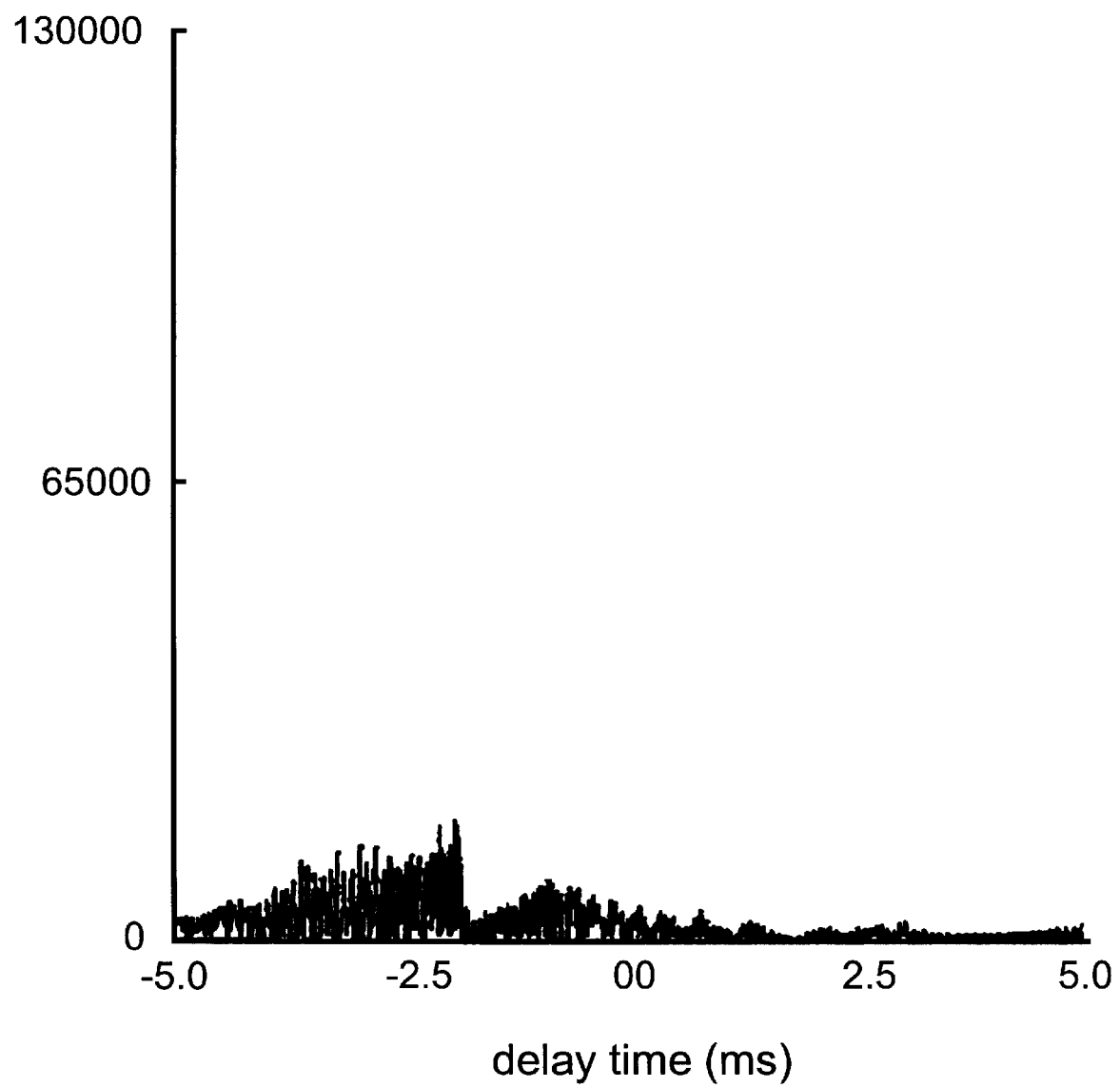

Computer simulations on a model 2" pipeline show very clearly the effect dispersion has on a cross correlation analysis. In a dispersive environment, the cross-correlation analysis does not result in delta function at the leak location as it does in an ideal (i.e. non-dispersive) system. FIGS. 11a and 11b show the results of a cross-correlation of simulated leak signals in a dispersive environment, with a leak source placed between two sensors spaced 30 ft. apart. In FIG. 11a, with the leak located exactly 15 ft. from either sensor, the source location is apparent because the signals have traveled exactly the same distance in either direction and are therefore very similar to one another. However, when the source is no longer symmetrically placed, the source location becomes more difficult to determine. Since energy in a dispersive systems propagates through multiple modes, each with a different velocity, the cross-correlation shown in FIG. 11b does not produce a well defined peak at the source location. This degradation can result in a significant reduction in cross-correlation effectiveness, and in fact becomes even more pronounced in a real system, where ambient background noise and system complications also play a role.

Solving this problem requires developing more sophisticated means of determining source location which account for the multi-mode dispersive characteristics of pipelines. To facilitate this objective, a mathematical model has been developed to describe these complex dispersion characteristics, and several possible location algorithms have been investigated which account for those characteristics in the signal processing portion of the location measurement. The model and two of the approaches are outlined below.

The present method utilizes what is called generalized cross-correlation. In typical cross-correlation, there is an assumption of non-dispersiveness of the signals. However, in the present invention using generalized cross-correlation, this restraint of non-dispersiveness is no longer assumed. The following will elucidate this concept.

To investigate the complex nature of dispersive propagation in fluid filled pipes, a model was developed around the simplest case of a point source located axi-symmetrically, i.e. radially centered, within the fluid (water) of an infinitely long 2" steel pipe surrounded by air. The work is similar to studies done by other investigators, with the addition of a third fluid outside the pipe to simulate potential back fill materials. The model utilizes the complex exponential form of the Fourier Series for a finite series in the form of:

$$\hat{V}^A(\omega) = \sum_n \hat{V}_n^A(\omega) \qquad (1)$$

$$= \sum_n A_n(\omega) e^{(ig_n(\omega) z_A)}$$

This simply states that the frequency spectra of any signal received at some sensor location A, $\hat{V}^A(\omega)$, is the sum of n nodes of propagation, where each mode is composed of an amplitude, $\hat{A}_n(\omega)$ and a phase term containing the wave number, $g_n(\omega)$, and the distance $z_A$ to the source. For a continuous noise signal, the individual mode amplitudes can be further defined by $$\hat{A}_n(\omega) = \hat{H}_n(\omega) \hat{n}(\omega) \qquad (2)$$

where $H_n(\omega)$ is the impulse response of the system, and $\hat{n}(\omega)$ is the actual leak noise signal of interest.

Velocity is dispersive, so the phase and energy velocities of each mode can be found from $$c_n = \omega / g_n(\omega) \qquad (3)$$

$$c_n^e(\omega) = \left[\frac{d(g_n(\omega))}{d\omega}\right]^{-1}$$

respectively.

Figure 12:
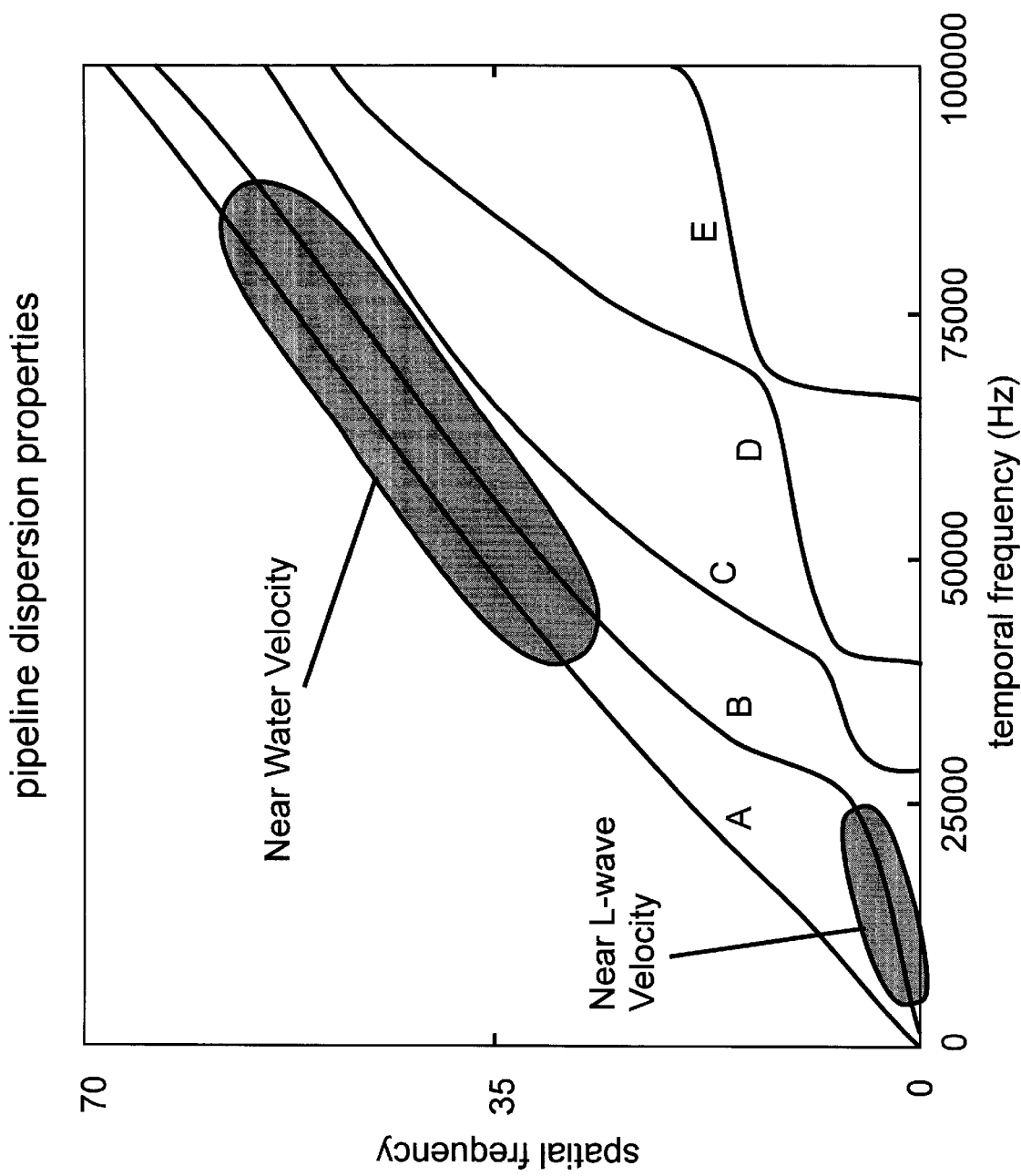
FIG. 12 is a plot of pipeline model dispersion properties.

Defined for the axi-symmetric case described above, Equation 2 can be solved for the individual modes. FIG. 12 shows the dispersion relations for the first 5 symmetric modes, labeled A–E, where the spatial frequency plotted on the vertical axis is equal to the inverse wavenumber. Note the areas of the plot showing a correlation between the modes' energy velocities and both the L-wave velocity in steel and the acoustic speed of water.

An examination of radial displacements associated with each of the individual modes A–D (not shown here) shows that mode A is the least dispersive of the modes, whereas modes B, C, and D are all highly dispersive. For the band-pass signals studied (1–100 kHz), modes B appears to make the largest contribution to the total received signal, followed by modes C, A, and D, where the mode D contribution is almost negligible. Further investigation has also shown that modes B and C, the largest contributors to the signal, carry the largest portion of their energy above 28 kHz and 40 kHz, respectively.

Figure 13A:
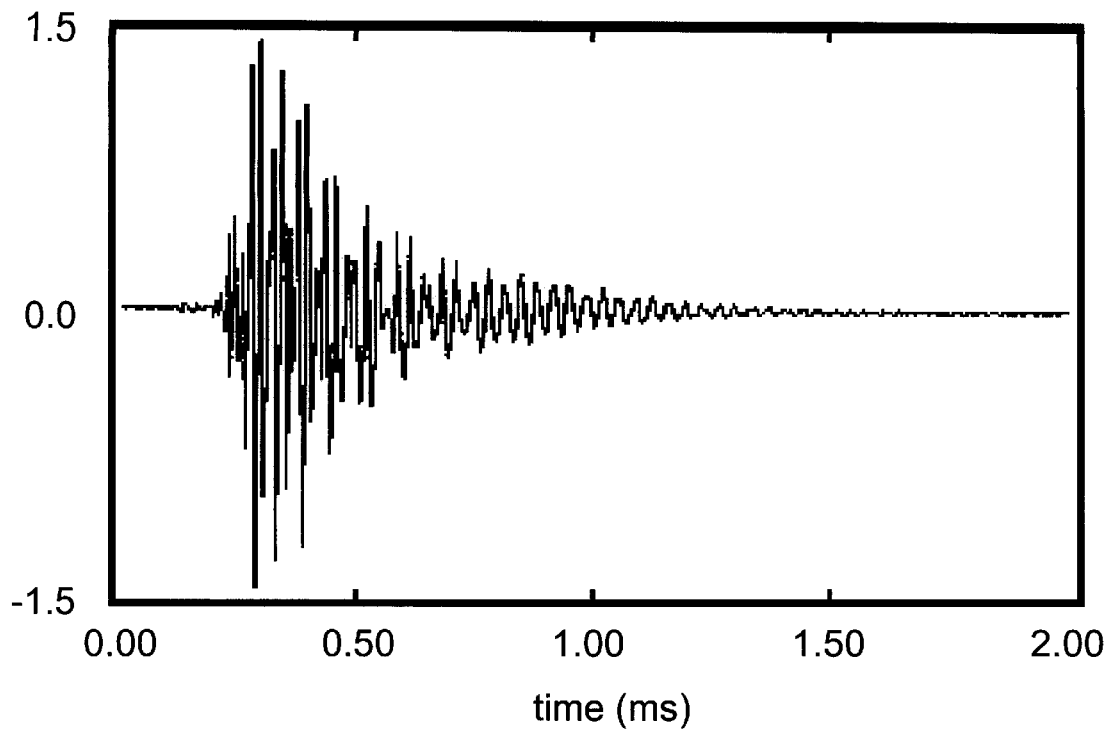
FIGS. 13a and b are plots are theoretical and experimental waveforms.
Figure 13B:
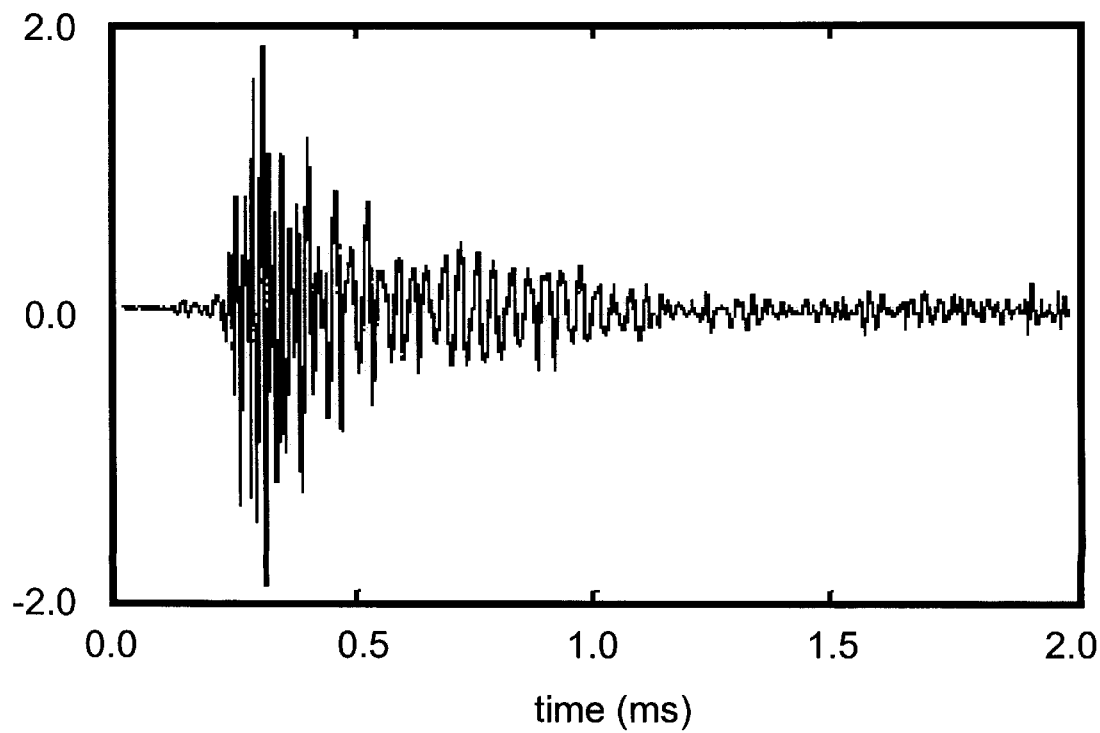

The model was corroborated by generating simulated waveforms which were then compared to waveforms collected from a test pipeline set up to match the parameters of the model, i.e., axi-symmetric source located in the fluid. In this case, a 500 kHz center-frequency, broadband transducer was coupled directly to the water through a thin rubber membrane to act as a source, while a 10–100 kHz transducer was attached to the pipe wall through a point-contact waveguide to act as the receiver. FIGS. 13a and 13b show theoretical and experimental waveforms, respectively, obtained in this way. While the amplitudes of the waveforms are not directly comparable, it is obvious that the waveforms are very similar in both structure and duration. Other comparisons at source-receiver distances up to 60 PD show similar results.

Given the previous results, the question then becomes one of actually determining the location of a leak. One possible method uses an analysis similar to that used by Allegyne, incorporated by reference above, for surface waves in flat plates. Assuming the modes presented in FIG. 12 can be isolated, we can consider the following expression:

$$\int \hat{V}_n^A(\omega) \hat{V}_m^{B^*}(\omega) e^{if(\omega)} d\omega = \qquad (4)$$

$$\int \hat{A}_n^A(\omega) \hat{A}_m^{B^*}(\omega) e^{i(g_n(\omega) z_A - g_m(\omega) z_B)} e^{if(\omega, z)} d\omega,$$

which contains the model expressions from Equation 1, at two sensor locations A and B, as well as an additional phase expression containing an arbitrary function $f(\omega, z)$. It is desired that $f(\omega, z)$ have conjugate phase of $\hat{V}_n^A \hat{V}_m^{B^*}$ when z is at the location of the leak. Note then, that if n=m (i.e. the modes are the same), $f(\omega) = g_n(\omega)(z_A - z_B)$. Remember, $z_A + z_B$ equals the distance between the sensors, which is a constant, therefore, $z_B = d - z_A$. Further, if the frequency dependent wavenumber is linear with frequency, i.e. $g_n(\omega)=\omega/k$, where k is a constant, then Equation 4 is the cross-correlation function.

To isolate the individual modes, a spatial array of time-series waveforms are collected and their spectra $\hat{V}(\omega,z)$ transformed into the temporal-spatial frequency plane $\tilde{V}(\omega,y)$ using the expression $$\tilde{V}(\omega, \gamma) = \int_{-\Delta}^{\Delta} \hat{V}(\omega, z) e^{-i\gamma z} dz \quad (5)$$

$$= \sum_n \hat{A}_n(\omega) \int_{-\Delta}^{\Delta} e^{ig_n(\omega)z - i\gamma z} dz e^{ig_n(\omega)z_A}$$

$$= \sum_n \hat{A}_n(\omega) 2\Delta \frac{\sin(\Delta(\gamma - g_n(\omega)))}{\Delta(\gamma - g_n(\omega))} e^{ig_n(\omega)z_A}.$$

Figure 14:
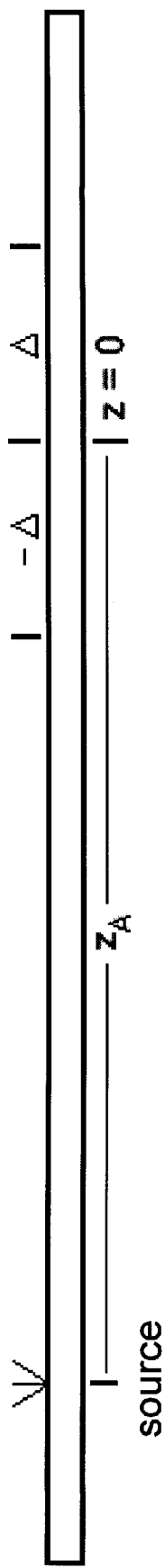
FIG. 14 is a diagram representing a pipe with a leak showing spatial data collection.

FIG. 14 illustrates the concept for a sensor located at some distance $z_A$ from the source. Close examination of Equation 5 shows that if, for sufficiently large values of $\Delta$, the spatial frequency $\gamma$ is set equal to the wavenumber of a particular mode $g_m(\omega)$, the sinc function reduces to approximately the delta function for modes n and m. That is, $$\frac{\sin(\Delta(g_m(\omega) - g_n(\omega)))}{\Delta(g_m(\omega) - g_n(\omega))} \approx \delta_{nm} \quad (6)$$

As a result, Equation 5 can be reduced to $$\tilde{V}(\omega, g_m(\omega)) \approx \hat{A}_m(\omega) e^{ig_m(\omega)z} \quad (7)$$

meaning that a transformation of a spatial data set should yield a plot of the individual modes within the signal, similar to the dispersion plot shown in FIG. 12.

Figure 15A:
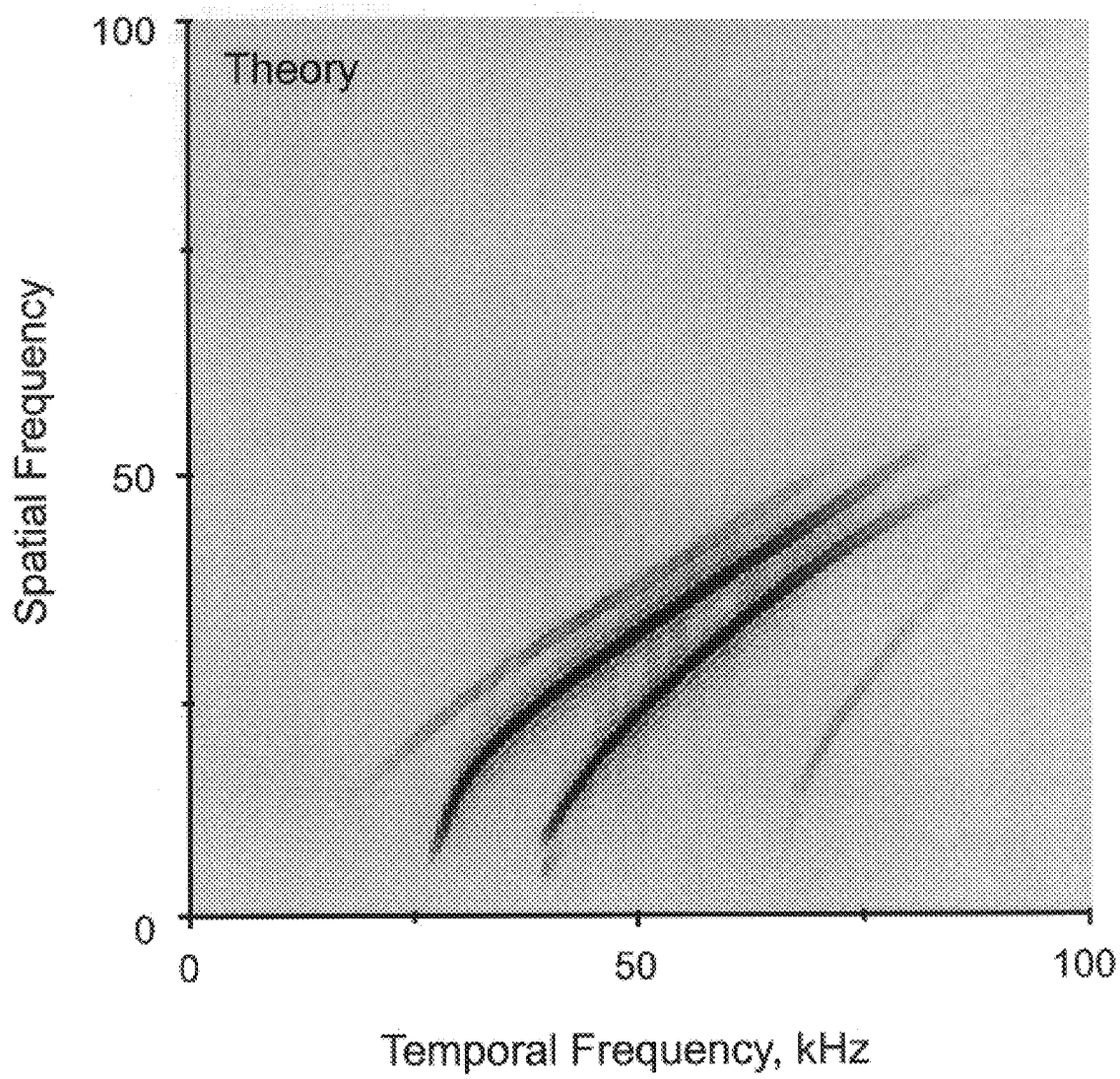
FIGS. 15a and b are plots in the spatial/temporal frequency plane of theoretical and experimental dispersion relations.
Figure 15B:
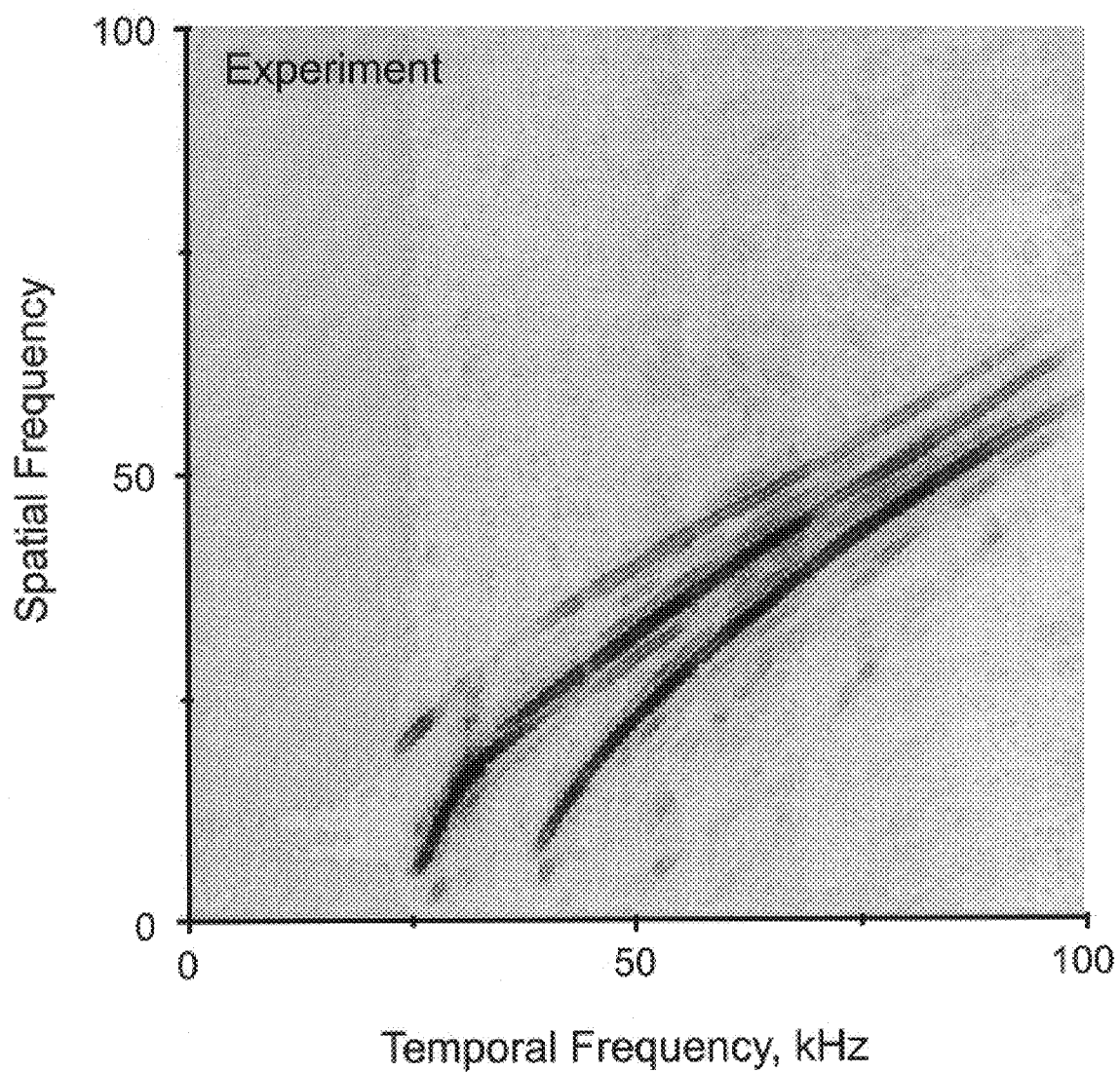

To verify the time-space transformation algorithm, an experiment was conducted using a 63 ft. section of 2" galvanized schedule 40 steel pipe and the same source-receiver arrangement described above. Data were collected at 81 points along the pipe surface at 1 cm intervals starting at 10 pipe diameters (PD) from the source. (Note that in the case of a real, continuous leak signal it would have been necessary to capture all 81 data points simultaneously.) Each data point was bandpass filtered from 1–100 kHz and averaged twenty-five times to eliminate ambient background noise. A similar set of data was then generated using the model presented in Equation 1, and both data sets analyzed using the method presented in Equations 5–7. The results are shown in FIGS. 15a and b. Obviously, the plots are very similar. Three of the prominent symmetric modes indicated in FIG. 15a, (modes A, B, and C shown in FIG. 12), are apparent in the experimental data shown in FIG. 15b. Indications of the fourth mode can be seen as well, though not as clearly, starting at approximately 65 kHz. FIG. 15b also shows the presence of several other modes, between mode B and C, for example, which are believed to represent the non-symmetric characteristics of the fluid-pipe system. Additionally, the experimental data also appear to confirm that modes P and C are the most energetic of the symmetric modes, as discussed above.

Leak location calculations were performed by using data collected at both 10 and 60 PD. The data from these experiments were used to simulate a leak, where two sensors located 70 PD apart received leak signals from a source located 10 PD from one of the sensors. The data were transformed as above, and a prominent axi-symmetric mode present in both the 10 and 60 PD data sets, in this case mode C, was cross-correlated to determine the source location.

Figure 16A:
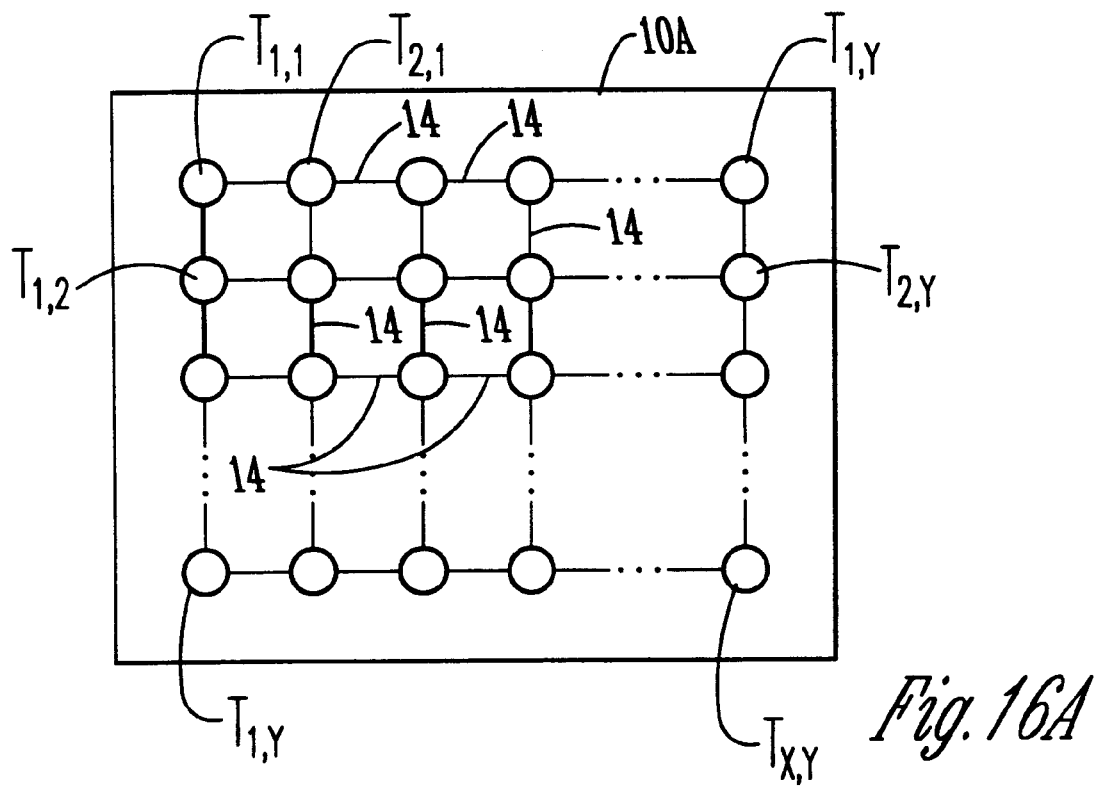
FIGS. 16a and b are top plan and side elevational views of a transducer array according to the invention.

The same experiment was then performed using simulation data. The theoretical and experimental results are presented in FIGS. 16a and b.

The results show that for this simple situation, leak locations can be determined using the time-space transformation method. Both theoretical and experimental plots clearly indicate a leak at 1.7 ft. (10 PD) from one of the sensors. However, do to ambient noise present in real-life situations, the methodology will prove to be unreliable with devices to this point. The present invention overcomes this deficiency.

Due to the highly dispersive nature of a fluid-filled pipe system, traditional cross-correlation techniques do not perform well for acoustic leak location. To address this issue, the above-described analytical model has been developed to gain first-principle understanding of pipeline acoustic propagation, and to account for dispersion effects in leak location algorithms. The approach, a time-space transformation method, has demonstrated the ability to accurately locate a noise source in simulations and bench-top experiments. It is submitted that the experimental work applies to longer, more complex pipeline systems, and to non-symmetric modes.

Therefore, from the foregoing, it can be seen that a methodology has been discovered which can provide needed accuracy for acoustic emission source location, even in very dispersive mediums, such as fluid-filled pipes. Further discussion of this method is set forth below.

As discussed previously, the highly dispersive nature of fluid-filled pipeline systems makes the use of traditional time-of-flight source location techniques generally ineffective. Because such methods rely on the assumption of a non-dispersive signal, they do not compensate for the multi-modal characteristics of a real acoustic signal.

Following will be further examination of some of the practical problems to be encountered in the application of the previously-reported method, which uses both spatial and temporal transforms to isolate modes and determine source location. Data are presented that show the effect of transmission line interruptions. It is shown that the characteristics of a pipeline vary as a function of distance along the pipe, and that these characteristics can be determined empirically. Results indicating the effect of system background noise are also presented.

As previously discussed, the typical time-of-flight method for performing source location in liquid-filled pipes is cross-correlation. Use of this technique assumes that each of the received signals is a non-dispersed time-delayed replica of the source signal. A large peak in the cross-correlation function indicates the delay in arrival times of the signals, where the difference in arrival times is directly related to the distance between the two sensors and the source. However, in a dispersive system, energy propagates in multiple dispersive modes, each with a different velocity, and cross-correlation generally does not produce a well-defined peak. In fact, the more dispersed the signals become, the poorer the results of the method, so method performance degrades as source-to-sensor distance increases.

A symmetric pipeline model has been described herein to help better understand a pipeline system's dispersive nature. The model, developed around the simplest case of an axi-symmetrically located source in a long water-filled pipe surrounded by air, was verified and used to predict the dispersion characteristics of the pipeline.

A robust, what will be called herein, generalized cross-correlation algorithm is also described. The method requires that the individual modes within the leak signals be isolated.

Mode isolation, is accomplished empirically by taking a spatial array of time-series waveforms along the length of the pipe and Fourier transforming the data in both the spatial and temporal directions. The transformed data can be used to produce an image of the pipeline dispersion characteristics. FIG. 21 shows the results of such a transformation on both theoretical and experimental axi-symmetric signals captured at 81 spatial points with one centimeter intervals along a water-filled 2" steel pipe.

To more thoroughly characterize the dispersion properties discussed above, extensive data were gathered along the length of a straight, water-filled pipe. Over 1300 waveforms were collected at one centimeter intervals, extending more than 44 ft. from the source, along the same 63' length of 2-inch, schedule 40 galvanized steel pipeline used to collect the experimental data in FIG. 1. A 500 kHz center-frequency ultrasonic transducer, coupled directly to the water through a thin rubber membrane, was used as a repeatable axi-symmetric source.

The waveforms were collected with a 10–100 kHz sensor in point-contact with the pipe wall and recorded with a digital oscilloscope. Each signal was bandpass filtered from 20–100 kHz and averaged twenty-five times to minimize background noise. Waveforms were sampled at 500 kHz with a total window of 20 ms.

Figure 21A:
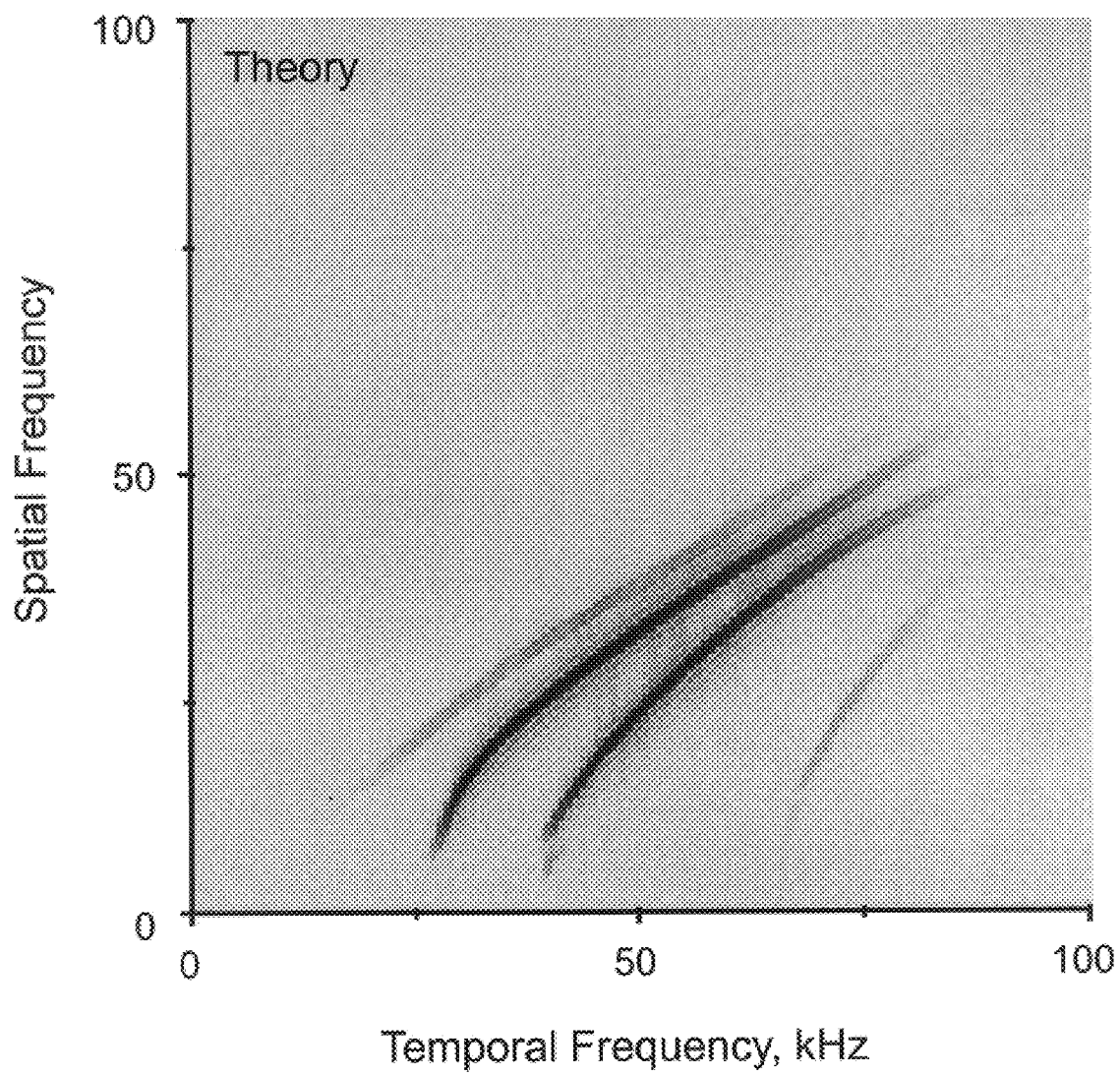
FIGS. 21A and B are plots of theoretical and experimental dispersion characteristics of a 2" water-filled pipe.
Figure 21B:
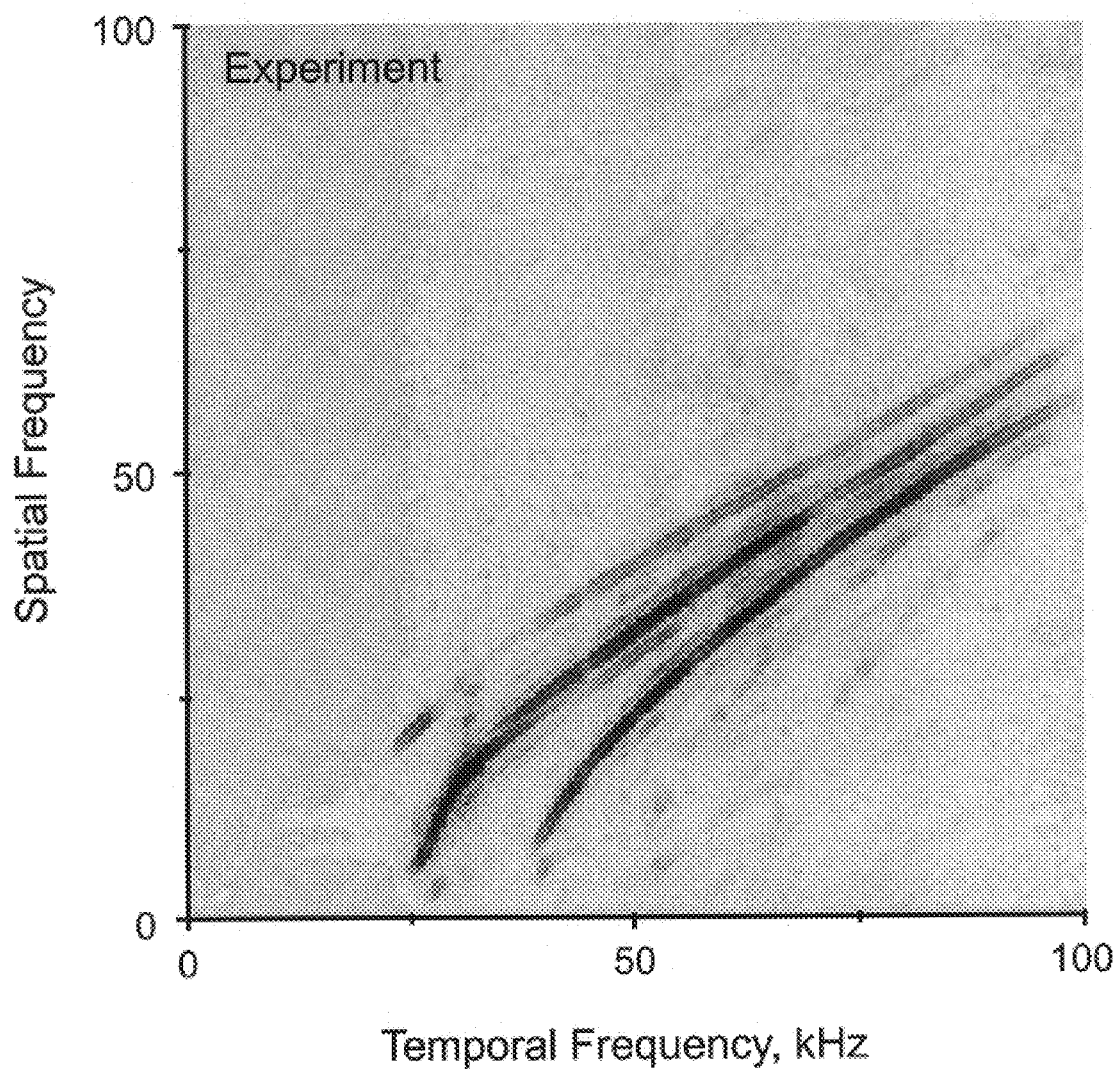

Dispersion plots similar to the ones presented in FIGS. 21A and B were then produced at five pipe diameter (PD) intervals out to a distance of 250 PD along the characterized pipeline. Eighty-one consecutive waveforms were used to generate each image.

An examination of the dispersion plots from various locations show several interesting phenomena. First, non-symmetric as well as symmetric modes are being generated within the system. A comparison between the theoretically predicted dispersion curves in FIGS. 21A and B and the curves in FIGS. 22A and B illustrate the presence of the extra modes. The non-symmetric modes, however, appear to contain much less energy than do the symmetric modes, as indicated by the lighter, narrower curves. Energy traveling in the opposite direction as the original signal can also be seen as the "mirror image" effect along the top axis of the plots in FIGS. 22A and B. This is energy which is believed to have been reflected either from the end of the pipe or some other pipeline feature (e.g. pipe coupling).

Figure 22A:
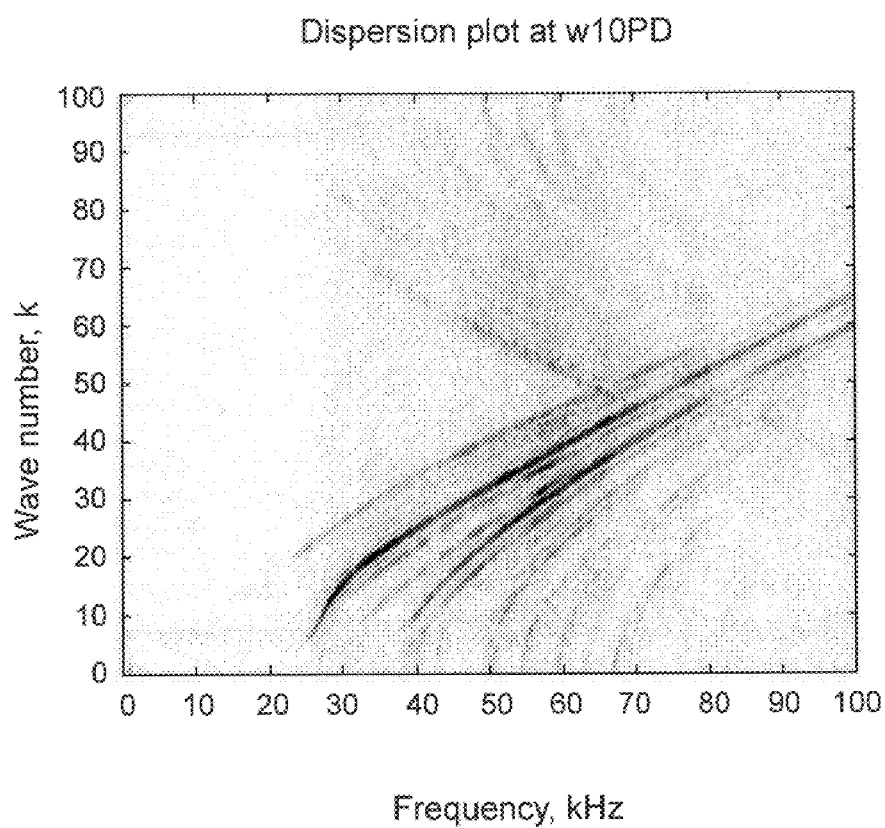
FIGS. 22A and B are plots of dispersion properties at different distances from a source.
Figure 22B:
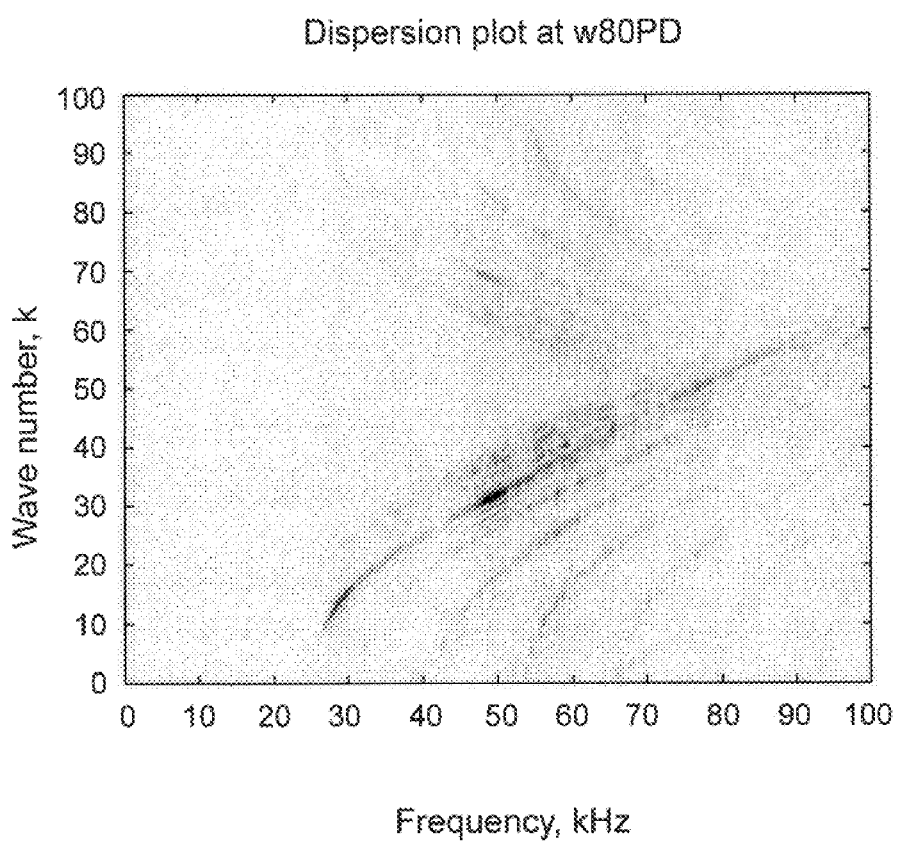

A comparison of the dispersion curves at various axial locations shows that the dispersion properties are not constant. For example, certain modes appear at nearly every location along the pipe, while other modes appear only at particular, non-consecutive positions. Mode strength also appears to change as a function of location, as seen in FIGS. 22A and B.

Figure 23:
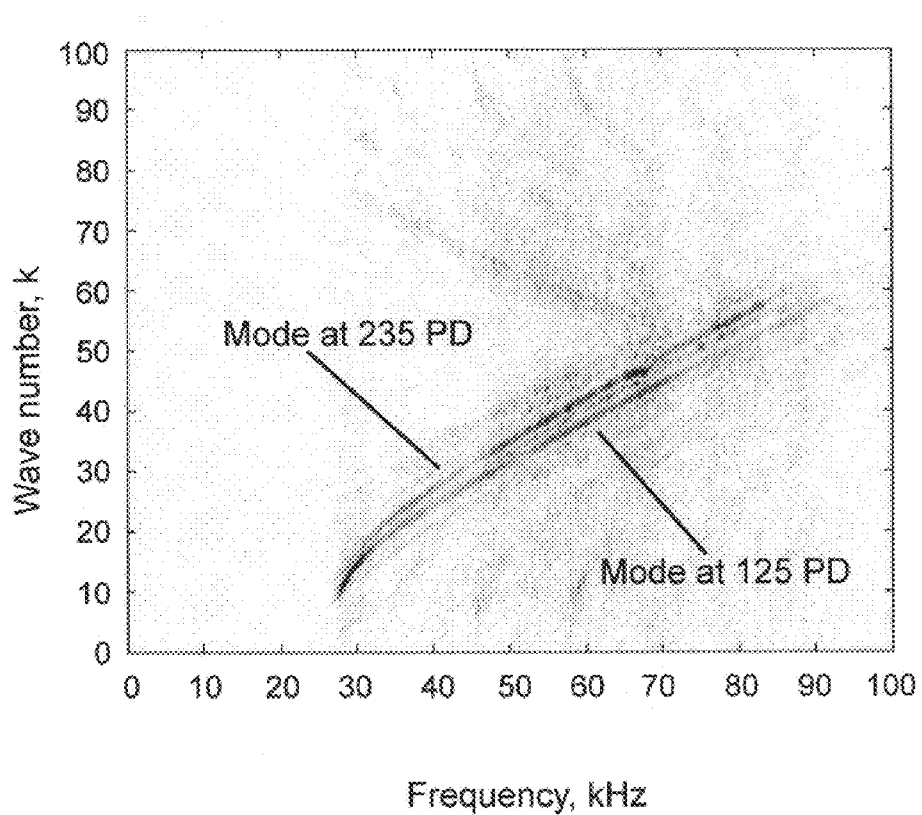
FIG. 23 is a plot of a composite of dispersion curves at different distances from a source.

Further, and perhaps most interestingly, mode position within the frequency plane varies as a function of location along the pipe. FIG. 23 shows a composite plot of the dispersion properties at 125 and 235 PD from the source. While the two prominent curves appear to represent different modes, an examination of plots of intermediate positions shows that they are in fact the same mode, shifted to different positions within the frequency plane. Possible reasons for this shift may include variations in pipe wall thickness, pipe diameter, and metal homogeneity. Precisely speaking, a rigorous source location would require an equally rigorous characterization of all such variations in propagation properties along the pipeline. However, for practical applications, a reasonable average estimate of the propagation characteristics of the detected modes should provide a sufficient location accuracy.

The aspect of the problem in which these fluctuations are critical to source location is in mode detection within the array measurement interval. Clearly, in FIG. 23, if one assumed data collected at 235 PD lay in the same position as the dispersion curve measured at 125 PD, the mode's contribution would be completely missed. This observation underscores the importance of careful characterization of the propagation characteristics over each measurement access interval. It may in practice be possible to visually identify mode positions by viewing the data from a detected leak in the frequency plane, provided adequate signal-to-noise is available. As will be shown later in FIGS. 28A and B, however, robust locations can be extracted from noisy data in which the mode structure is not visually detectable. For maximum sensitivity it therefore appears prudent to perform an explicit transmission line characterization at each measurement position using a locally-positioned source.

Typically, such a characterization can be performed by introducing a short burst, or impulse function. It is known in the art that inputting a short burst simulates an impulse response into the system, thus approximating the impulse response of the system. This approximates the $H_n$ ($\omega$) displayed within Equation (2) disclosed earlier. This is an approximation as a true impulse response has no duration of time, while a real world burst will display, albeit minimal, a duration of time. A crude, yet effective means for simulating such a burst in the above experimental apparatus is breaking a pencil lead upon the surface of metal. This provides a impulse of a short duration.

The effect of transmission line interruptions was studied by collecting data on a pipeline configuration consisting of a straight 63' section and a shorter 21' section, connected by a single 90 degree elbow. Experiments similar to those described above were conducted to determine what effect a line complication, in this case an elbow, would have on both the dispersion characteristics of the line and on the ability to perform source location using the algorithm. As in the original experiments previously discussed, an axi-symmetric source was used. Waveforms were collected at 0.5 cm intervals along nearly the full length of the 21' section of pipe, and along approximately 10' of pipe following the elbow. In all, nearly 1800 waveforms were collected out to a distance of 190 PD from the source. In the data shown below, the spatial and temporal sampling frequencies from the previous experiments, 100 samples/m and 500 kHz, respectively, were used.

Figure 24A:
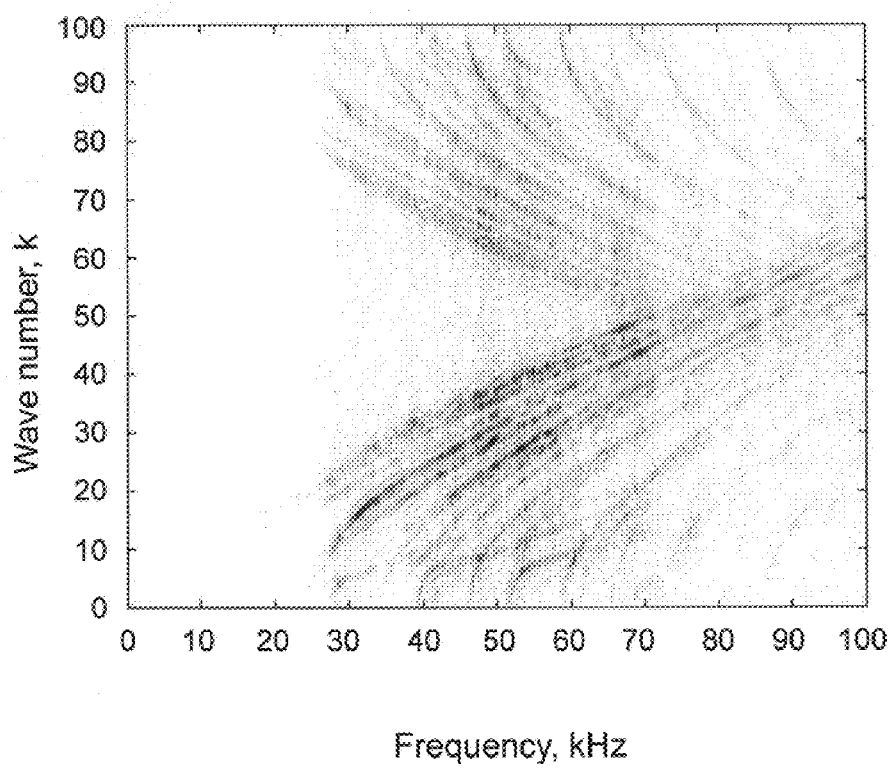
FIGS. 24A and B are plots of non-symmetric dispersion properties of an infinitely long fluid-filled pipe.
Figure 24B:
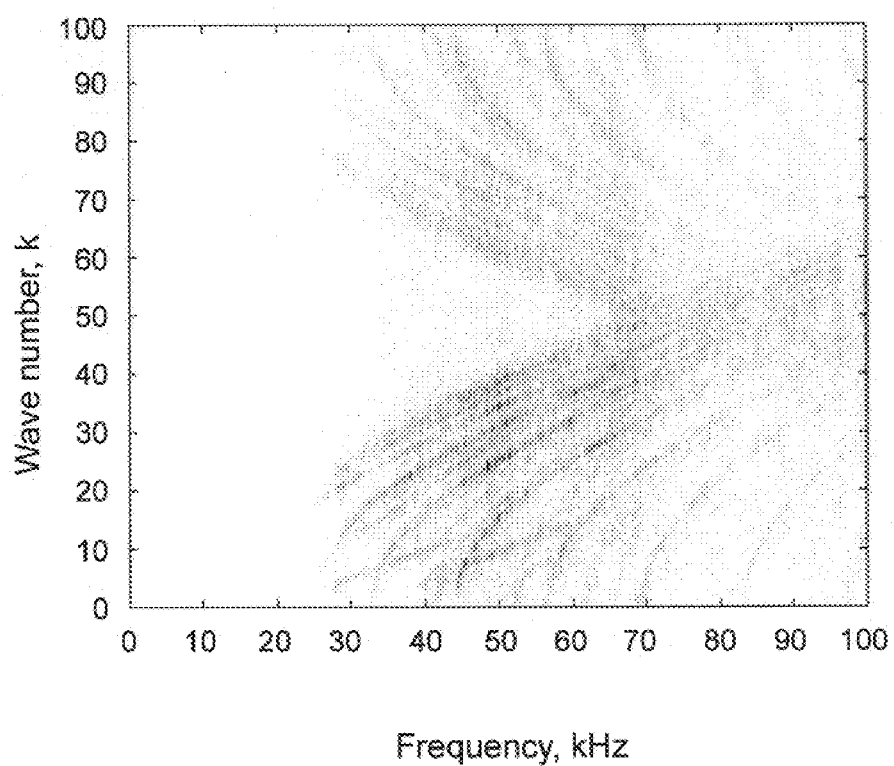
Figure 25:
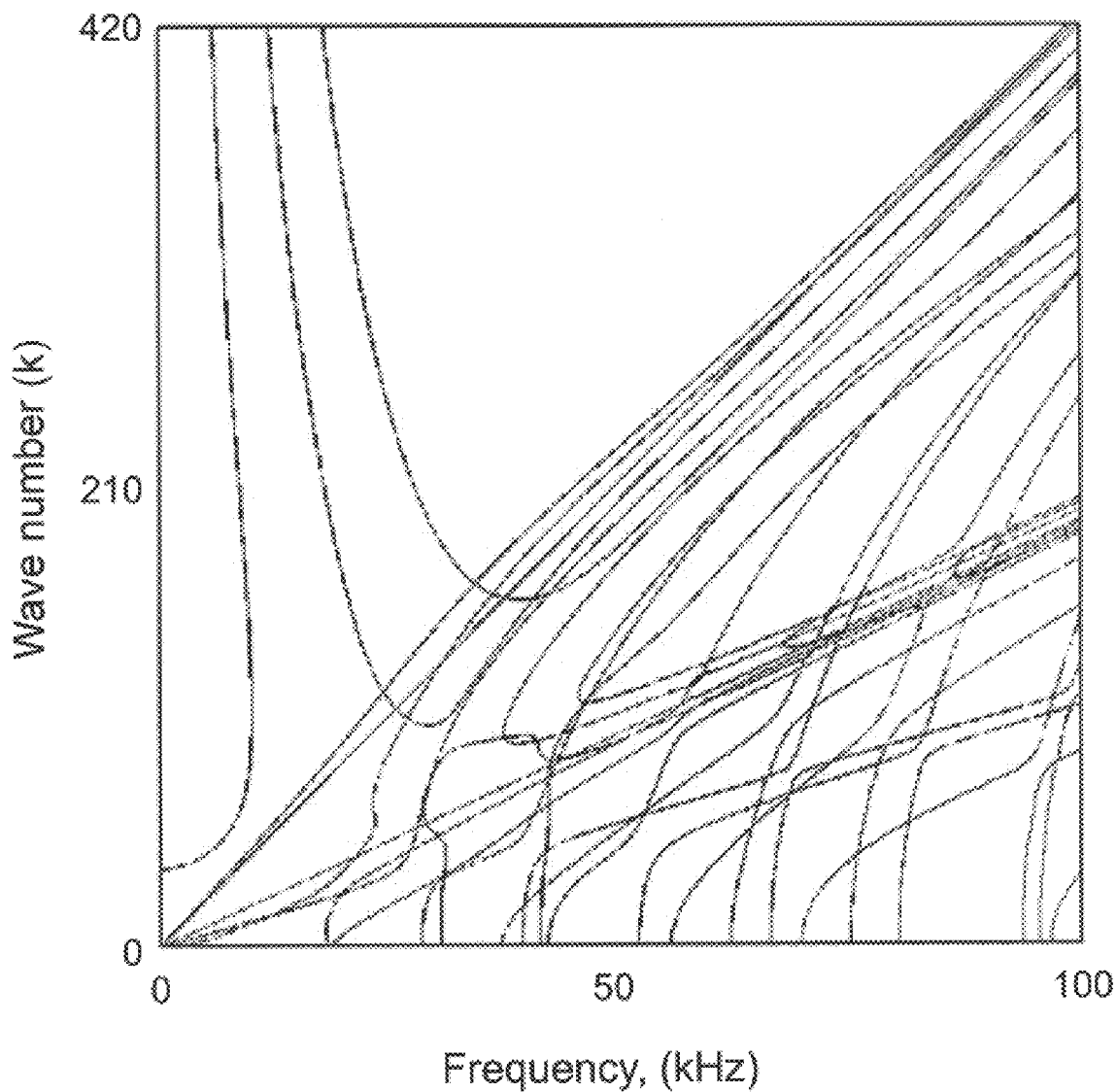
FIG. 25 is a plot of dispersion characteristics of an elbowed pipe configuration at different locations.

FIGS. 24A and B shows examples of the dispersion curves found at locations both before and following the elbow, 50 and 150 PD, respectively. Comparing these plots to those presented in FIGS. 22A–B and 23A–B, the most obvious difference is the increased number of modes in the elbowed pipe configuration. It is evident that reflection/transmission at the pipeline elbow is coupling the axi-symmetric modes generated at the source into numerous non-symmetric modes. An indication of the complexity of mode structure introduced by inclusion of nonsymmetric modes is provided by FIG. 25, which super-imposes the loci of all cusps (infinite and finite) in the denominators of mode terms for angular orders 0 through 3, corresponding to both free-propagating and spatially decaying modes of propagation. The increased density of contributing modes presents challenges for mode isolation. Resolution of closely-spaced modes requires a correspondingly large spatial sampling interval—a potential problem in practice. This result suggests a procedure which selects a well-isolated mode for source location, determined through an a priori pipeline characterization. Such a priori pipeline characterization can essentially be a calibration procedure where an array of transducers, corresponding to the desired number and location of measurement points along the conducting medium, is put into operable position. Thereafter, a controlled source of acoustic energy is imparted to the conducting medium, and the signals from the transducers recorded. The signals are processed according to the algorithm of the invention. As a result, the modes of propagation of this particular conducting medium will be a priori known.

Figure 26A:
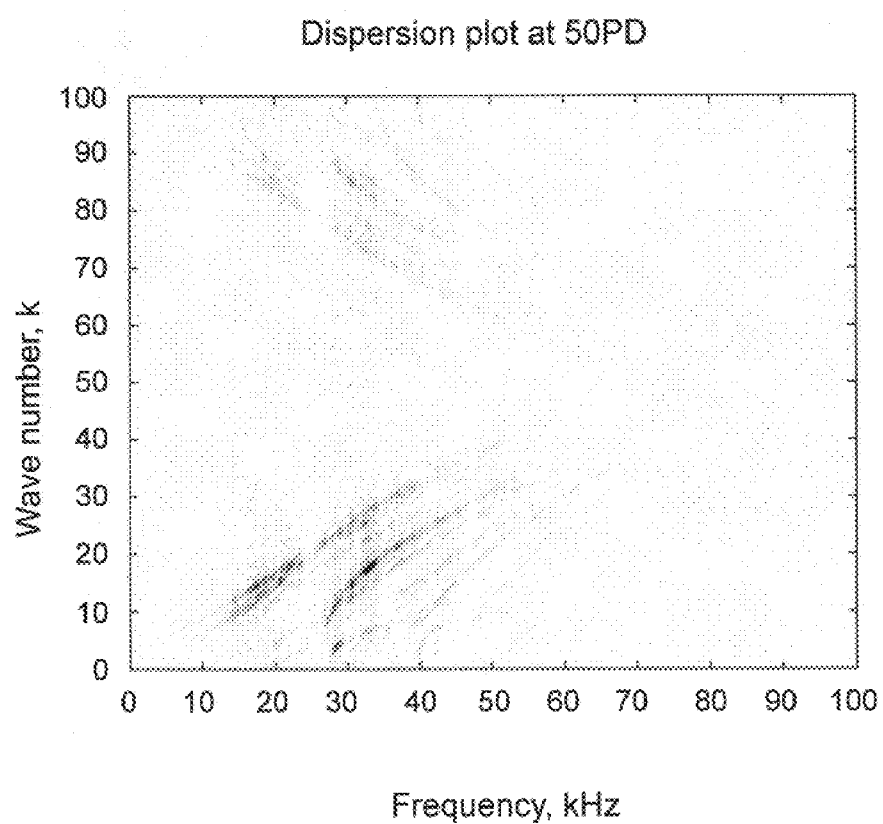
FIGS. 26A and B are plots of low frequency mode response and full dispersion map at a distance from the source.
Figure 26B:
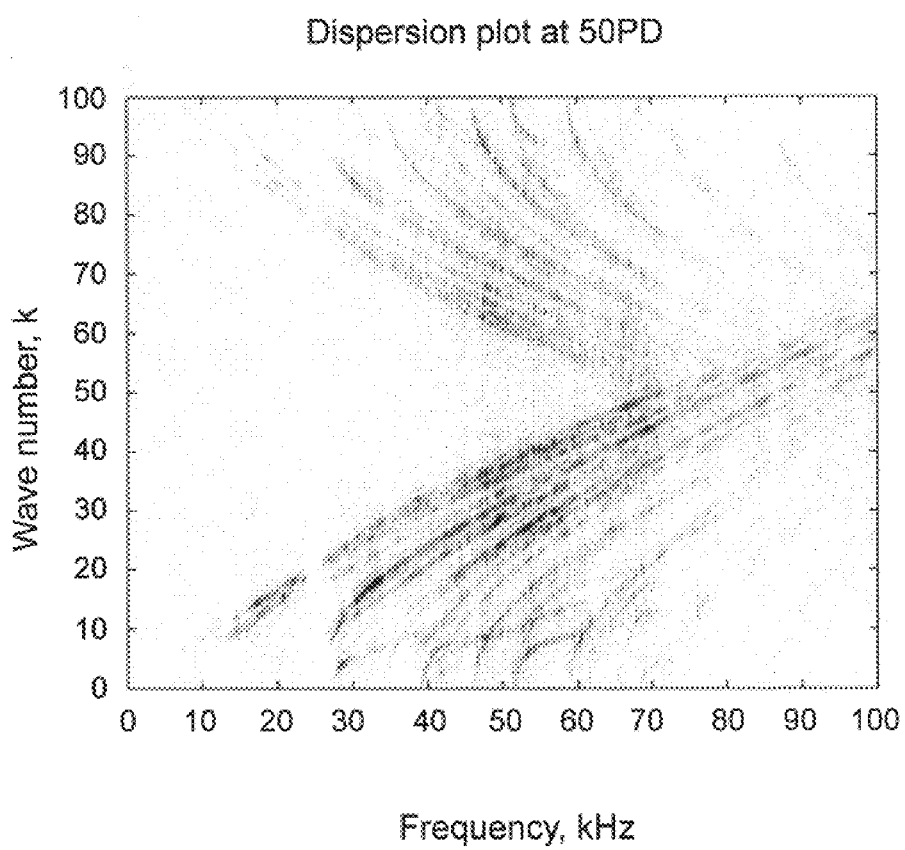

Data on the elbow configuration were also collected using a low frequency (100 Hz–20 kHz) accelerometer. These data were used to check the low frequency dispersion properties of the system and, in conjunction with the data taken previously, generate a plot of the dispersion properties for the full frequency range between approximately 10–100 kHz. FIGS. 26A and B shows the low frequency response and the total dispersion map after combining with the earlier data.

The most notable information found from the low-frequency data is that the modes do not appear to shift with position, as demonstrated in FIG. 23. Analysis of the mode response at all locations where low-frequency data was recorded shows that modes' positions within the frequency plane are constant, with no changes either over single intervals or longer distances.

Source location using the generalized cross-correlation discussed previously can be accomplished in two ways: by isolating two separate modes in the data from one sensor location and determining the difference in their arrival times, or by isolating the modes (the same or different modes) in data from two different sensor locations and finding the difference in those arrival times. In the following discussion, the second method, using data from two different sensor locations, is described.

If the signal V from each of two sensor locations A and B is assumed to be the sum of n modes, with each mode consisting of an amplitude $A_n$ and a phase $e^{ig(n)(\omega)z}$, where $g_n$ is the wave number and z is the distance to the source, then for any two modes i and j, the following expression [8] can be written $$C(z) = \int \hat{A}_i^A \hat{A}_j^{B*} e^{i(g_i(\omega)z_A - g_j(\omega)z_B)} e^{if(\omega,z)} d\omega \qquad (8)$$

For this calculation, it is desired that the arbitrary function $f(\omega,z)$ in the second phase term have conjugate phase of $\hat{A}_i^A \hat{A}_j^B$ when z corresponds to the location of the leak. Under these conditions, if i=j (i.e. the modes are the same), then $f(\omega,x)=-ig_i(\omega)(z_A-z_B)$ Remember, $z_{ZA}+z_B$ is the known distance between the sensors. If we define the known constant as d, then $z_A-z_B$ can be replaced by $z_A-(d-z_a)$, or simply $(2z_A-d)$, thus leaving only one variable. Upon substitution we find $f(\omega,x)=-ig_i(\omega)(2z_A-d)$. The integrand then becomes real-valued, and the function is maximized at the distance $z=(2z_A-d)$. This produces a peak in the function similar to the peak found in a typical cross-correlation. In fact, if the wave number is linear with frequency, i.e. $g_n(\omega)=\omega/q$, where q is a constant, Equation 21 reduces to the cross-correlation function.

Location calculations were performed on both the straight and elbowed data, using both symmetric and non-symmetric modes. For the straight pipe data, calculations were done at sensor-to-source distances up to 250 PD (12.7 m), or a maximum sensor separation of more than 83 ft (25.4 m). For the elbowed data, location calculations were performed for sensor separations up to 63.2 ft, around either zero, one, or two elbows, depending on the data.

Figure 27A:
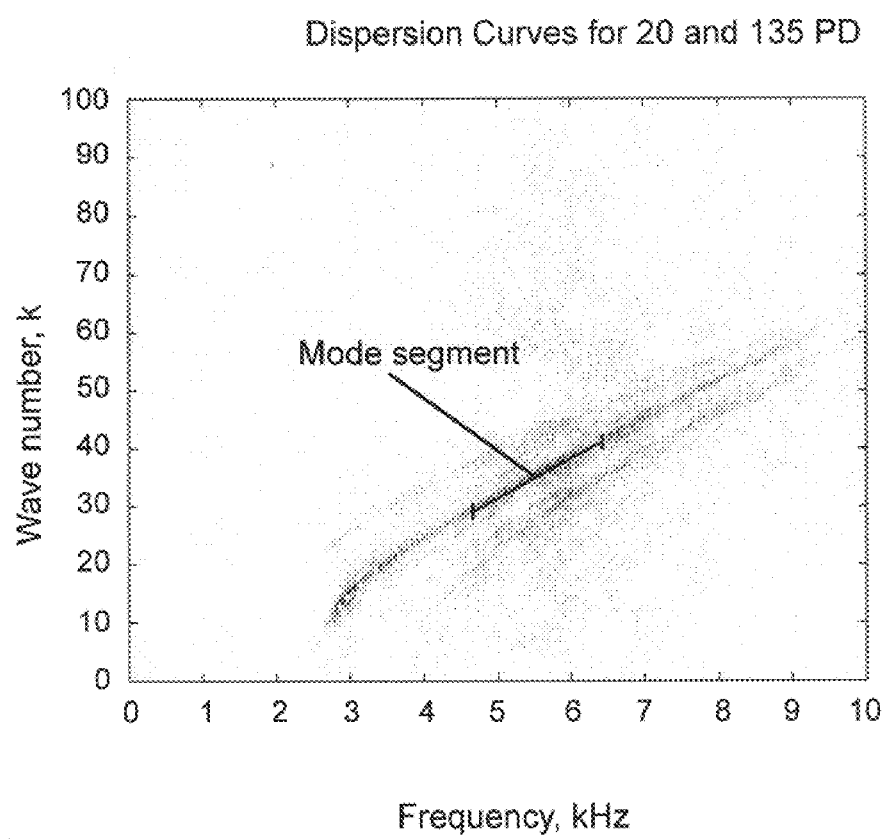
FIGS. 27A, B, and C are plots of location estimates for data from a straight pipe.
Figure 27B:
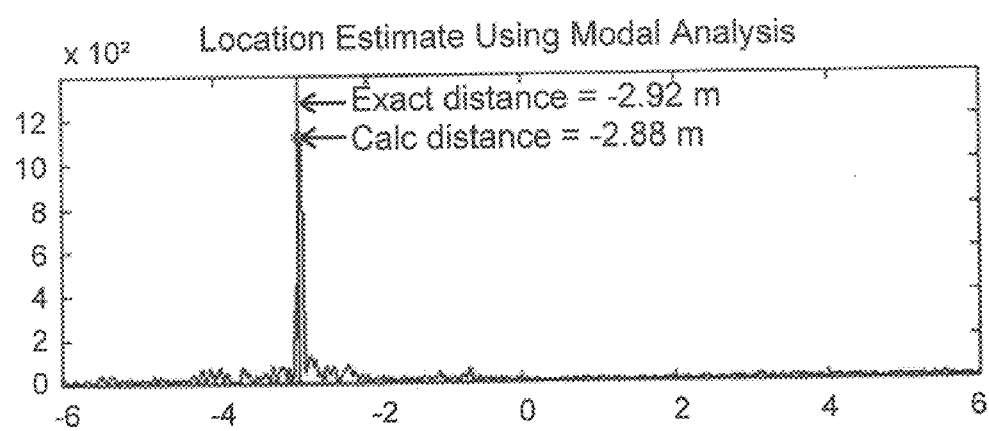
Figure 27C:
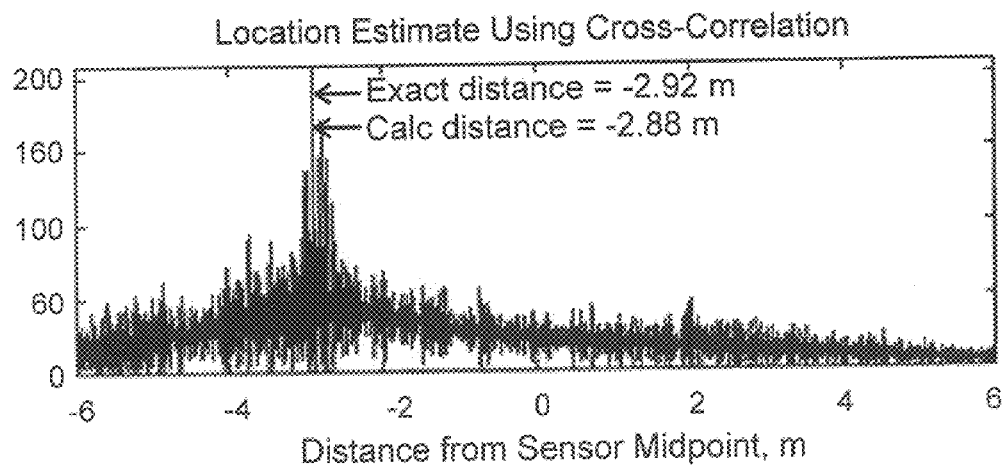

FIGS. 27A, B, and C shows the results of a typical location calculation using straight pipe data from 20 and 135 PD, a sensor separation of approximately 26 ft (7.8 m). The figure includes a plot of the dispersion map produced by Fourier transformation in time and distance, as well as location estimates calculated by both a modal analysis and standard cross-correlation. The dispersion map is used to find a prominent mode segment over which to perform the line integration shown in Equation 8. The line segment highlighted in FIGS. 27A, B, and C was used to calculate the location shown in the modal analysis location estimate.

In this case, with a very large (>60) signal-to-noise ratio (SNR), the modal analysis produces a nearly exact location, after accounting for measurement and rounding errors. The location estimate is also sharply peaked, corresponding to the length (bandwidth) of the mode segment used to calculate the location. Spatial resolution of the location is inversely proportional to the bandwidth of the signal, meaning the larger the bandwidth, the finer the resolution on the location estimate. This also means that, theoretically, location estimates can be produced using mode segments covering very small bandwidths. For this data, meaningful locations can be determined using this mode segment down to bandwidths of less than 2 kHz.

It has been found, however, that the method is sensitive to the ability to adequately isolate a strong mode. In any calculation where the mode can be located and isolated in the frequency plane, the method should produce exact results, assuming the dispersion properties are uniform everywhere between the array measurement interval and the source, since the method utilizes the phase information contained in the chosen mode segment. However, as the chosen segment moves from the actual mode location within the plane, errors appear in the location estimate. The presence of multiple, overlapping modes in a line segment can also give rise to errors, where the phase information contained in each mode contaminates the estimate calculated using the dominant mode. Given the large number of modes shown in FIGS. 24A–B, 25, 26A–B, it is obvious where this has the potential to be a problem.

Several experiments were conducted to determine the method's performance under more realistic noise conditions. A white noise signal was introduced into the pipeline via function generator and several 81-waveform data sets of background noise were recorded at different locations on the pipe. This guaranteed that the noise was random and uncorrelated. The background noise was then added to the original signals at different SNRs and the location calculations repeated with both the modal algorithm and standard cross-correlation.

Figure 28A:
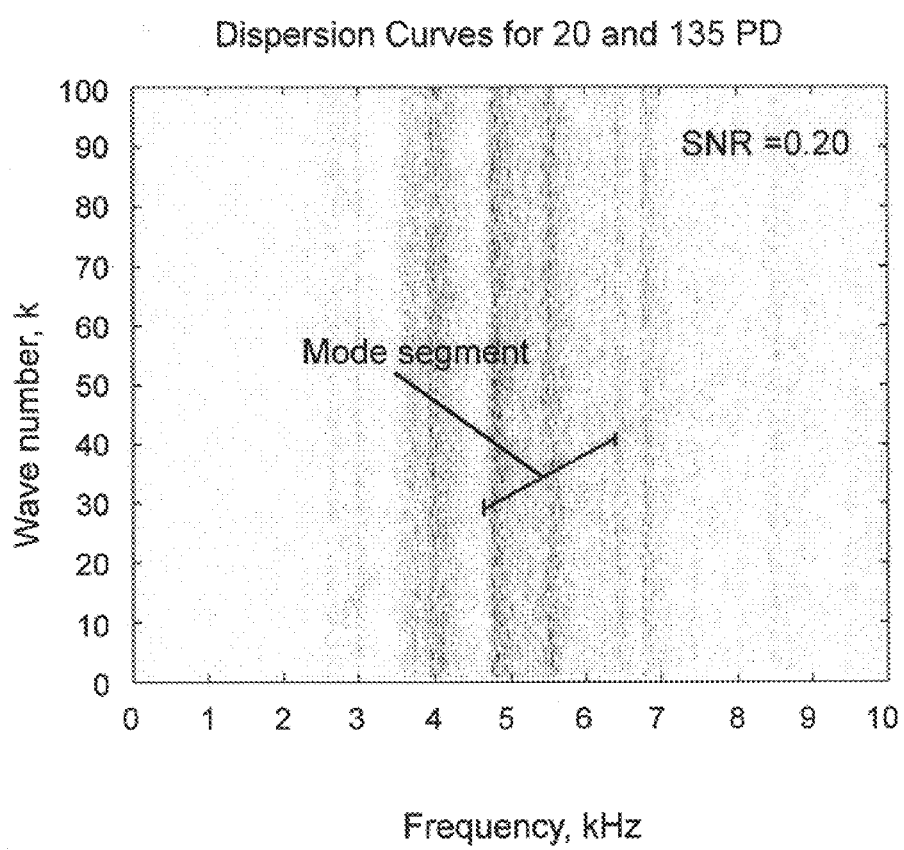
FIGS. 28A, B, and C are plots of straight pipe location in the presence of background noise.
Figures 28B, 28C:
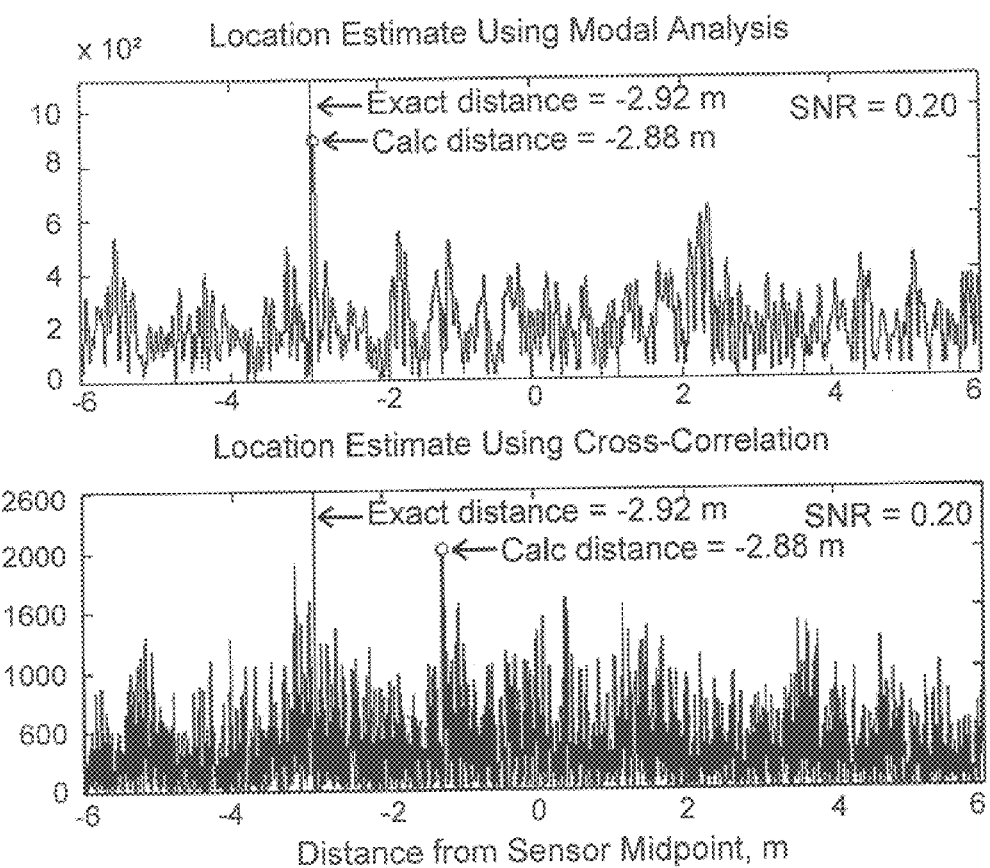

The results of these experiments showed that the standard cross-correlation was more sensitive to the level of background noise, in some cases an order of magnitude more sensitive, than was the generalized method. Overall, the cross-correlation was unable to determine an accurate location below a SNR of approximately 0.60. The modal analysis, by comparison, was able to determine an accurate location estimate to a SNR of 0.10 or better. FIGS. 28A, B, and C shows the results of the same location calculation presented in FIGS. 27A, B, and C at a SNR of 0.20. While the cross-correlation has spread and the location peak been lost completely, the peak from the generalized method is still easily discernible, despite the fact that the additional noise has nearly hidden the modes within the dispersion map and the noise surrounding the peak has increased. As was noted earlier, however, in order to perform this calculation it was necessary to know a priori the location of the chosen mode within the frequency plane. In this case, that information was determined using the virtually noiseless data in FIGS. 27A, B, and C. However, as discussed earlier, one can determine the modal locations through calibration of the system with a simulated impulse which sufficiently produces a signal with an appropriate signal to noise ratio.

Similar experiments with data from the elbow configuration show similar results. Since, however, the energy in the system is spread among more of the non-symmetric modes, the method is not as noise-intolerant as it is with the straight pipe data. Nonetheless, even with greater noise sensitivity, the modal analysis is still less sensitive to noise than is the standard cross-correlation. It was also found that greater care must be used when picking a mode along which to perform the integration, since a larger number of modes tend to appear in the more complicated pipeline system.

The generalized cross-correlation method helps account for the effects of dispersion in acoustic emission leak location. Data were collected to examine several problems that would be expected in moving the method to field application. From the data, the following observations have been made. First, both symmetric and non-symmetric modes are generated. Second, mode dispersion characteristics vary over the length of the pipe, particularly at frequencies above 30 kHz. And third, energy distribution among the modes varies over the length of the pipe. Finally, the method has also been found to be sensitive to the ability to properly isolate modes to use in the location algorithm.

Figure 16B:
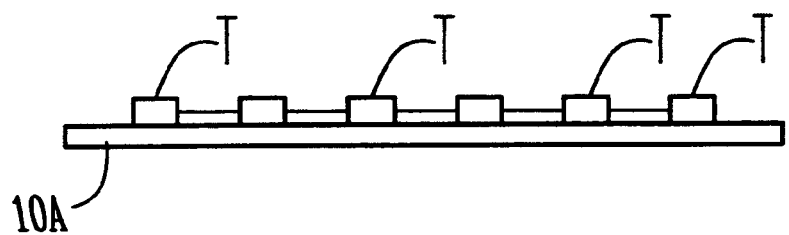
Figure 20C:
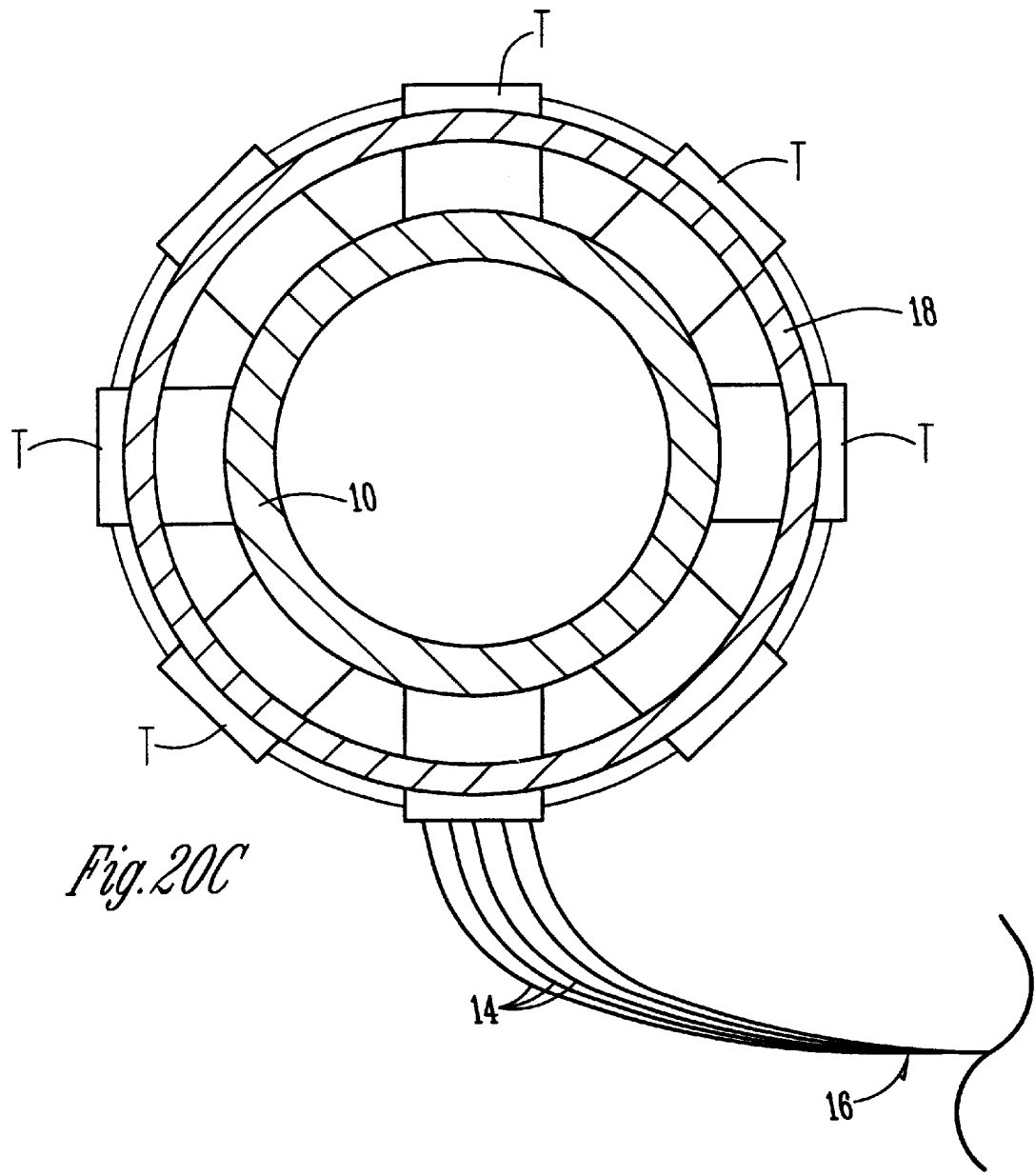
FIG. 20c is a side view of FIG. 20b.

The apparatus used with the invention can take many forms and embodiments. One embodiment would include a plurality (e.g. 81) of acoustic transducers (e.g. Physical Acoustics Corp. acoustic transducer (20 to 100 kHz)). Each would be mounted on a framework 12 (see FIG. 20A) that could be adjusted to bring the transducers T adjacent to a plurality of surfaces (e.g. several diameters of pipe). The transducers would be spaced apart (preferably uniformly) in an array on the framework. In the case of a pipe 10, the array could be linear. The frame could be like a ladder, with successive transducers aligned linearly along the "ladder" frame (see FIG. 20A). In the case of a plate, the array could be two-dimensional, with transducers T in rows and columns (see FIG. 16). In the preferred embodiment the spatial array of contact transducers is similar to linear arrays used in medical ultrasound imaging [here there are 81 points, 1 cm intervals on a 63' 2" galvanized steel pipe].

Other types of transducers or transduction are also contemplated however. Holographic and interferrometric methodology could be utilized in measuring perturbations, even small perturbations in the material. For example, in some cases a light source, typically a laser beam, could be generated and reflected off of the surface of the medium carrying the wave energy. A photodetector could have a knife edge placed in front of it. As is well known in the art, the knife edge could be adjusted so that any vibration of the medium would cause the laser reflection to flutter. The optical detector would derive the frequency of vibration from the oscillation. The laser could be scanned over the area of inquiry to obtain measurements from the same array of points (e.g. 81), for example, as with the acoustic transducers. On the other hand, the laser could be broken up into multiple beams (e.g. 81), with each directed to the individual measurement points. Reflections could be directed to photodetectors for each beam. Yet another method would be utilizing additional interferrometric methods know in the art. Still other forms of transduction are possible.

It is important that whatever transduction is used have minimal interference with propagation of the signal. In the preferred embodiment using contact transducers, conical tip wave guides 20 (see FIGS. 10 *a* and *b*) having a small contact surface 24 (1.8 inch dia.) are machined to mate the geometry of the structure transmitting the signal (e.g. pipe). This minimizes interference with the acoustic waves to be detected. Use of laser, of course, would have no physical contact and thus minimal interference.

The number of transducers is determined by the mode structure of the medium under investigation. The spacing of the transducers is determined by the mode structure. Spacing should be selected to be small enough to provide sufficient spatial frequency bandwidth to cover the dispersion curve geometry in the spatial/temporal frequency plane. It should be small enough to insure plotted dispersion curves do not intersect the top of the plot area. Sampling rates must be dense enough to insure aliasing of positive and negative frequency components does not occur, which is conventional. The closer the spacing the bigger the picture, but care should be taken not to have too big an "aperture" or view or it might be too big to see the modal curves needed to be evaluated.

The number and spacing of transducers or measurement points are governed by well known fundamental principals of discrete sampling theory, such as Fourier transform theory or Nyquist sampling frequency theory (see, for example, Bracewell, Bruce, "The Fourier Transform and Its Applications", McGraw-Hill 1965, including chapter 10, which is incorporated by reference herein).

The overall size of the array is determined by resolution required to isolate individual modes in the spatial/temporal frequency plane (e.g. 81 transducers at 1 cm intervals were needed to facilitate ease of discrimination between the curve in the 2" piping example). Compare though, the need for a larger spatial array for large number of modes closely spaced (e.g. non-symmetric modes) versus a smaller array for situations, as an example, where the location of modes has been experimentally determined or modeled. The trade off mainly relates to the amount of resolution needed versus the expense of the equipment.

As discussed above for one dimensional propagation, a linear array should be sufficient. For two dimensional, an area array with spatial Fourier transform in orthogonal directions is indicated.

Data is gathered from the plurality of transducers by a multi-channel electronic system/amplifier and signal digitizer assigned to each transducer (e.g. LaCroix oscilloscope (8 bit, 4 channel) records signals from transducers, digitizes the recorded signals and stores the digitized information), IBM compatible PC with Pentium chip the control the oscilloscope and store the digitized value for signal processing, and utilize a computer software package such as LabView (Texas Instruments) for the control and storage). The device would include analog to digital (A to D) converters to digitize the analog output of the transducers.

Either a stand-alone IBM PC (preferably at least with a Pentium Pro※processor) or a digital processor of similar characteristics inside the data acquisition device would then process the digitized received signals from the transducers according to the methodology described above. Two computers could also be used, one with the data acquisition. A bus from the data acquisition hardware to the PC, such as is known in the art, would be used. MatLab software could be a user interface.

Either by display, printout, or other output, the processor could provide the user with the calculated source location after processing the data.

It is contemplated that the entire apparatus could be ruggedized and integrated into an instrument that could be portably transported to the site of the structure to be evaluated, even in rugged outdoors conditions.

The method of the preferred embodiment of the invention has been described above. Some additional method steps can optionally be used.

Figure 17:
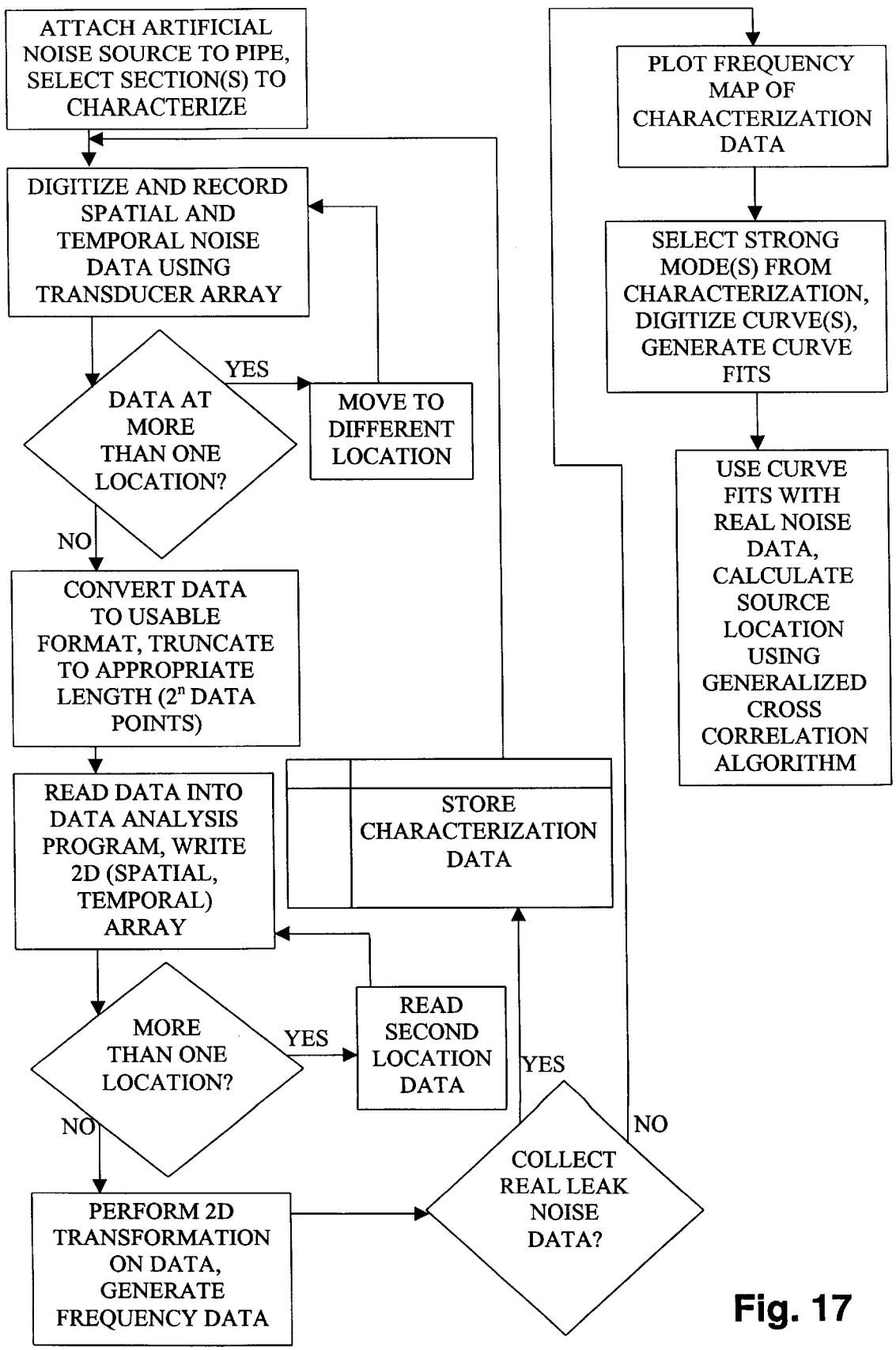
FIG. 17 is a flowchart of the general method according to a preferred embodiment of the invention.
Figure 18:
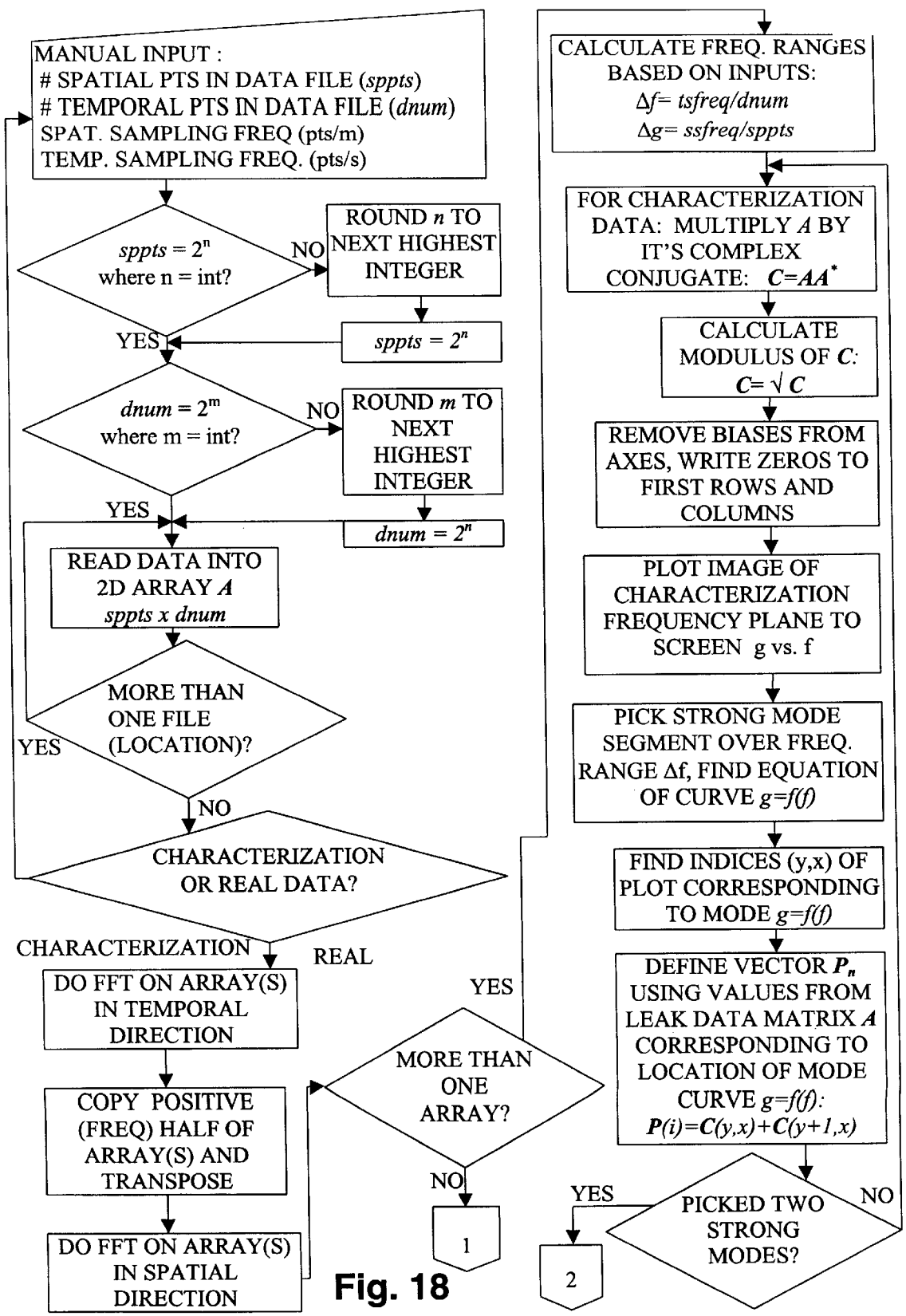
FIGS. 18 and 19 are a flow chart of a data processing algorithm according to a preferred embodiment of the invention.
Figure 19:
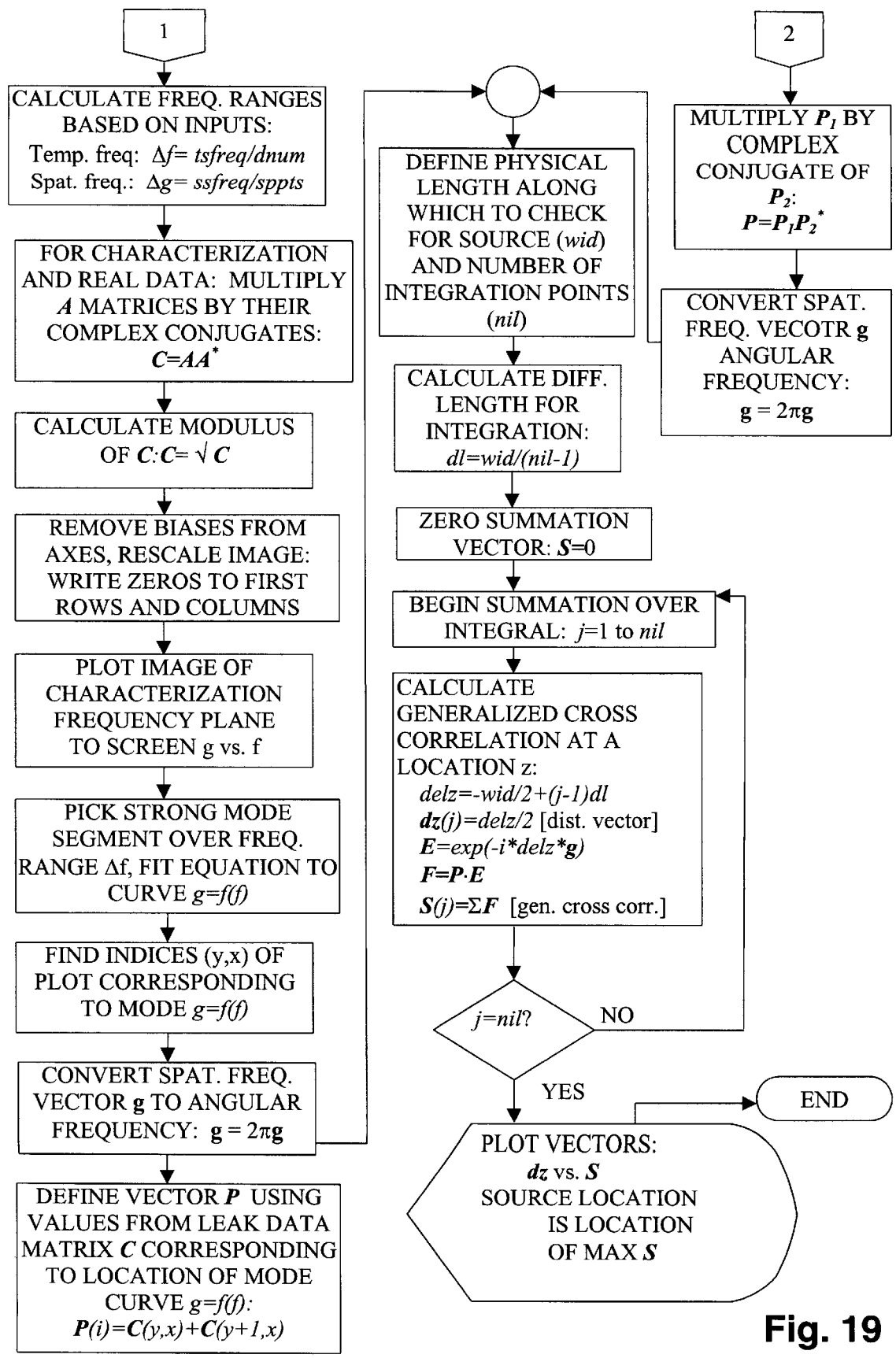

FIGS. 17–19 are flowcharts that show the method of the invention. FIG. 17 illustrates the overall method of the invention, whereas FIGS. 18–19 illustrate the data processing of the invention.

For example, it is preferable that there be a pre-calibration, not of the instrument but of the medium being investigated. To made sure that relevant data is not missed, there should be pre-calibration by introducing a known wave energy into the medium and operating the system to identify where in the spatial/temporal frequency plane each of the modes of propagation for that medium will appear. It has been found to be important to know precisely during actual measurement, where these modes will appear in that plane for the area of medium directly under the transducers. It should be noted, that the same is not normally needed for any other part of the medium. For example, the propagation characteristics of a normal pipe will not vary significantly along its length. Although there will be some variances, the amount is not usually significant enough to make a material difference in the location result. Stated differently, the variations may interject some error in the source location estimate, but so minor that it will be well within the tolerance acceptable for the application. For example, there may be a seven inch error for a leak location thirty feet away from the measuring array in a two inch steel pipe.

The included preferred embodiment is given by way of example, only, and not by way of limitation to the invention, which is solely described by the claims herein. Variations obvious to one skilled in the art will be included within the invention defined by the claims.

For example another transducer arrangement could include an annular ring array. Measurements could be taken over an array (preferably 8–16 transducers, but less or more could work—probably as few as four) of rings rather than a linear array. In the example of a 2" pipe, 81 rings could be used for good resolution of the symmetrical modes. Outputs could be summed together after pre-amplification to yield a single output signal from that ring. But such a set-up is sensitive only to symmetric modes of propagation since signals from non-axially symmetric modes would cancel when summed over the circumference of the pipe. This would occur as the non-axially symmetric modes display a sinusodial pattern in which at one place upon the array would be at a maximum and at a corresponding point on the array it would be at a minimum. Adding these maximums and minimum upon one another would effectively cancel out such effects. Similarly methodology can be seen in "twisted pair" wires in which are designed to effectively cancel out the external wave energy exerted on said wire and reduce the undesirable external noise when using such twisted pair wires.

Another alternative would be to wrap the pipe, for instance, with a suitably backed narrow strip of piezoelectric polymer as the transducer.

COMPUTER SOFTWARE APPENDICES

Following are two examples of source code was used with the preferred embodiment. Appendix A is written in MatLab and was run on a IBM PC-based computer. Appendix B was written in Fortran and was run on an IBM PC-based computer.

What is claimed:

1. A method of determining source location of energy carried in the form of propagating waves through a conducting medium comprising:
   a) detecting the waveform energy simultaneously at a plurality of points on, near, or in the conducting medium;
   b) recording the detected energy;
   c) isolating one or more modes of propagation of the energy through the medium;
   d) deriving source location by using generalized cross correlation of selected isolated modes of propagation.

2. The method of claim 1 wherein the waveform is acoustic energy.

3. The method of claim 1 wherein the waveform is electromagnetic energy.

4. The method of claim 1 further comprising first creating a controlled waveform energy in the conducting medium, following steps (a) through (c) of claim 1 to precisely determine the modes of propagation of the conducting medium and thereafter, following steps (a) through (d) to detect and locate a source of energy propagated through the medium.

5. The method of claim 1 wherein the step of detecting comprises transducing the energy into an analog signal representative of the energy.

6. The method of claim 5 wherein the energy is acoustic energy transduced by acoustic transducers.

7. The method of claim 5 wherein the energy is acoustic energy transduced by light, holographic, or interferimetric acquisitions.

8. The method of claim 1 wherein the conducting medium is at least one of a solid and a fluid.

9. The method of claim 8 wherein the solid is a pipe.

10. The method of claim 9 wherein the pipe holds a fluid.

11. The method of claim 10 wherein the pipe is partially bounded or surrounded by a material that will propagate energy in a wave form.

12. The method of claim 1 wherein the selected modes of propagation are the strongest modes.

13. The method of claim 8 wherein the solid is a plate.

14. The method of claim 1 wherein generalized correlation assumes dispersion through the medium.

15. The method of claim 5 wherein the step of recording comprising converting the analog signal to a digital representation of the analog signal and storing the digital representation in a recordable digital media.

16. The method of claim 1 wherein the step of isolating comprises separating discrete dispersion modes of propagation from the detected energy.

17. The method of claim 16 wherein the step of isolating comprises resolving different dispersion modes of propagation from the detected energy.

18. The method of claim 17 wherein resolution is a function of the number of detection points.

19. The method of claim 17 wherein the aperture of view of the energy is a function of the spacing between said points.

20. The method of claim 17 wherein the resolving is accomplished by plotting the energy in a spatial/temporal plane.

21. The method of claim 20 wherein the plotting produces one or more curves in the spatial temporal plane.

22. The method of claim 20 wherein the step of isolating utilizes Fourier transforms of the detected energy spatially and temporally.

23. The method of claim 22 wherein the Fourier transforming is fast Fourier transforming (FFT).

24. The method of claim 1 wherein the step of deriving comprises performing generalized cross correlation on isolated dispersion curves.

25. The method of claim 24 wherein the generalized cross correlation is performed relative to one or more of (a) the same curve for measurement at two different locations on the medium, (b) different curves for measurement at the same location on the medium, and (c) different curves for measurement at different locations on the medium.

26. The method of claim 24 wherein spacing and number of transducers is dependent on discrete sampling theories.

27. The method of claim 24 further comprising:
 a) comparing data points on two dispersion curves at the same temporal frequency;
 b) multiplying a data point on one curve by the complex conjugate of a data point of the other curve;
 c) repeating step b) over a band of frequencies to produce an array of products;
 d) multiplying the array of products by a phase factor determined from dispersion curves;
 e) adding the array of products;
 f) adjusting the phase factor to maximize the sum of products to create a function maximum;
 g) finding the function maximum for the array of products;
 h) deriving the source location from the function maximum.

28. The method of claim 27 wherein the step of source location comprises solving the equation $$\int \hat{V}_n^A(\omega) \hat{V}_m^{B*}(\omega) e^{if(\omega)} d\omega = \int \hat{A}_n^A(\omega) \hat{A}_m^{B*}(\omega) e^{i(g_n(\omega)z_A - g_m(\omega)z_B)} e^{if(\omega,z)} d\omega,$$

for incremental values of z.

29. The method of claim 1 wherein the medium is a dispersive medium.

30. The method of claim 1 wherein the medium is a highly dispersive medium.

31. The method of claim 25 wherein precise a priori knowledge of energy dispertion characteristics is required related to the area of the medium at which the energy is detected.

32. The method of claim 25 wherein general a priori knowledge of energy dispertion characteristics is required related to the area of the medium away from where the energy is detected.

33. The method of claim 1 wherein the number of measured points is in the approximate range of 30 to 1000.

34. The method of claim 1 further comprising displaying the cross-correlation to find the source location.

35. The method of claim 1 wherein the source is a continuous or transient leak.

36. The method of claim 1 wherein the source is a crack initiation in a medium.

37. The method of claim 1 wherein the source is artificially produced energy.

38. The method of claim 1 wherein spacing between points is determined by size of the medium and the fluid material carried by or contained in the medium.

39. The method of claim 1 wherein the detecting is conducted while minimizing any point of contact between any transducer and the medium.

40. The method of claim 1 further comprising transducing while minimizing or avoiding any interference from transducing with the propagation of the energy in the medium.

41. A method for isolating propagation modes of a waveform energy propagating through a dispersive conductive medium in a relatively high ambient noise environment comprising:
 a) generating artificially a controlled wave-form energy in the conductive medium;
 b) transducing simultaneously the controlled wave-form energy at a plurality of discrete measurement points along the conductive medium to produce a multi-modal signal;
 c) spatially and temporally Fourier transforming the multi-modal signal into spatial and temporal domains;
 d) displaying mode curves from the Fourier transformation in a spatial/temporal frequency plane;
 e) recording the precise locations of each mode curve in the spatial/temporal frequency plane;
 f) monitoring for other wave-form energy in the conducting medium;
 g) detecting said other wave-form energy at a plurality of discrete measurement points along the conductive medium to produce a multi-modal signal;
 h) spatially and temporally Fourier transforming the multi-modal signal into spatial and temporal domains.

42. The method of claim 41 wherein the spacing of the measurement points is experimentally determined to maximize resolution of each propagation mode in the spatial/temporal frequency plane.

43. The method of claim 42 further comprising applying generalized cross-correlation to at least two propagation modes in the spatial/temporal frequency plane.

44. The method of claim 43 further comprising deriving source location of the energy in the medium from the generalized cross-correlation.

* * * * *